US012657009B2

(12) United States Patent
Song et al.

(10) Patent No.: US 12,657,009 B2
(45) Date of Patent: Jun. 16, 2026

(54) APPARATUS FOR PROVIDING APPLICATION SERVICE, METHOD OF PROVIDING APPLICATION SERVICE, AND STORAGE MEDIUM STORING PROGRAM EXECUTABLE BY COMPUTER PROVIDING APPLICATION SERVICE

(71) Applicant: INSPIEN INC., Seoul (KR)

(72) Inventors: Kyunsang Song, Seoul (KR); Hyunseok Jeon, Gunpo-si (KR); Geonggyu Choi, Seoul (KR)

(73) Assignee: INSPIEN INC., Seoul (KR)

( * ) Notice: Subject to any disclaimer, the term of this patent is extended or adjusted under 35 U.S.C. 154(b) by 0 days.

(21) Appl. No.: 19/053,615

(22) Filed: Feb. 14, 2025

(65) Prior Publication Data

US 2025/0244961 A1 Jul. 31, 2025

Related U.S. Application Data

(63) Continuation of application No. 18/855,747, filed as application No. PCT/KR2024/001038 on Jan. 22, 2024.

(30) Foreign Application Priority Data

Aug. 4, 2023 (KR) ........................ 10-2023-0101952

(51) Int. Cl.
G06F 8/33 (2018.01)
G06F 8/34 (2018.01)
G06F 21/44 (2013.01)
(52) U.S. Cl.
CPC ................. *G06F 8/33* (2013.01); *G06F 8/34* (2013.01); *G06F 21/44* (2013.01)

(58) Field of Classification Search
CPC .............. G06F 21/44; G06F 8/34; G06F 8/33
See application file for complete search history.

(56) References Cited

U.S. PATENT DOCUMENTS

| 9,680,872 | B1 * | 6/2017 | Roth | ........................ G06F 21/44 |
| 10,089,103 | B2 * | 10/2018 | Gass | ........................ G06F 8/427 |
| 10,282,398 | B1 * | 5/2019 | Moss | ........................ G06F 8/00 |
| 11,468,189 | B1 | 10/2022 | Chen et al. | |

(Continued)

FOREIGN PATENT DOCUMENTS

| JP | 2005-513831 | 5/2005 |
| KR | 10-2009-0002420 | 1/2009 |

(Continued)

OTHER PUBLICATIONS (Graphical XSD Editor with Advanced Functionality, Jul. 13, 2022) (Year: 2022).*

(Continued)

*Primary Examiner* — Noor Alkhateeb
(74) *Attorney, Agent, or Firm* — LEX IP MEISTER, PLLC

(57) ABSTRACT

Provided is a method of providing the application service including receiving a channel request for transmitting and receiving information from a client in a computing system configured to manage a platform for providing the client with workspaces isolated from each other in which application packages are executed, and providing, by the client, a platform service for transforming the application packages in the workspaces.

12 Claims, 54 Drawing Sheets

(56) References Cited

U.S. PATENT DOCUMENTS

| | | | | |
|---|---|---|---|---|
| 2018/0060309 | A1* | 3/2018 | He | G06F 40/47 |
| 2018/0074663 | A1* | 3/2018 | Alabes | G06Q 10/06316 |
| 2018/0329693 | A1* | 11/2018 | Eksten | G06F 8/65 |
| 2020/0097553 | A1* | 3/2020 | Liu | G06F 40/20 |
| 2021/0240460 | A1* | 8/2021 | Hahn | H04L 67/306 |
| 2021/0335479 | A1* | 10/2021 | Liang | G16H 40/40 |
| 2022/0043671 | A1* | 2/2022 | Vadapandeshwara | G06F 8/35 |
| 2024/0289305 | A1* | 8/2024 | Gupta | G06F 9/546 |

FOREIGN PATENT DOCUMENTS

| | | |
|---|---|---|
| KR | 10-2010-0126939 | 12/2010 |
| KR | 10-2015-0063409 | 6/2015 |
| KR | 10-2021-0116005 | 9/2021 |
| KR | 10-2300005 | 9/2021 |

OTHER PUBLICATIONS

KIPO, Notice of Allowance of KR 10-2023-0101952 dated Jan. 9, 2024, total 6 pages.
KIPO, PCT Search Report of PCT/KR2024/001038 dated May 7, 2024, total 7 pages.
EPO, Search Report of EP 24762237.6 dated Jul. 17, 2025, total 11 pages.

* cited by examiner

Figure 8:
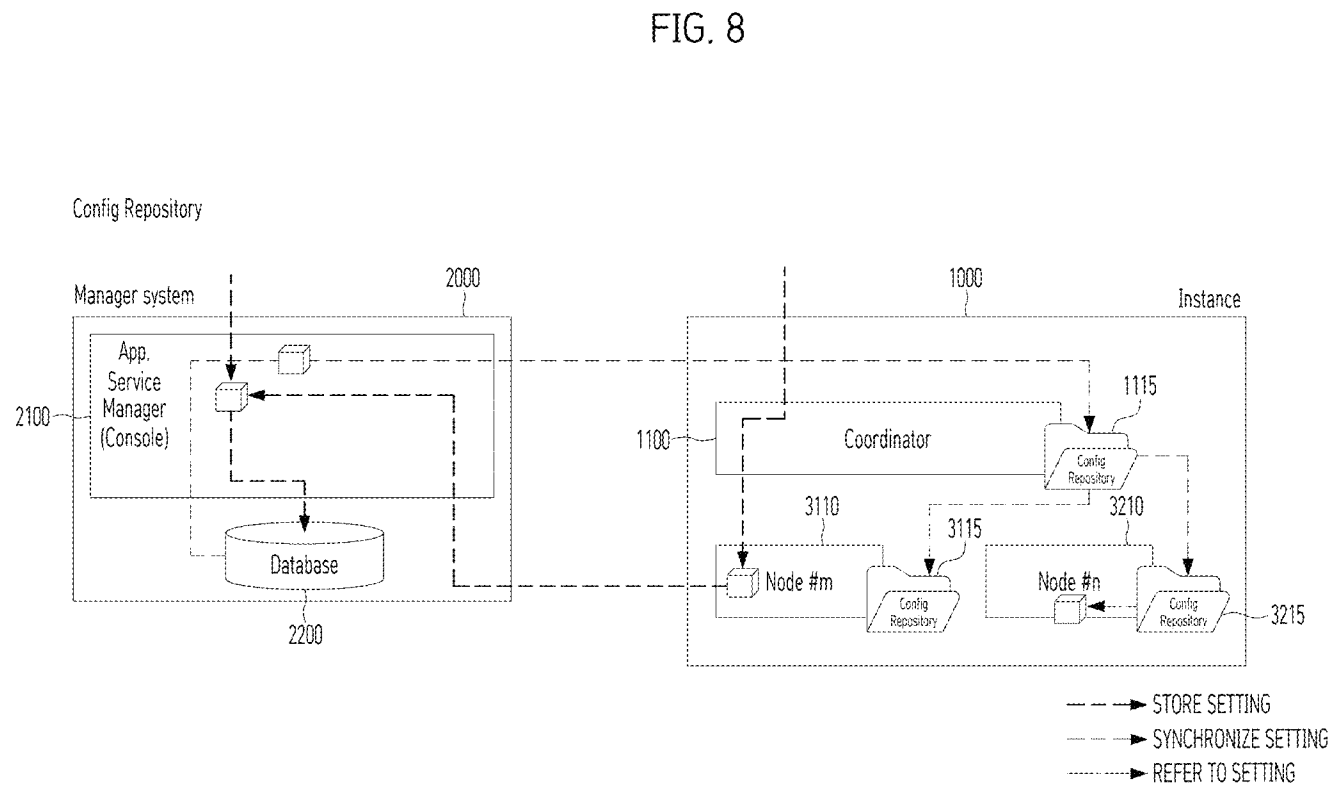

Config Repository

Manager system

App.
Service
Manager
(Console)

2100

2000

Database

2200

Instance

Coordinator

1100

1000

1115

Config Repository

Node #n

3210

3215

Config Repository

3115

Node #m

3110

Config Repository

STORE SETTING

SYNCHRONIZE SETTING

REFER TO SETTING

S110
RECEIVE SERVICE REQUEST FOR APPLICATION PACKAGE FROM CLIENT
(OR PARTNER) USING WORKSPACE

S120
PERFORM AUTHENTICATION OF REQUESTED APPLICATION PACKAGE
BASED ON AUTHENTICATION INFORMATION INCLUDED IN SOFTWARE
BUNDLE RELATED TO WORKSPACE

S130
APPROVE OR REJECT SERVICE REQUEST FOR RECEIVED APPLICATION
PACKAGE ACCORDING TO AUTHENTICATION RESULT

FIG. 24

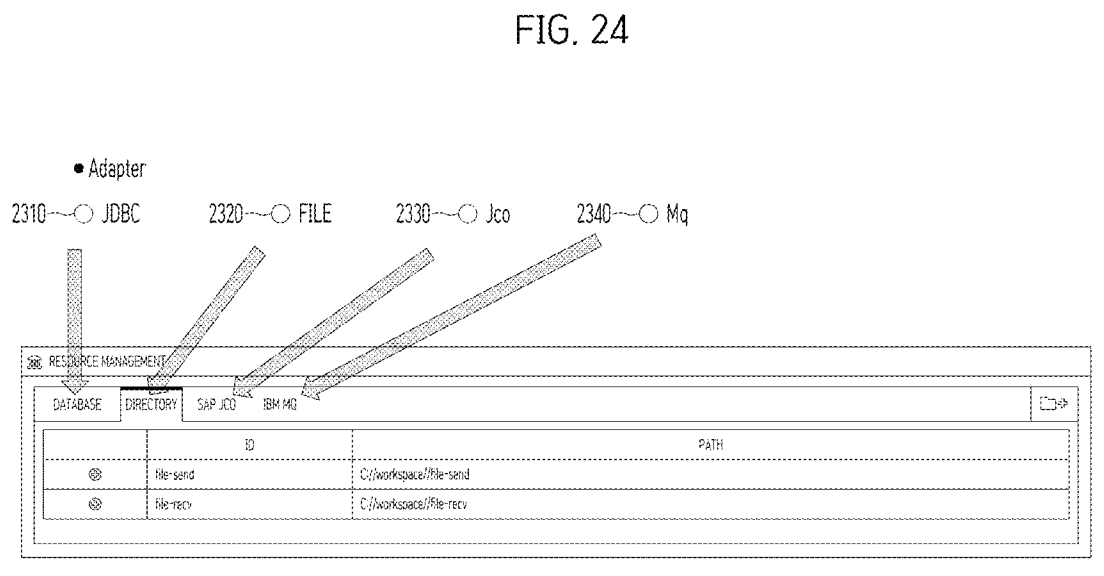

● Adapter

2310 —○ JDBC    2320 —○ FILE    2330 —○ Jco    2340 —○ Mq

| | | RESOURCE MANAGEMENT | | | |
| --- | --- | --- | --- | --- | --- |
| DATABASE | DIRECTORY | SAP JCO | IBM MQ | | |
| | | | ID | | PATH |
| ⊗ | file-send | | | C:/workspace/file-send |
| ⊗ | file-recv | | | C:/workspace/file-recv |

S171

SET CHANNEL INFORMATION TO BE PROVIDED TO FIRST COMPUTING
SYSTEM OUTSIDE PLATFORM BASED ON PLATFORM THAT PROVIDES
ISOLATED WORKSPACE

S175

RECEIVE DATA RELATED TO FIRST COMPUTING SYSTEM ACCORDING
TO SET CHANNEL INFORMATION

S179

PROVIDE RECEIVED DATA RELATED TO FIRST COMPUTING SYSTEM TO
SECOND COMPUTING SYSTEM USING WORKSPACE OUTSIDE PLATFORM

S210

PROVIDE APPLICATION SERVICE MANAGER THAT DEVELOPS
ADAPTER AND WORKSPACE THAT EXECUTES
DEVELOPED ADAPTER

S220

PROVIDE APP STORE THAT SELLS/PURCHASES DEVELOPED
ADAPTER PACKAGE

S230

INSTALL PURCHASED ADAPTER PACKAGE AND PROVIDE
WORKSPACE TO EXECUTE ADAPTER INCLUDED IN
ADAPTER PACKAGE

Figure 34:
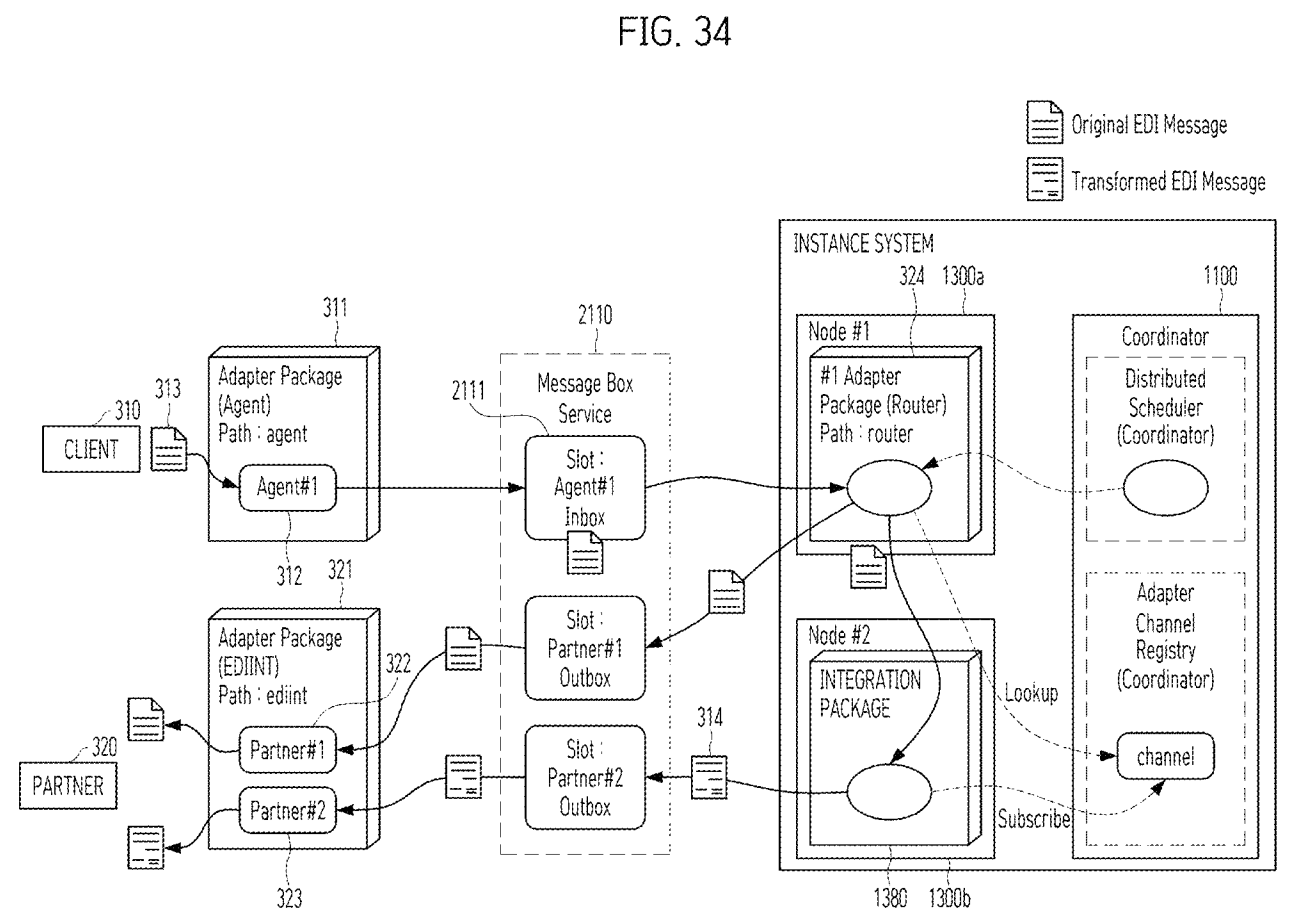

INSTANCE SYSTEM

Coordinator
1100

Distributed Scheduler (Coordinator)

Adapter Channel Registry (Coordinator)

channel

Node #1    324  1300a

1 Adapter Package (Router)
Path : router

Lookup

Node #2    1300b

INTEGRATION PACKAGE 1380    1380b

Subscribe

Original EDI Message
Transformed EDI Message

Message Box Service
2110

2111

Slot : Agent#1 Inbox

Slot : Partner#1 Outbox

Slot : Partner#2 Outbox

314

311    Adapter Package (Agent)
Path : agent

Agent#1

312

313

310    CLIENT

321    Adapter Package (EDIINT)
Path : ediint

322

Partner#1

Partner#2

323

320    PARTNER

Figure 45:
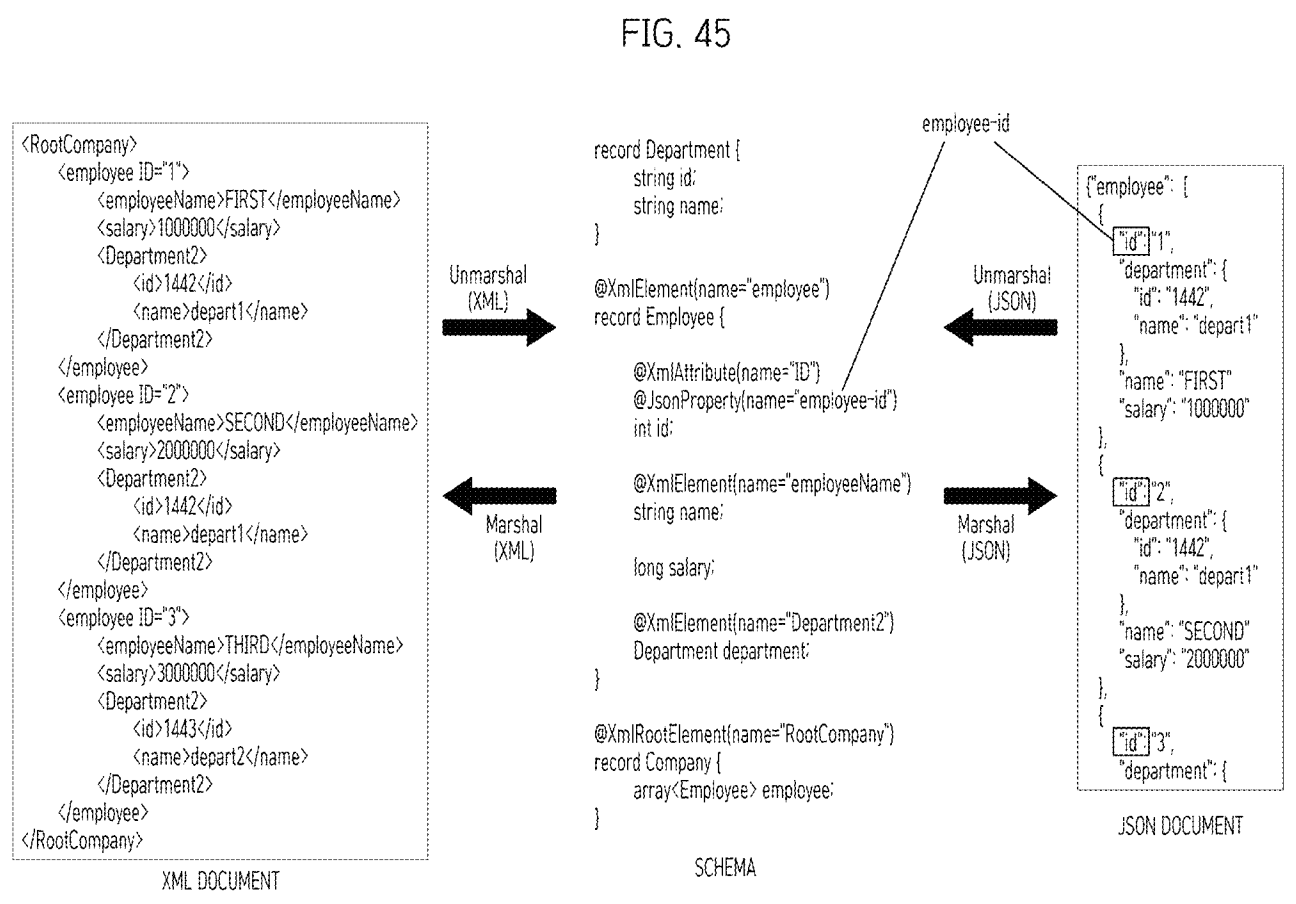

```
record Department {
    string id;
    string name;
}

@XmlElement(name="employee")
record Employee {

@XmlAttribute(name="ID")
    @JsonProperty(name="employee-id")
    int id;

@XmlElement(name="employeeName")
    string name;

long salary;

@XmlElement(name="Department2")
    Department department;
}

@XmlRootElement(name="RootCompany")
record Company {
    array<Employee> employee;
}
```

SCHEMA

```
{"employee": [
    {
        "id": "1",
        "department": {
            "id": "1442",
            "name": "depart1"
        },
        "name": "FIRST",
        "salary": "1000000"
    },
    {
        "id": "2",
        "department": {
            "id": "1442",
            "name": "depart1"
        },
        "name": "SECOND",
        "salary": "2000000"
    },
    {
        "id": "3",
        "department": {
```

JSON DOCUMENT employee-id

Unmarshal (JSON)

Marshal (JSON)

Unmarshal (XML)

Marshal (XML)

```
<RootCompany>
    <employee ID="1">
        <employeeName>FIRST</employeeName>
        <salary>1000000</salary>
        <Department2>
            <id>1442</id>
            <name>depart1</name>
        </Department2>
    </employee>
    <employee ID="2">
        <employeeName>SECOND</employeeName>
        <salary>2000000</salary>
        <Department2>
            <id>1442</id>
            <name>depart1</name>
        </Department2>
    </employee>
    <employee ID="3">
        <employeeName>THIRD</employeeName>
        <salary>3000000</salary>
        <Department2>
            <id>1443</id>
            <name>depart2</name>
        </Department2>
    </employee>
</RootCompany>
```

XML DOCUMENT

FIG. 46

```
for #i in employee {
    employee[#i].id := #i;
    employee[#i].name := employee[#i].name;
    employee[#i].department_id := employee[#i].department.id;
    employee[#i].department_name := employee[#i].department.name;
    employee[#i].salary := employee[#i].salary;
}
```

S501

RECEIVE SOURCE DOCUMENT DATA HAVING FIRST DATA
FORMAT FROM CLIENT

S503

TRANSFORM SOURCE DOCUMENT DATA HAVING FIRST DATA
FORMAT INTO TARGET DOCUMENT DATA HAVING SECOND
DATA FORMAT

S505

TRANSMIT TARGET DOCUMENT DATA HAVING SECOND DATA
FORMAT TO PARTNER

Figure 52:
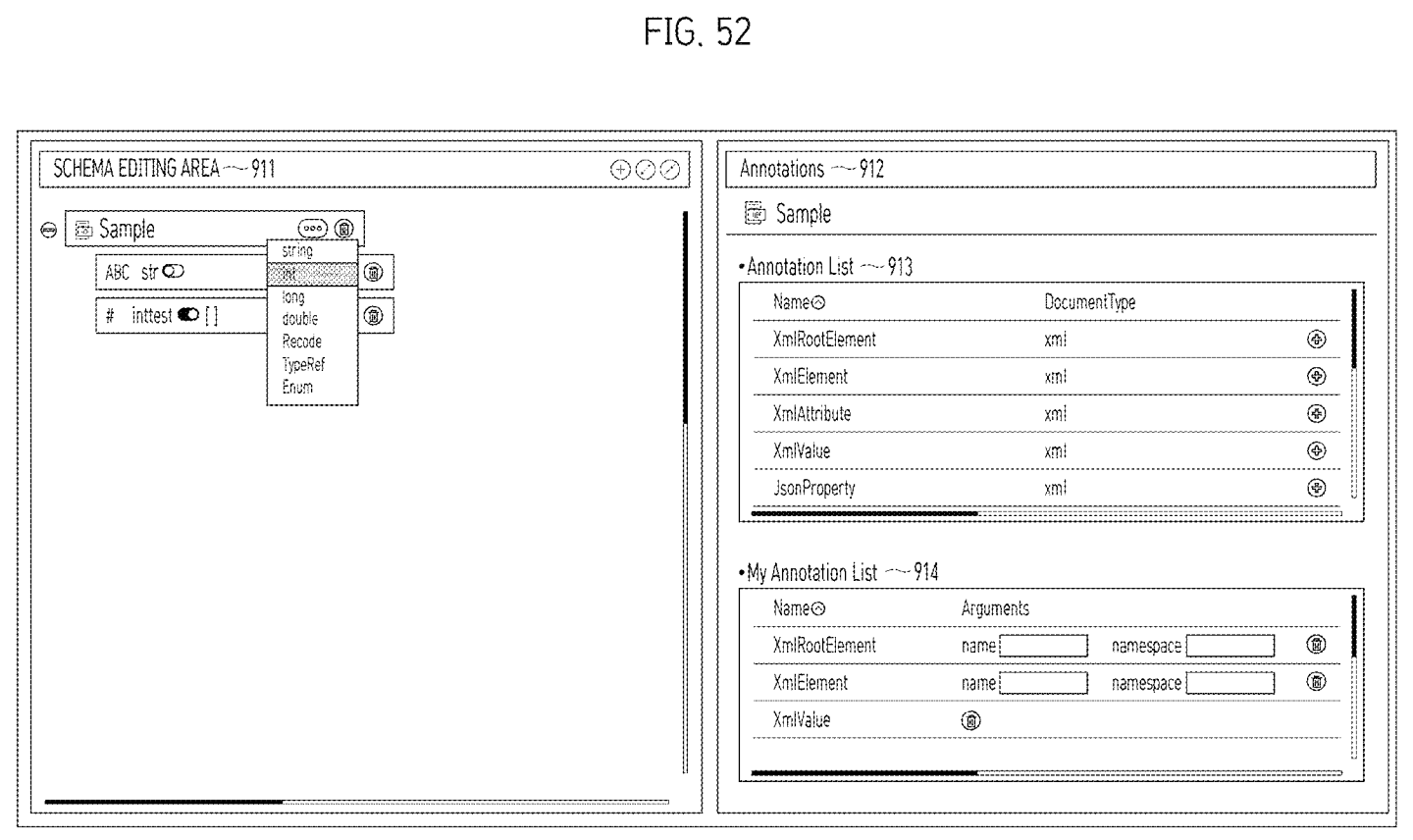

SCHEMA EDITING AREA ~ 911

Sample

ABC  str inttest string
long
double
Recode
TypeRef
Enum

Annotations ~ 912

Sample

• Annotation List ~ 913

| Name | DocumentType |
|------|--------------|
| XmlRootElement | xml |
| XmlElement | xml |
| XmlAttribute | xml |
| XmlValue | xml |
| JsonProperty | xml |

• My Annotation List ~ 914

| Name | Arguments | | |
|------|-----------|---|---|
| XmlRootElement | name | namespace | |
| XmlElement | name | namespace | |
| XmlValue | | | |

FIG. 53

AME Adapter Package (New Map)    Go To Main    Create New Schema    Load From Resource File    Save Resource File Edit
Function >

Function List — 915

| Name | Number of parameters | | |
|------|------|---|---|
| concat | 2 | ✎ | ⊕ |
| eq | 2 | ✎ | ⊕ |
| floor | 1 | ✎ | ⊕ |
| replace | 3 | ✎ | ⊕ |
| sizeOf | 1 | ✎ | ⊕ |
| slit | 2 | ✎ | ⊕ |

⊕

Edit — 916

(💾 Save)

APPARATUS FOR PROVIDING APPLICATION SERVICE, METHOD OF PROVIDING APPLICATION SERVICE, AND STORAGE MEDIUM STORING PROGRAM EXECUTABLE BY COMPUTER PROVIDING APPLICATION SERVICE

TECHNICAL FIELD

The following disclosure relates to an apparatus for providing an application service, a method of providing the application service, and a storage medium storing a program executable by a computer providing the application service.

BACKGROUND ART

According to a transaction between a company and a company or between a company and an individual, information related to the transaction or a document including the information is exchanged.

However, a format or specification of exchange of the document or the information that needs to be included in the document may vary depending on the company, and the format of the document, internal request content, or a wring method is different depending on the various types of transactions. Therefore, various software has been developed.

Such software may aid in entering and exchanging information necessary for a transaction in a standardized form between several companies, such as electronic document exchange. As this method of electronic document exchange has become more common, when a standardized method is prescribed to change the document into a standardized electronic document, thereby exchanging, accumulating, and processing the document using computers of transaction parties, it is possible to reduce time and effort.

However, there has been inconvenience in that software that creates a standardized electronic document frequently has to be individually changed depending on the transaction parties, the transaction pattern, and the format and content of the transaction.

In the case of a new company in the market, it may be difficult to prepare a standardized form and format required by existing transaction parties. Since there are a lot of complex transaction patterns and requirements in the market, it may be difficult to activate a transaction due to a problem such as difficulty in understanding or following such a standardized transaction format.

In addition, when the transaction parties use incompatible software or have separate software in incompatible systems, there are technical inconveniences such as having to develop software for the transaction or having to install software suitable for the system.

Further, even when an application service is provided using the same software image, there is difficulty in providing an efficient service, as all versions and types of software packages need to be prepared and provided for each client.

In particular, even when a problem occurs in a server or computing resource used by the transaction parties, the entire system needs to be able to continue to operate without interruption, and there is a need for the system to be able to flexibly respond to increases in the number of users or amount of data.

DISCLOSURE

Technical Problem

The disclosed embodiments are intended to solve the above inconvenient problems, and it is possible to provide an apparatus for providing an application service, a method of providing the application service, and a storage medium storing a program executable by a computer providing the application service to support non-disruptive scale-out through distributed package replication and distributed channel communication.

Technical Solution

A disclosed embodiment provides a method of providing an application service, the method including: receiving a channel request for transmitting and receiving information from a client in a computing system configured to manage a platform for providing the client with workspaces isolated from each other in which application packages are executed; and providing, by the client, a platform service for transforming the application packages in the workspaces, wherein the providing a platform service includes: receiving source document data having a first data format from the client; transforming the source document data having the first data format into target document data having a second data format; and transmitting the target document data having the second data format to a partner.

The providing a platform service may include receiving, from the client, a service request for the application packages; authenticating the requested application packages based on authentication information included in a software bundle related to the workspaces; and providing a service for the received application packages according to a result of the authentication.

The providing a platform service may include setting channel information to be provided to a first computing system outside the platform based on the platform for providing the isolated workspaces; receiving data collected in relation to the first computing system according to the set channel information; and providing the collected data to a second computing system using the isolated workspaces.

The providing a platform service may include providing the client with an application service manager for developing an adapter package; providing the client with a first workspace for testing the developed adapter package; and providing the client with a second workspace for executing the developed adapter package.

The providing a platform service may include receiving a request to upload the application packages to an app store from the client; approving upload of the application packages to the app store based on a predefined approval determination condition for the application packages in response to the upload request; and providing the approved application packages in the app store.

The providing a platform service may include receiving a message including an authentication key of a client company for an internal system of the client from the client; identifying the client company based on the authentication key; and providing a service based on the message for the identified client company.

The providing a platform service may include providing a user interface including a development tool palette and a graphical user interface (GUI) block area to the client; creating a first function block corresponding to a first graphic block in response to receiving a signal from the client to select the first graphic block included in the development tool palette by a user; and outputting the created first function block to the GUI block area.

A disclosed embodiment provides an apparatus for providing an application service, the apparatus including: a database configured to store data; and a processor configured to process the data, wherein the processor is configured to: receive a channel request for transmitting and receiving information from a client in a computing system configured to manage a platform for providing the client with workspaces isolated from each other in which application packages are executed, receive source document data having a first data format from the client, transform the source document data having the first data format into target document data having a second data format, and transmit the target document data having the second data format to a partner.

A disclosed embodiment provides a storage medium storing a computer-executable program for providing an application service, the computer-executable program performing: receiving a channel request for transmitting and receiving information from a client in a computing system configured to manage a platform for providing the client with workspaces isolated from each other in which application packages are executed; and providing, by the client, a platform service for transforming the application packages in the workspaces, wherein the providing a platform service includes: receiving source document data having a first data format from the client, transforming the source document data having the first data format into target document data having a second data format, and transmitting the target document data having the second data format to a partner.

Advantageous Effects

According to the disclosed embodiments, it is possible to solve technical inconvenience for transactions and to further activate transactions.

According to the disclosed embodiments, even when a standardized form for an existing transaction is not prepared or there is a complex transaction requirement, market transactions may be technically activated using software.

According to the disclosed embodiments, a convenient transaction system may be provided even when transaction parties use incompatible software or have separate software in incompatible systems.

According to the disclosed embodiments, there is an advantage that a mapping program may be defined relatively easily even when a user is unfamiliar with a development script.

According to the disclosed embodiments, developers may easily implement and manage complex mapping logic through a user-friendly interface and a visual programming method.

According to the disclosed embodiments, by distributing software packages to a plurality of worker nodes (physical servers), an actual service may be provided without interruption even when one worker node fails.

4

Figure 5:
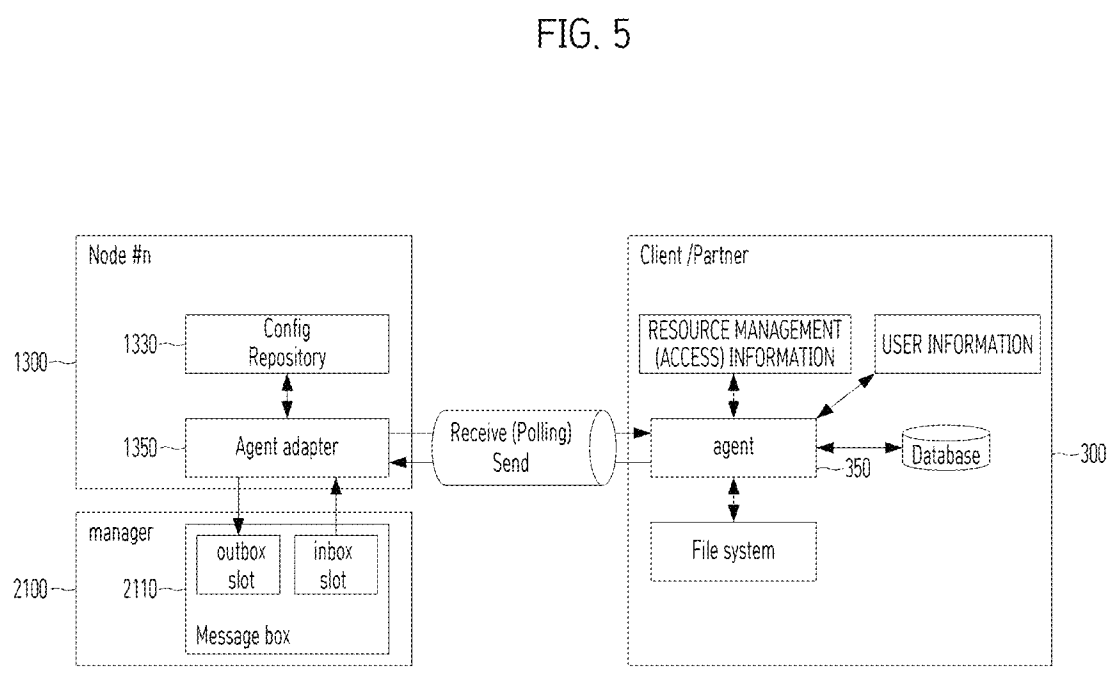
Figure 6:
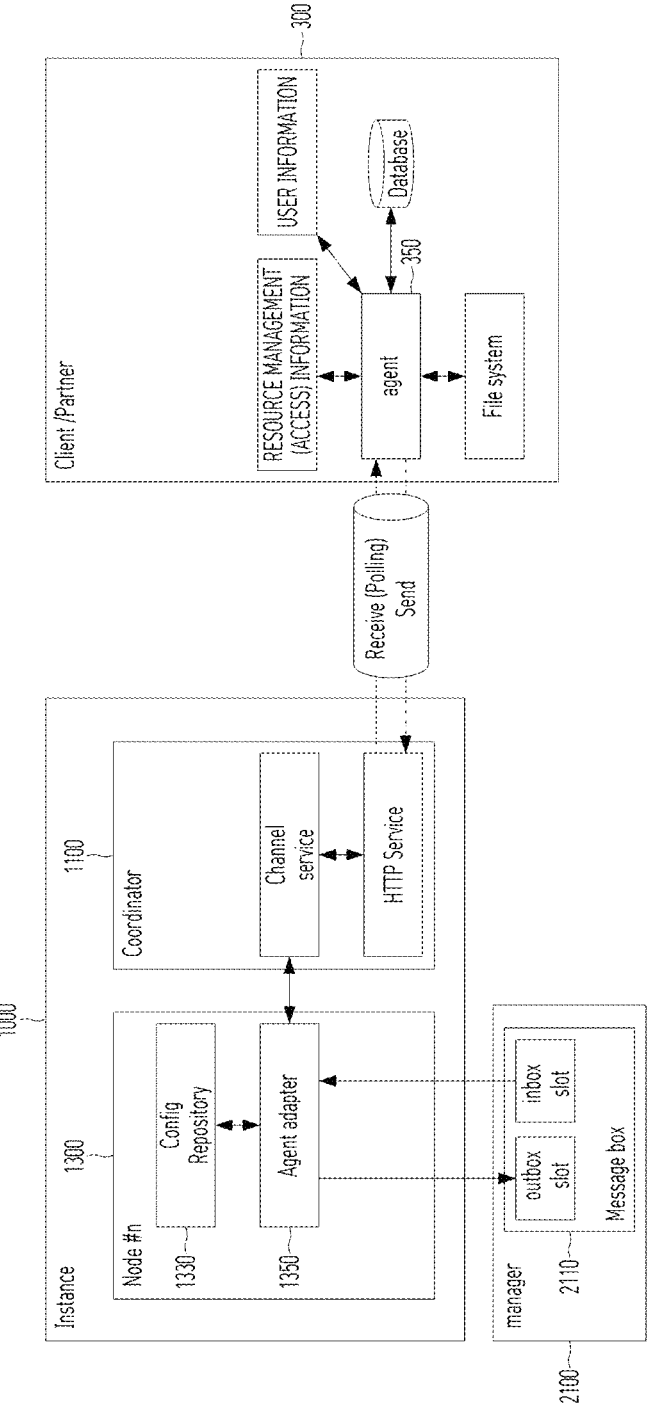
Figure 7:
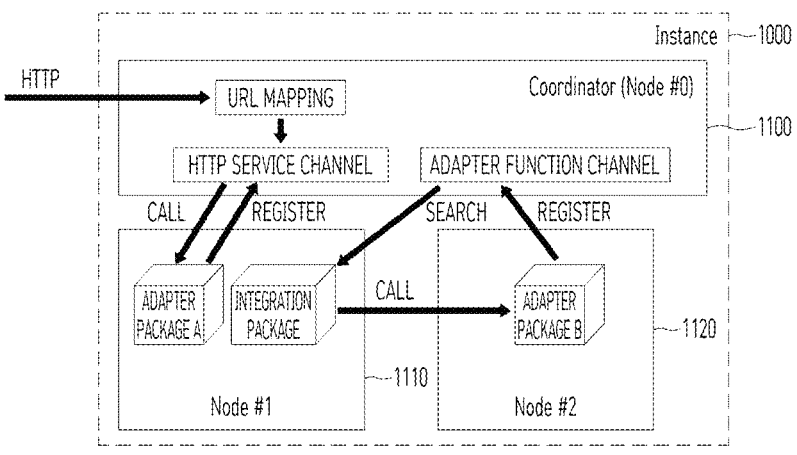
Figure 10:
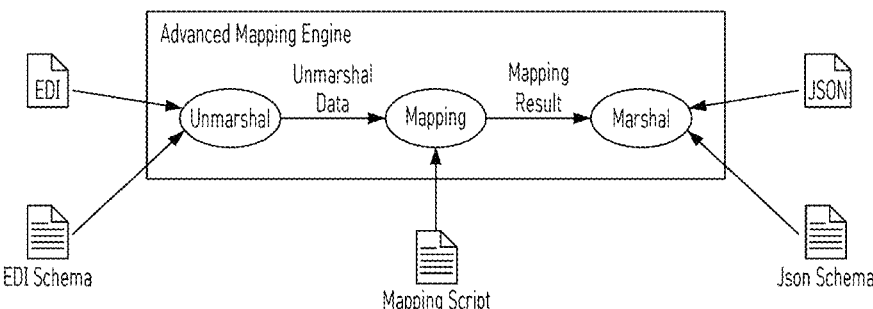
Figure 12:
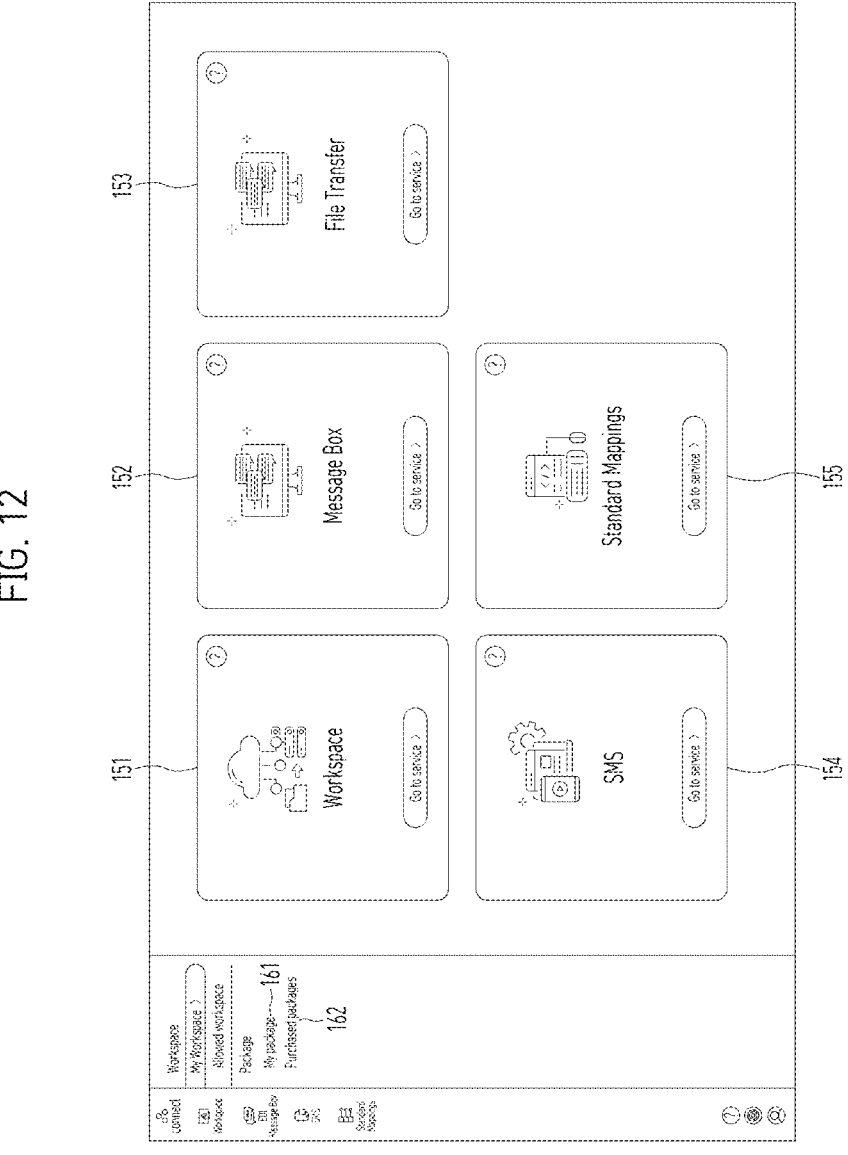
Figure 14:
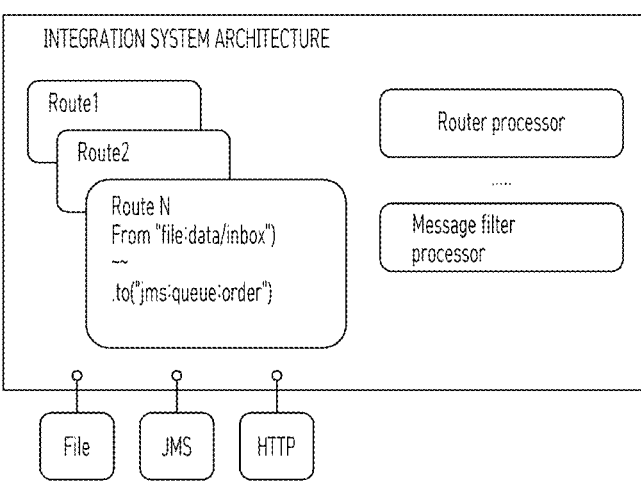
Figure 15:
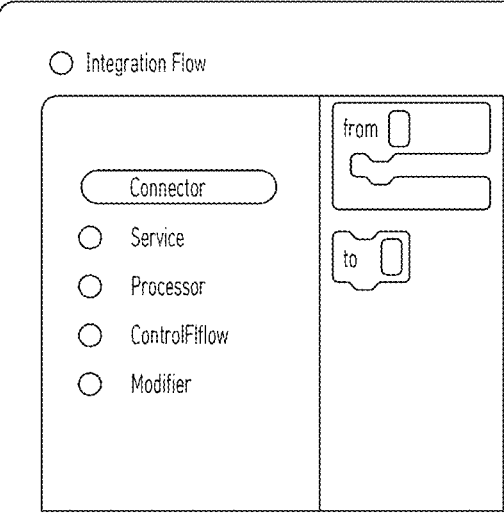
Figure 17:
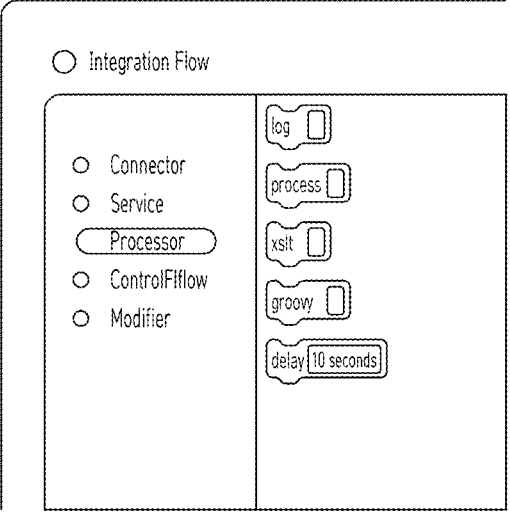
Figure 18:
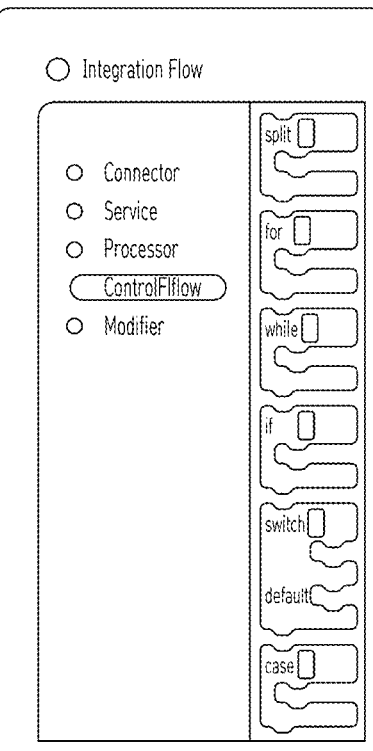
Figure 19:
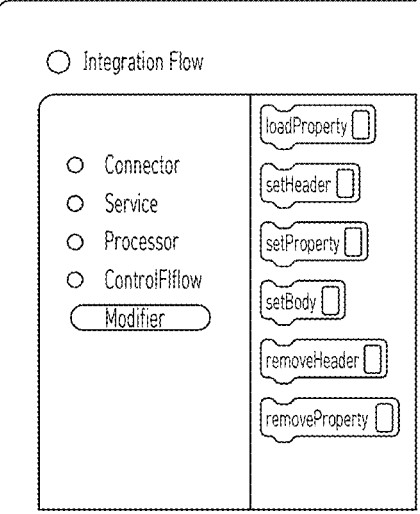
Figure 20:
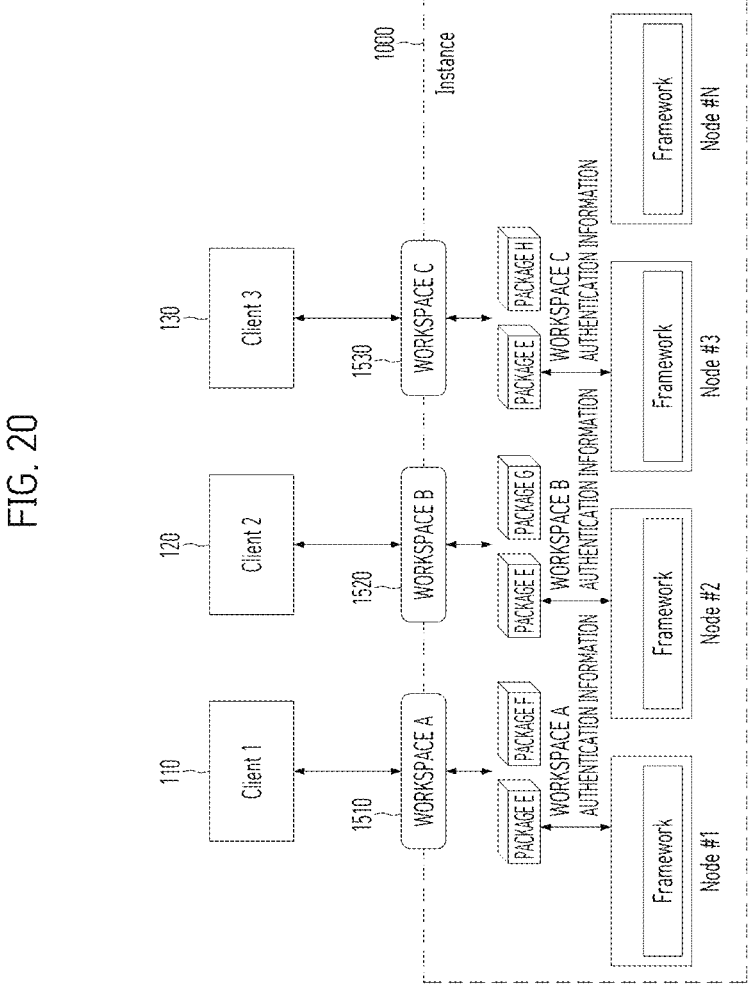
Figure 21:
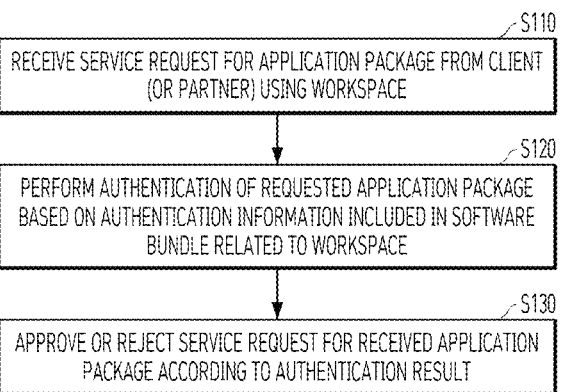
Figure 22:
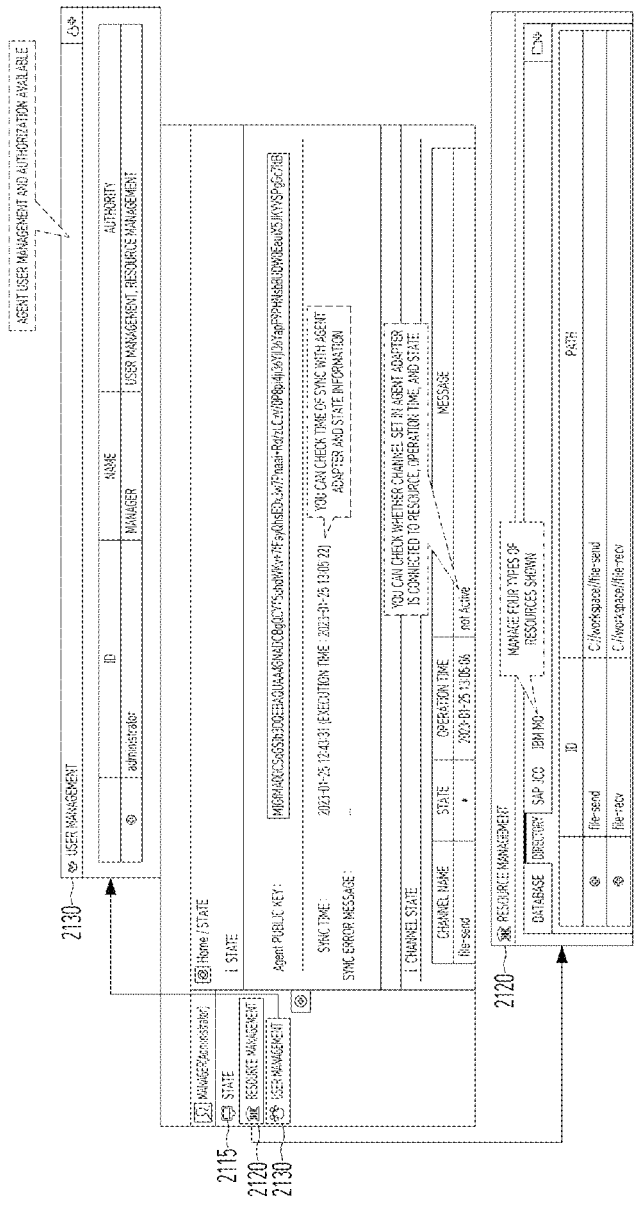
Figure 23:
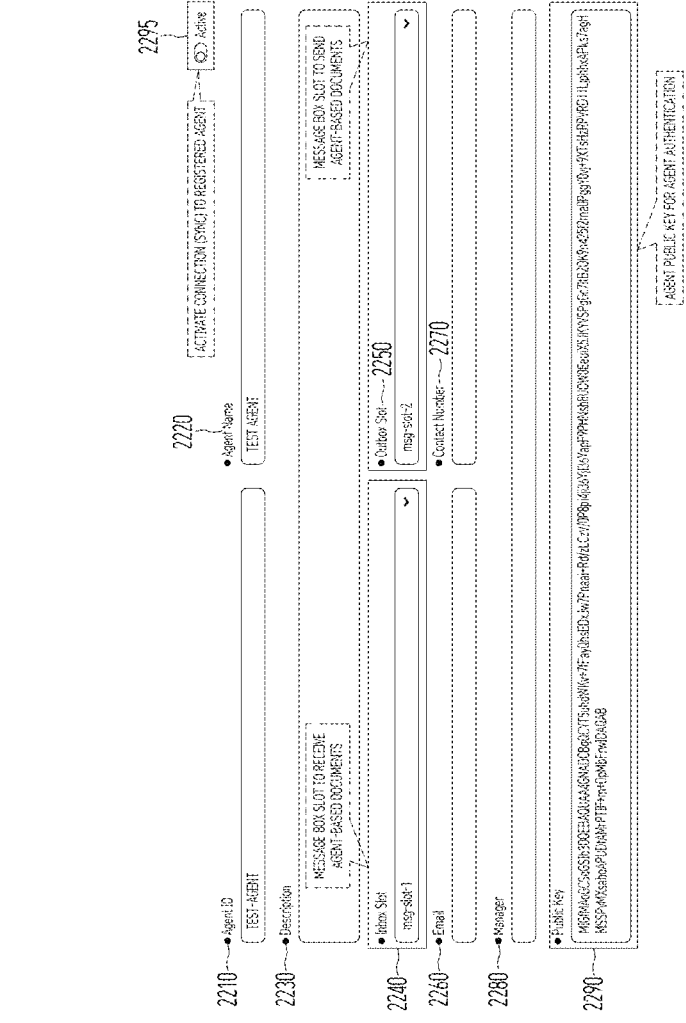
Figure 25:
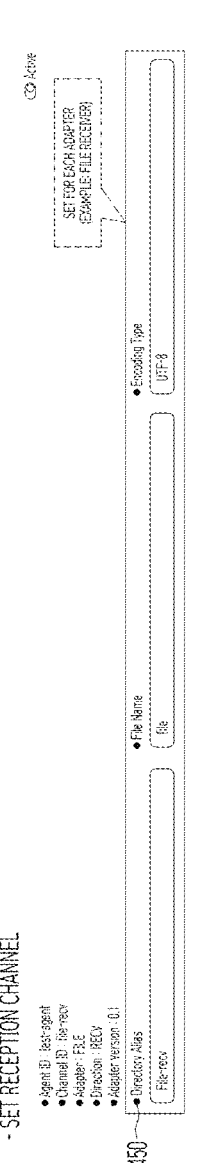
Figure 26:
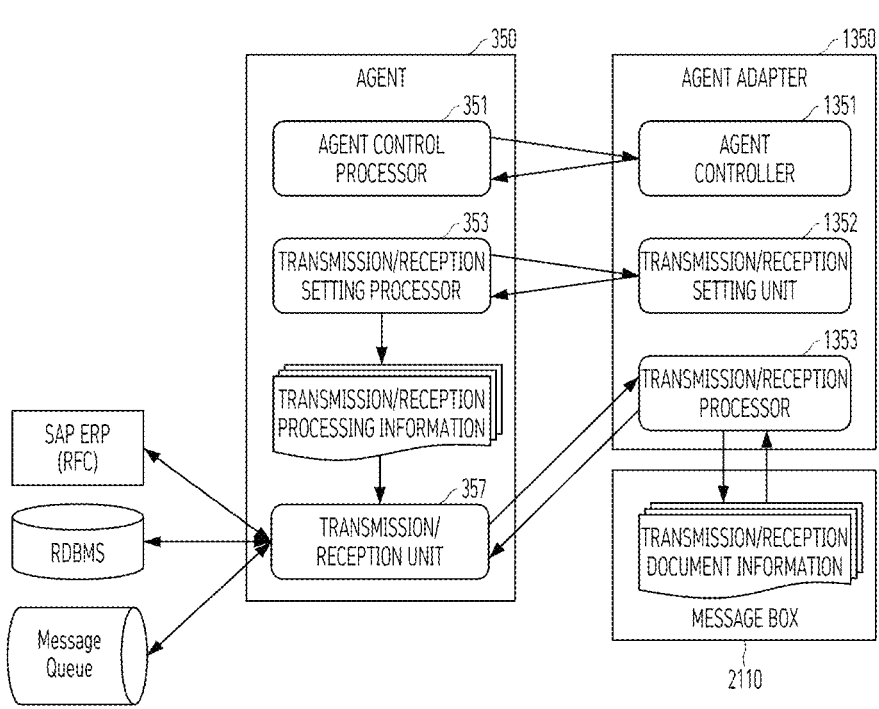
Figure 27:
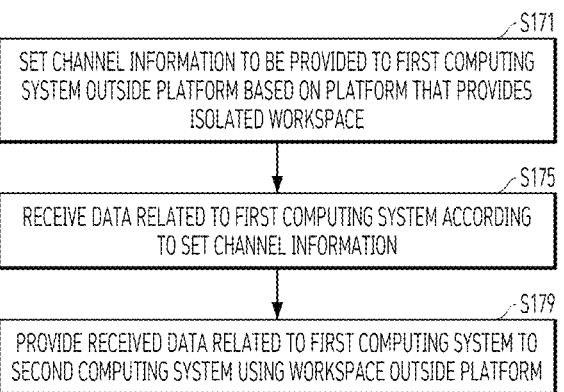
Figure 28:
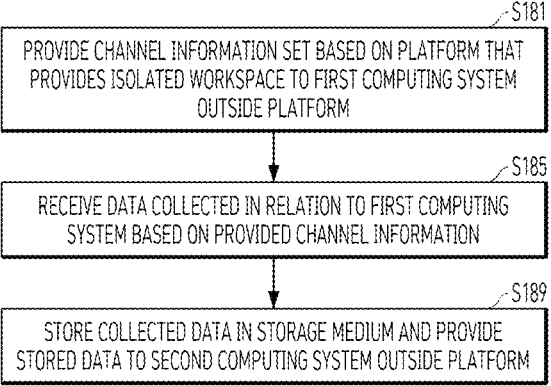
Figure 29:
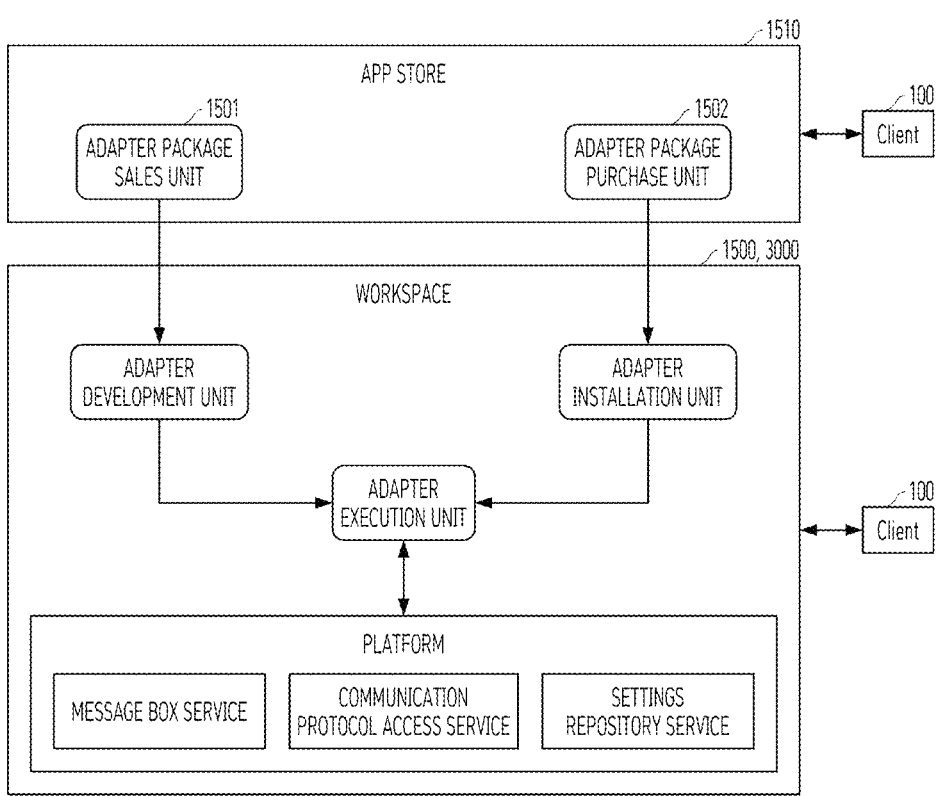
Figure 30:
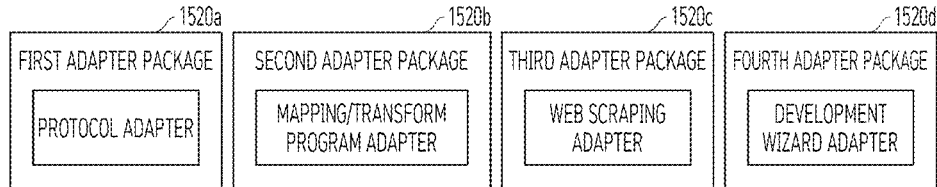
Figure 31:
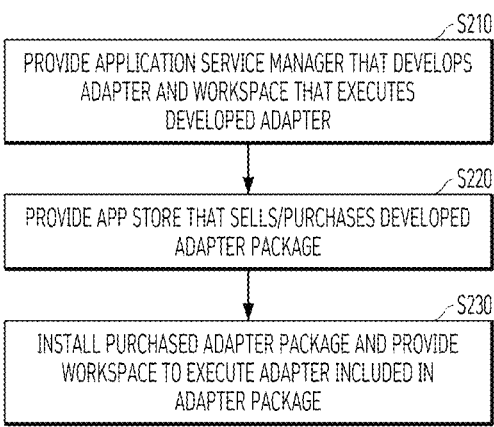
Figure 35:
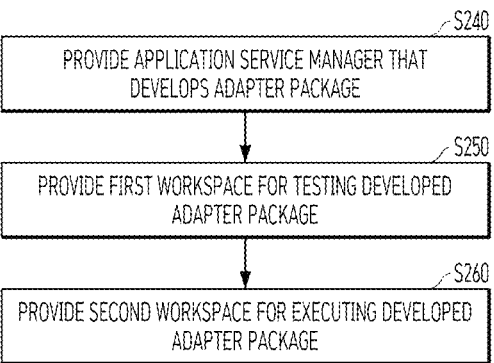
Figure 36:
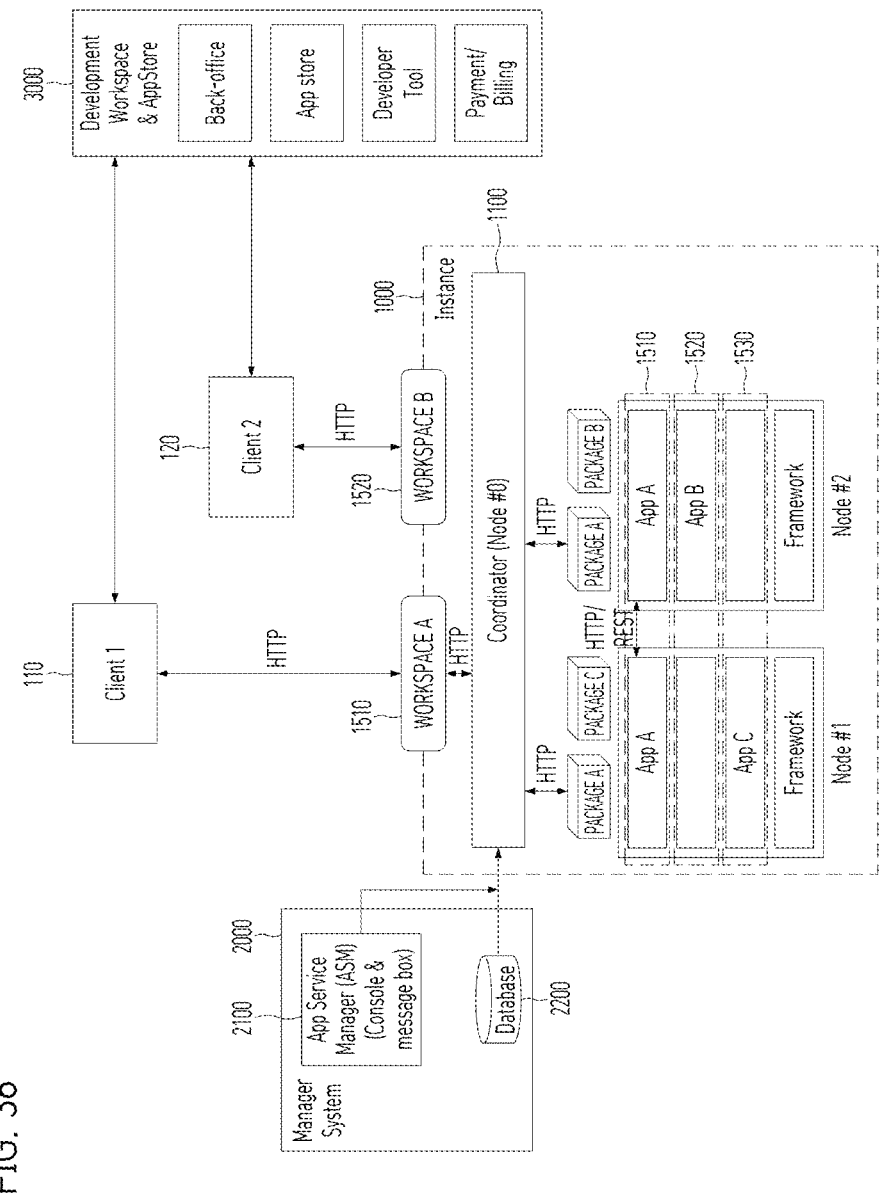
Figure 37:
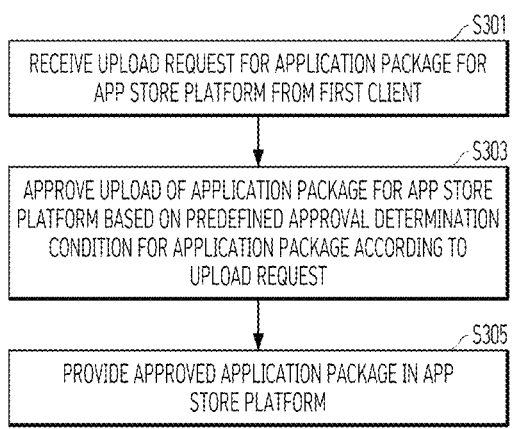
Figure 38:
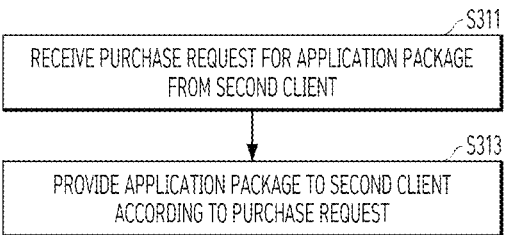
Figure 39:
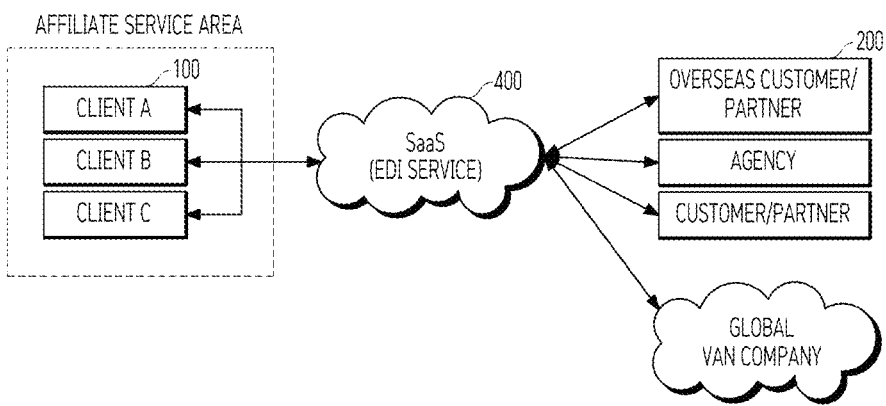
Figure 41:
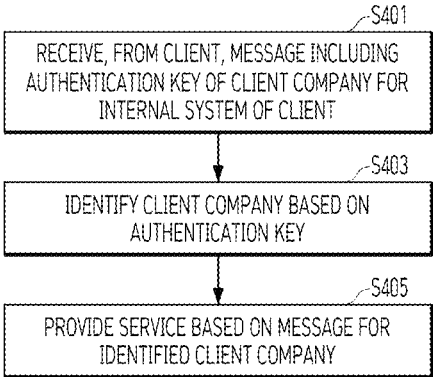
Figure 42:
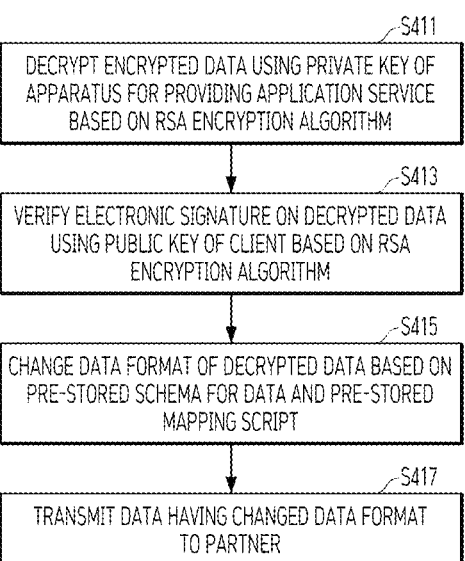
Figure 43:
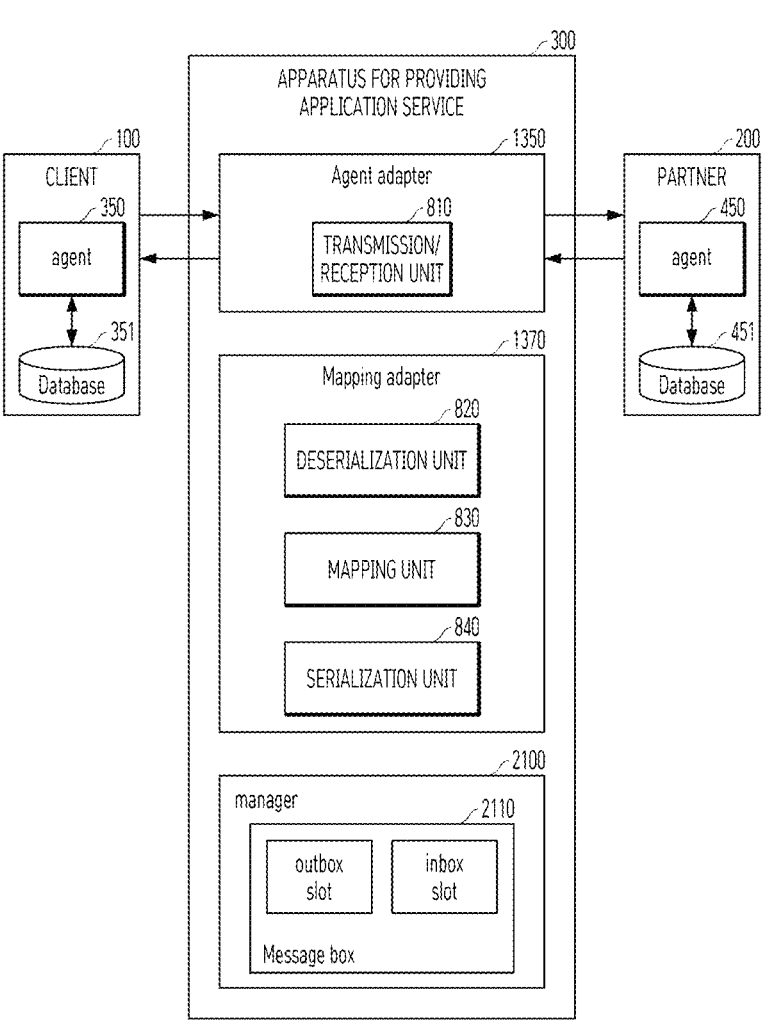
Figure 44:
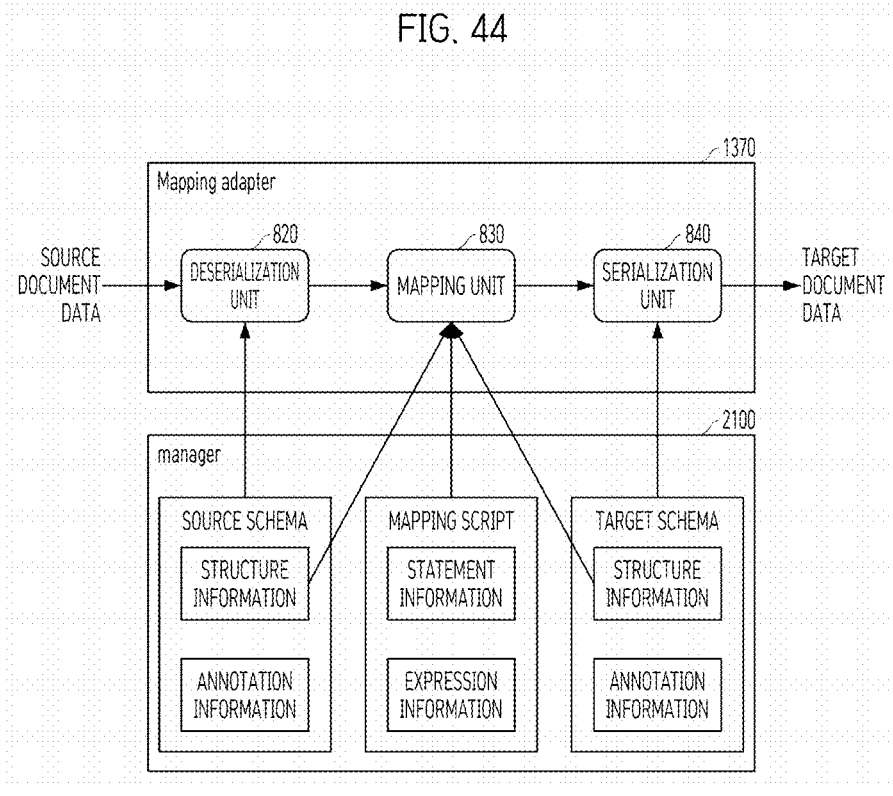
Figure 47:
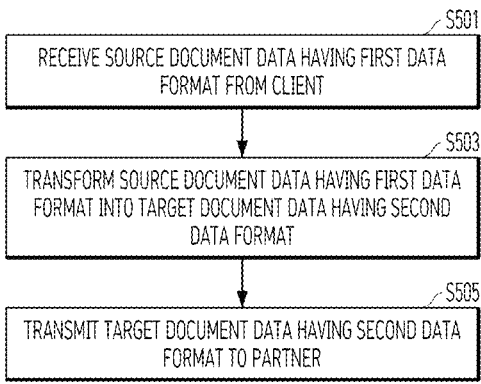
Figure 48:
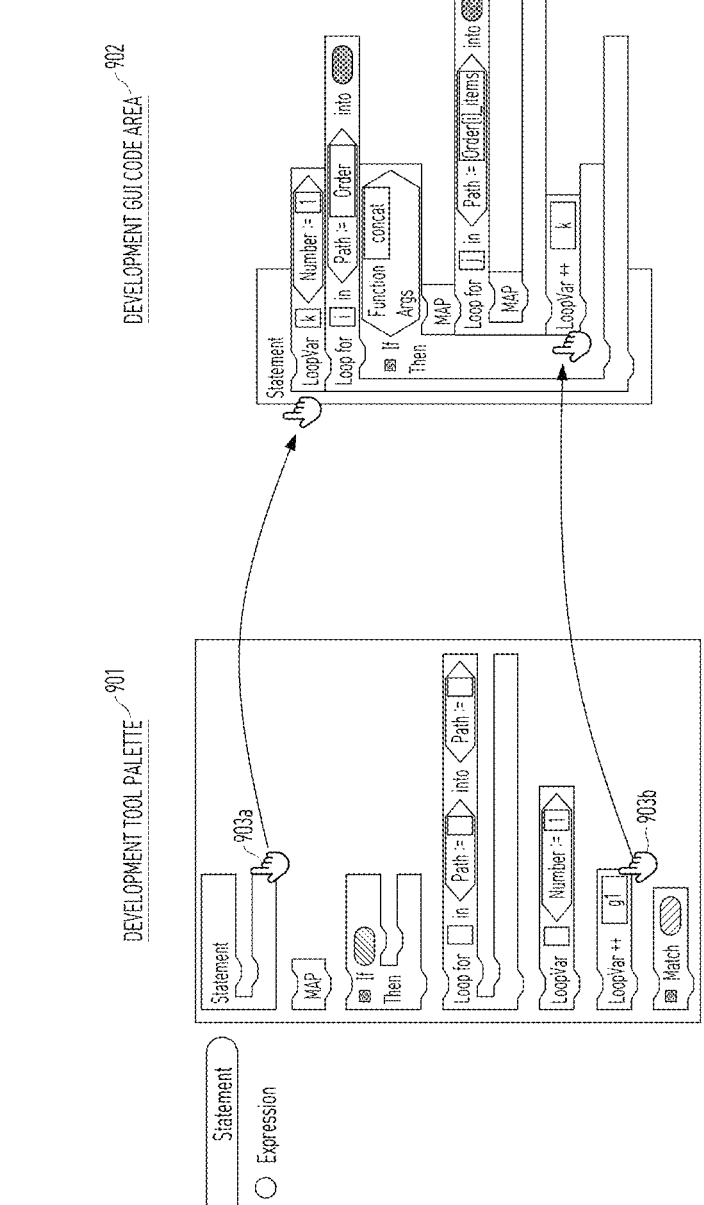
Figure 49:
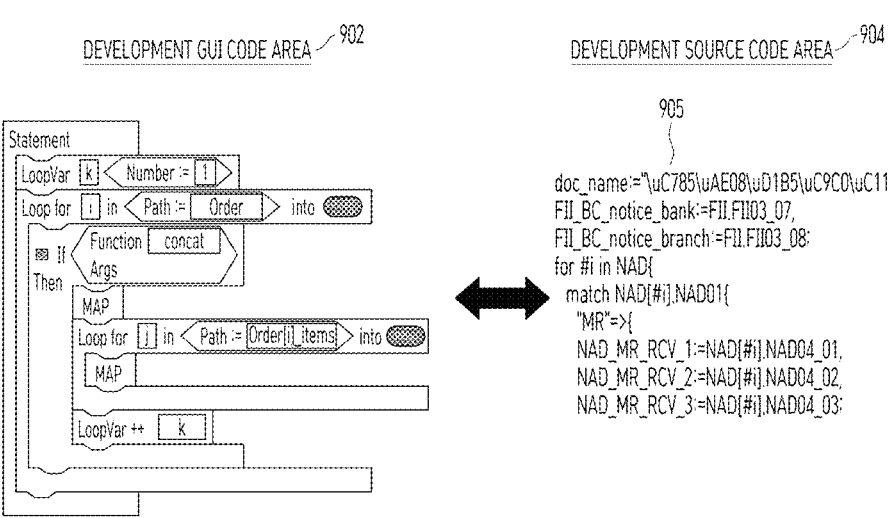
Figure 54:
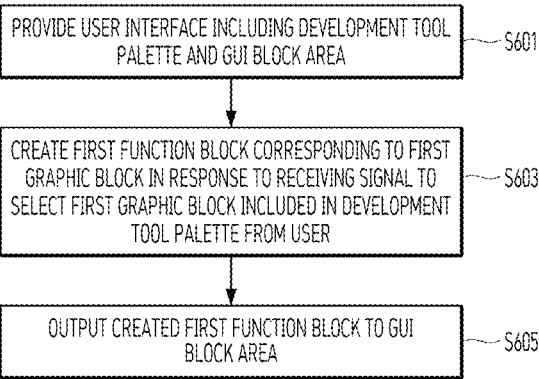

FIG. 5 is a diagram disclosing a concept in which the apparatus for providing the application service sets a channel between an instance and a client or a partner according to an embodiment;

FIG. 6 is a diagram disclosing a specific example in which the apparatus for providing the application service sets a channel between the instance and the client or the partner according to an embodiment;

FIG. 7 is a diagram disclosing an example of setting a distributed channel and receiving a service according to an embodiment;

FIG. 8 is a diagram disclosing an example of managing setting information of an installed package according to an embodiment;

Figure 9:
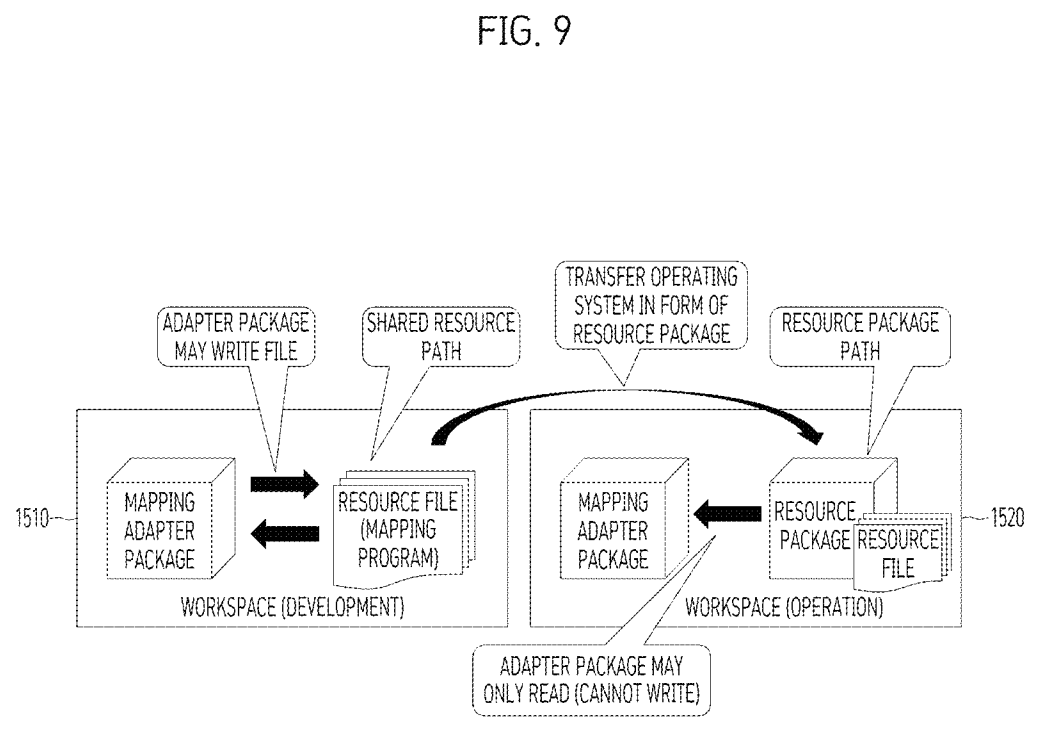

FIG. 9 is a diagram disclosing an example of managing and using a package according to a workspace of the disclosed embodiments;

FIG. 10 is a diagram disclosing an example of mapping EDI information as a type of application service according to an embodiment;

Figure 11:
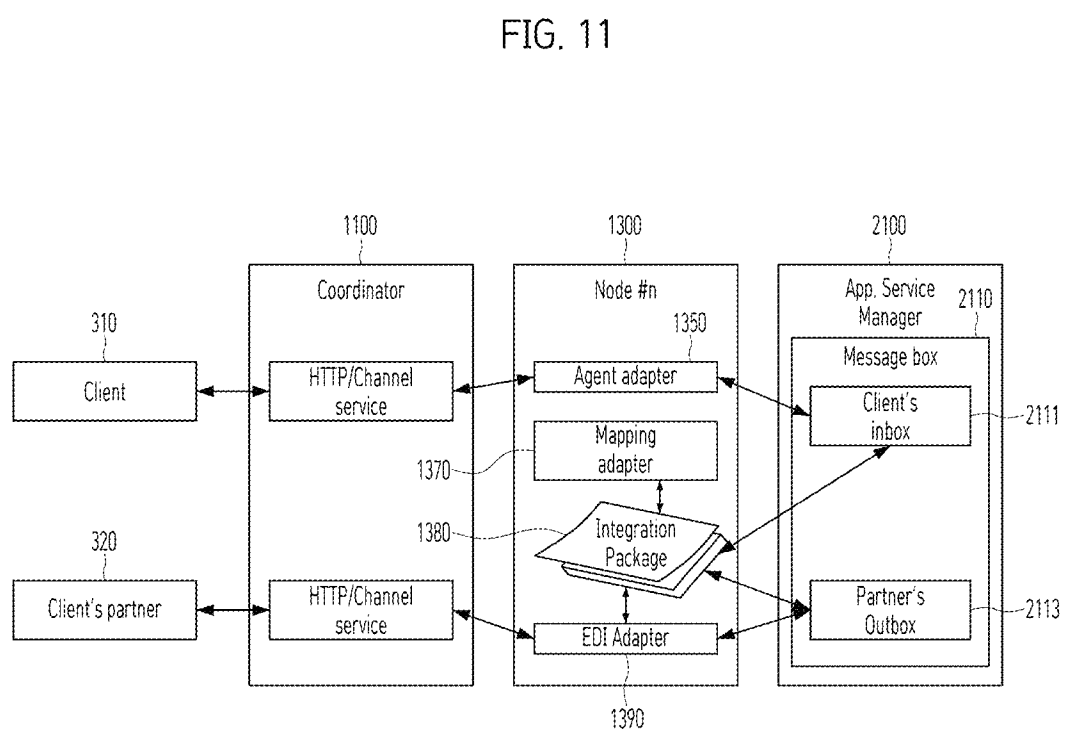

FIG. 11 is a diagram disclosing an example of providing the application service using an integration package according to an embodiment;

FIG. 12 is a diagram illustrating an example of an interface of a platform according to a disclosed example of providing the application service;

Figure 13:
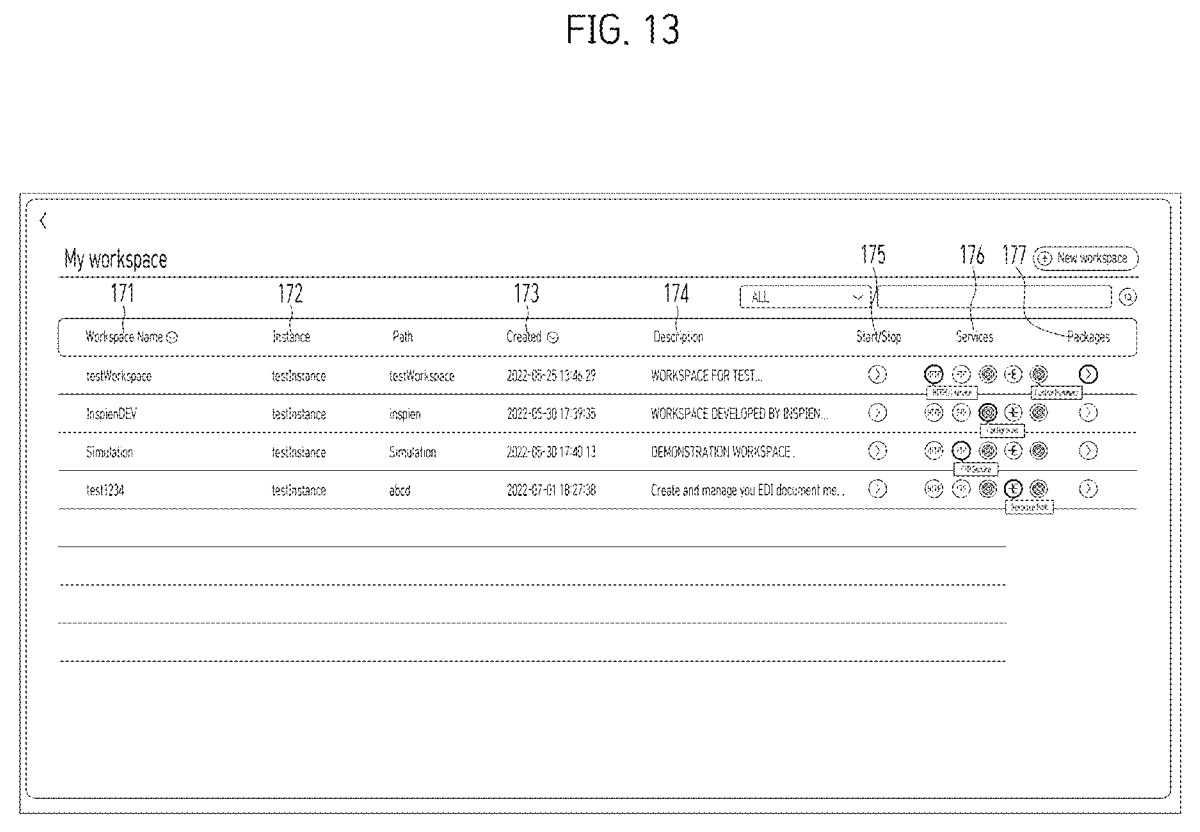

FIG. 13 is a diagram illustrating another example of the interface of the platform according to the disclosed example of providing the application service;

FIG. 14 is a diagram disclosing an example in which the apparatus for providing the application service provides a framework capable of integrating different systems according to an embodiment;

FIG. 15 is a diagram illustrating an example of coding a connector among integration flow functions based on graphics when developing an integration flow based on an embodiment;

Figure 16:
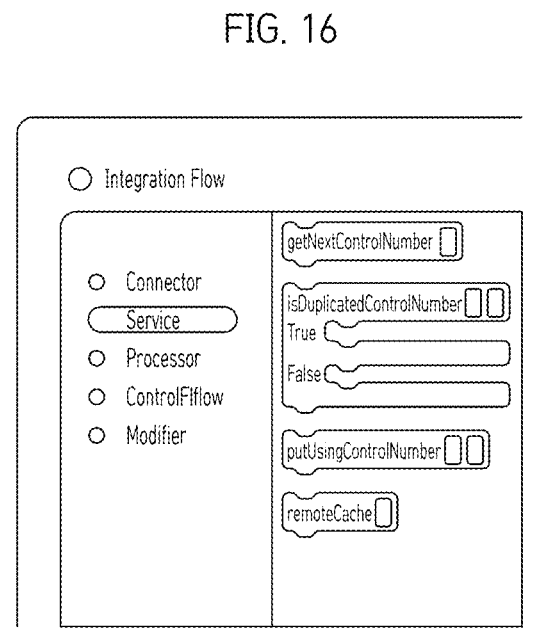

FIG. 16 is a diagram illustrating an example of coding a service among the integration flow functions based on graphics when developing the integration flow based on an embodiment;

FIG. 17 is a diagram illustrating an example of coding a processor among the integration flow functions based on graphics when developing the integration flow based on an embodiment;

FIG. 18 is a diagram illustrating an example of coding a control flow among the integration flow functions based on graphics when developing the integration flow based on an embodiment;

FIG. 19 is a diagram illustrating an example of coding a modifier among the integration flow functions based on graphics when developing the integration flow based on an embodiment;

FIG. 20 is a diagram disclosing an example of providing a unique workspace isolated depending on the client according to an embodiment;

FIG. 21 is a flowchart disclosing an example of providing a package to the client from the isolated workspace according to an embodiment;

FIG. 22 is a diagram illustrating an interface of an agent provided by a platform in an instance system when the agent is executed according to an embodiment;

FIG. 23 is a diagram illustrating an example of an interface of an agent adapter provided by the platform of the instance system according to an embodiment;

FIG. 24 is a diagram illustrating another example of the interface of the agent adapter provided by the platform of the instance system according to an embodiment;

FIG. 25 is a diagram illustrating an example in which the agent adapter of the platform of the instance system sets a transmission/reception channel according to an embodiment;

FIG. 26 is a diagram disclosing an example of transmitting EDI data, which is transaction information, using the platform of the instance system according to an embodiment;

FIG. 27 is a diagram disclosing an example in which the platform of the instance system provides data to a client system according to an embodiment;

FIG. 28 is a diagram disclosing an example in which the platform of the instance system receives data from a partner system according to an embodiment;

FIG. 29 is a diagram disclosing an embodiment of executing an adapter in the workspace according to an embodiment;

FIG. 30 is a diagram disclosing an example of an adapter package;

FIG. 31 is a diagram disclosing an example of executing the adapter in the workspace according to an embodiment;

Figure 32:
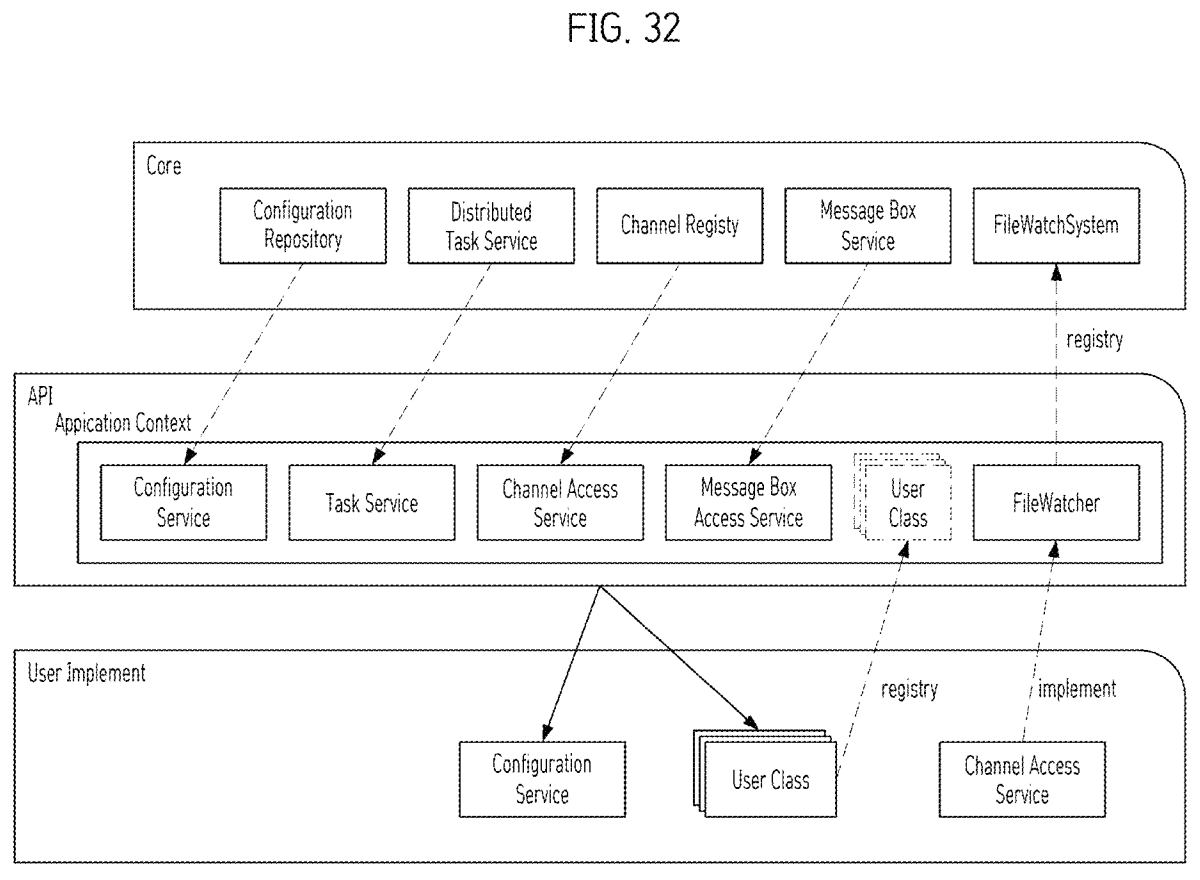

FIG. 32 is a diagram disclosing an example in which the adapter uses the framework according to an embodiment;

Figure 33:
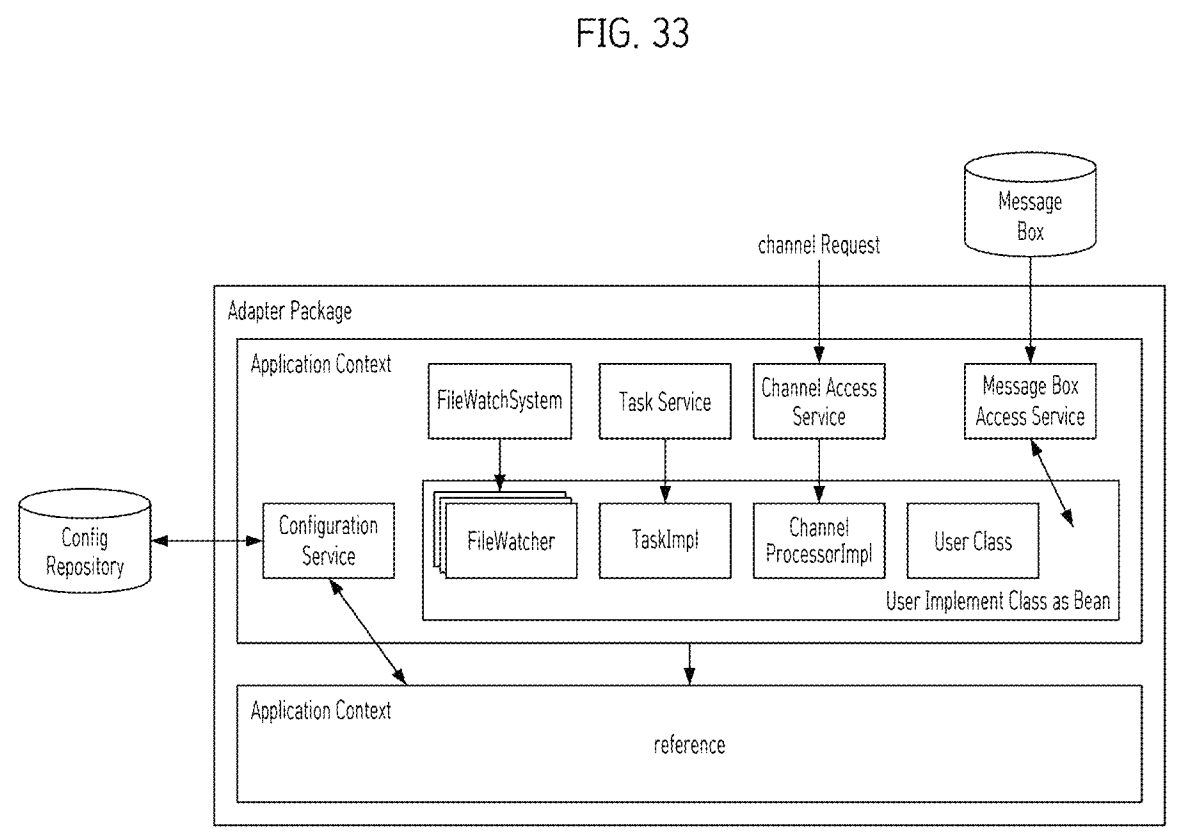

FIG. 33 is a diagram disclosing an example of a service provided by the adapter package according to an embodiment;

FIG. 34 is a diagram disclosing an example of the adapter developed in the workspace according to an embodiment;

FIG. 35 is a diagram disclosing an example of providing the framework for developing the adapter package according to an embodiment;

FIG. 36 is a diagram disclosing an example in which the apparatus for providing the application service provides an application package in an app store platform according to an embodiment;

FIG. 37 is a flowchart disclosing another embodiment of the method of providing the application service according to an embodiment;

FIG. 38 is a flowchart disclosing another embodiment of the method of providing the application service according to an embodiment;

FIG. 39 is a diagram disclosing an example in which the apparatus for providing the application service provides a service for the application package according to an embodiment;

Figure 40:
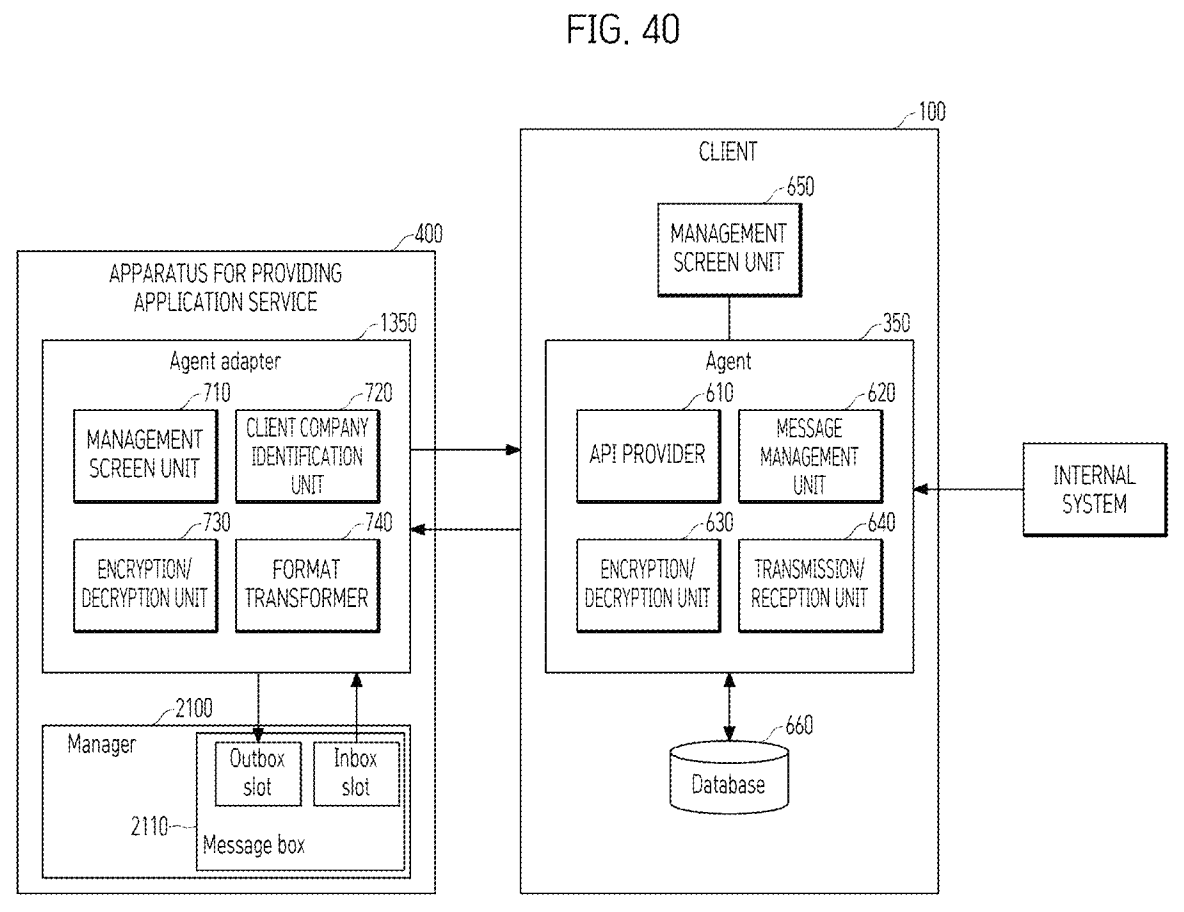

FIG. 40 is a diagram disclosing another example in which the apparatus for providing the application service provides the service for the application package according to an embodiment;

FIG. 41 is a flowchart disclosing an example of the method of providing the application service according to an embodiment;

FIG. 42 is a flowchart disclosing an example in which the method of providing the application service provides a service according to an embodiment;

FIG. 43 is a diagram disclosing an example in which the apparatus for providing the application service transforms a data format according to an embodiment;

FIG. 44 is a diagram disclosing an example in which the apparatus for providing the application service transforms the data format using a schema and a mapping script according to an embodiment;

FIG. 45 is a diagram disclosing an example of deserialization and serialization based on the schema according to an embodiment;

FIG. 46 is a diagram disclosing an example of the mapping script according to an embodiment;

FIG. 47 is a flowchart disclosing an example in which the method of providing the application service transforms the data format according to an embodiment;

FIG. 48 is a diagram disclosing an example of providing a user interface for developing a mapping flow in the disclosed embodiments;

FIG. 49 is a diagram disclosing an example of providing the user interface for developing the mapping flow in the disclosed embodiments;

Figure 50:
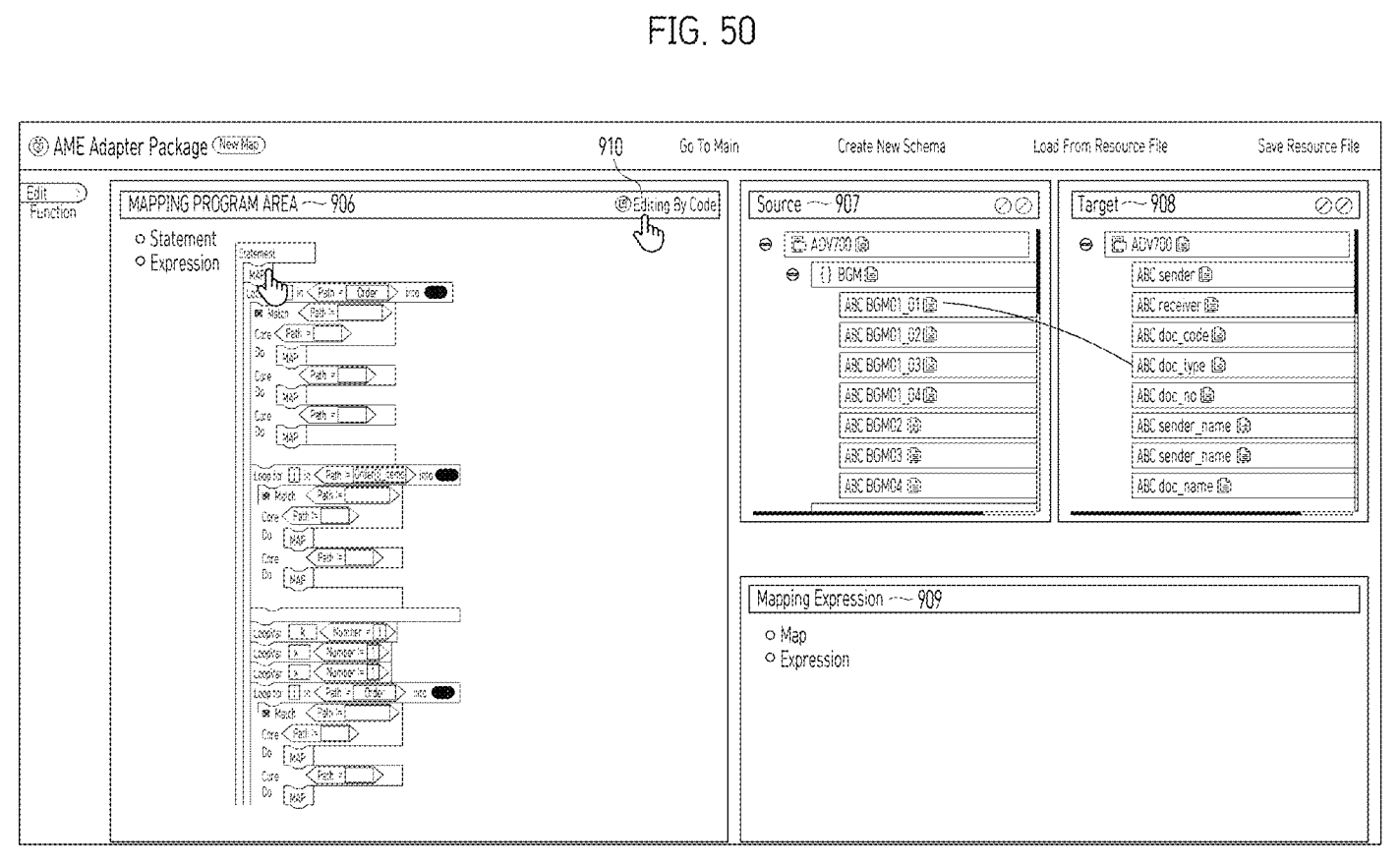

FIG. 50 is a diagram disclosing an example of providing the user interface for developing the mapping flow in the disclosed embodiments;

Figure 51:
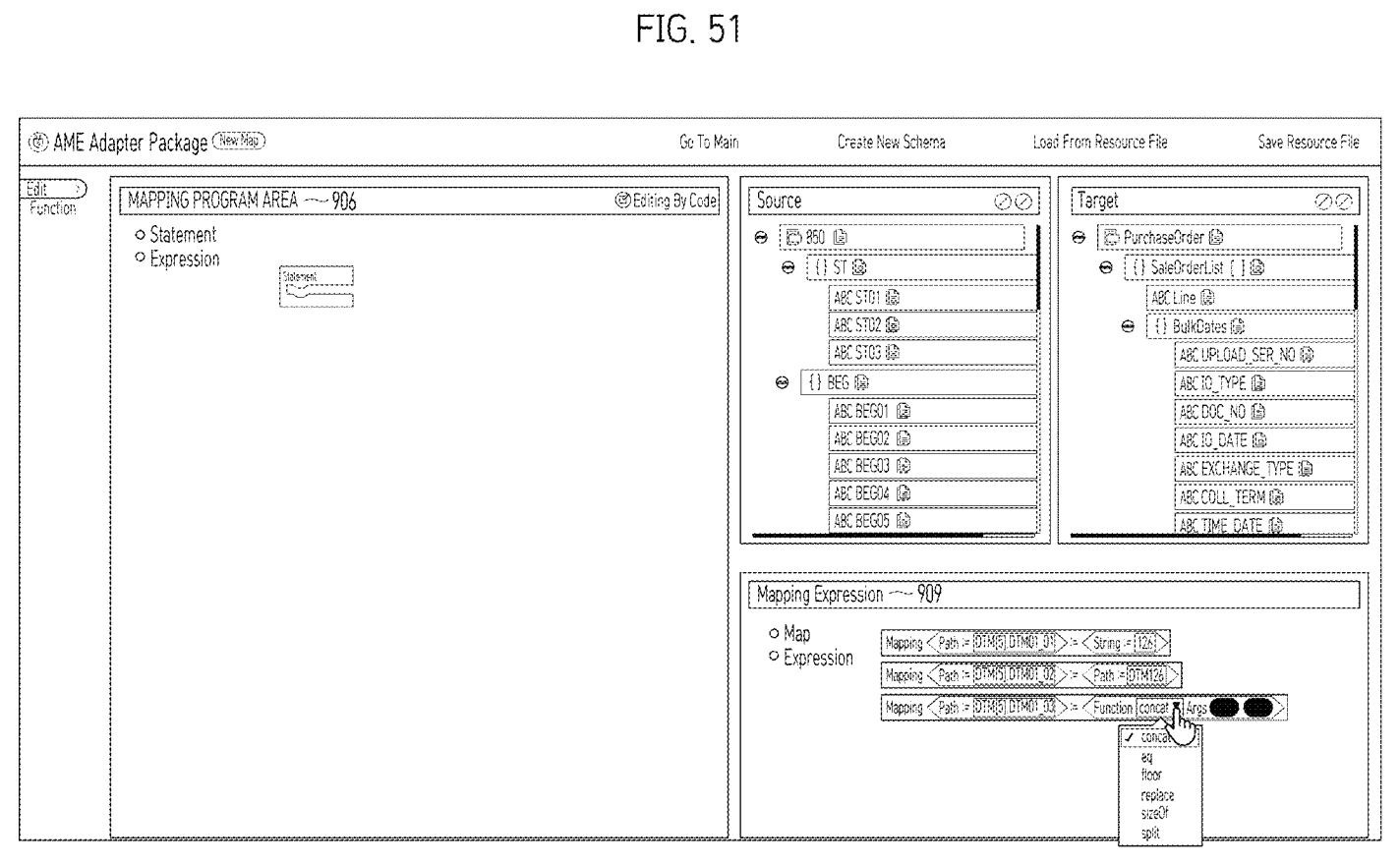

FIG. 51 is a diagram disclosing an example of providing the user interface for developing the mapping flow in the disclosed embodiments;

FIG. 52 is a diagram disclosing an example of providing the user interface for developing the mapping flow in the disclosed embodiments;

FIG. 53 is a diagram disclosing an example of providing the user interface for developing the mapping flow in the disclosed embodiments;

FIG. 54 is a diagram disclosing an example of the method of providing the application service in the disclosed embodiments;

BEST MODE

Hereinafter, the embodiments capable of solving the above-mentioned problems and solving technical inconvenience for transactions will be disclosed.

When components of the embodiments are mentioned below, the components may all be implemented using optimized hardware or software, unless specifically limited to physical devices.

Figure 1:
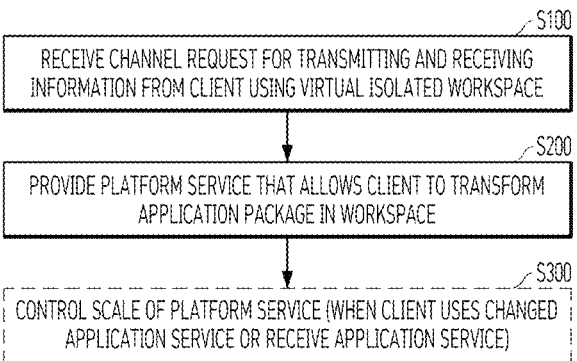
FIG. 1 is a flowchart disclosing an example of a method of providing an application service according to an embodiment.

FIG. 1 is a flowchart disclosing an example of a method of providing an application service according to an embodiment.

The method of providing the application service according to the disclosed embodiment allows several clients to obtain or download an application necessary for a transaction or add or change a desired function through a platform.

The embodiment may receive a channel request for transmitting and receiving information from a client using a virtual isolated workspace (S100).

When the client accesses the platform, a system may provide the virtual isolated workspace to the client.

The client may have a workspace capable of receiving a separate service. However, the hardware base of the system providing each workspace may be common.

A system administrator or the client may remotely control and update the system so that the client may receive the above-mentioned service, and the system may be equipped with communication functions according to protocols linked to various standards.

The client may request a channel through which desired information may be transmitted and received from the platform, and the platform may allow the client to set the channel.

A detailed example thereof will be disclosed below.

The embodiment may provide a platform service that allows the client to transform (create, change, or save) an application package in a workspace of the client (S200).

The client may develop an application package or part of a package in the system of the embodiment, exchange related applications or software, and operate a transaction-related business.

Hereinafter, the application package or package refers to a bundle of programs or files, and includes an adapter package that supports protocols or services, a resource package required to execute a program, and an integration package in which various packages are reintegrated. In the examples below, in some cases, the application package may be referred to as a software package.

The system may provide several means or specialized computer languages to support mapping to various data formats and structures desired by the client. In addition, an application and related tools may be provided to allow the client to change the application package.

A detailed example thereof will be disclosed below.

When the client uses the application package or another client receives an application service in a workspace of another client, the embodiment may provide a service that controls scale-out of the service (S300). In this step, scale control related to service provision may be performed as necessary. The client may receive the application service or operate the application service without interruption depending on the provided system.

A detailed example thereof will be disclosed below.

Figure 2:
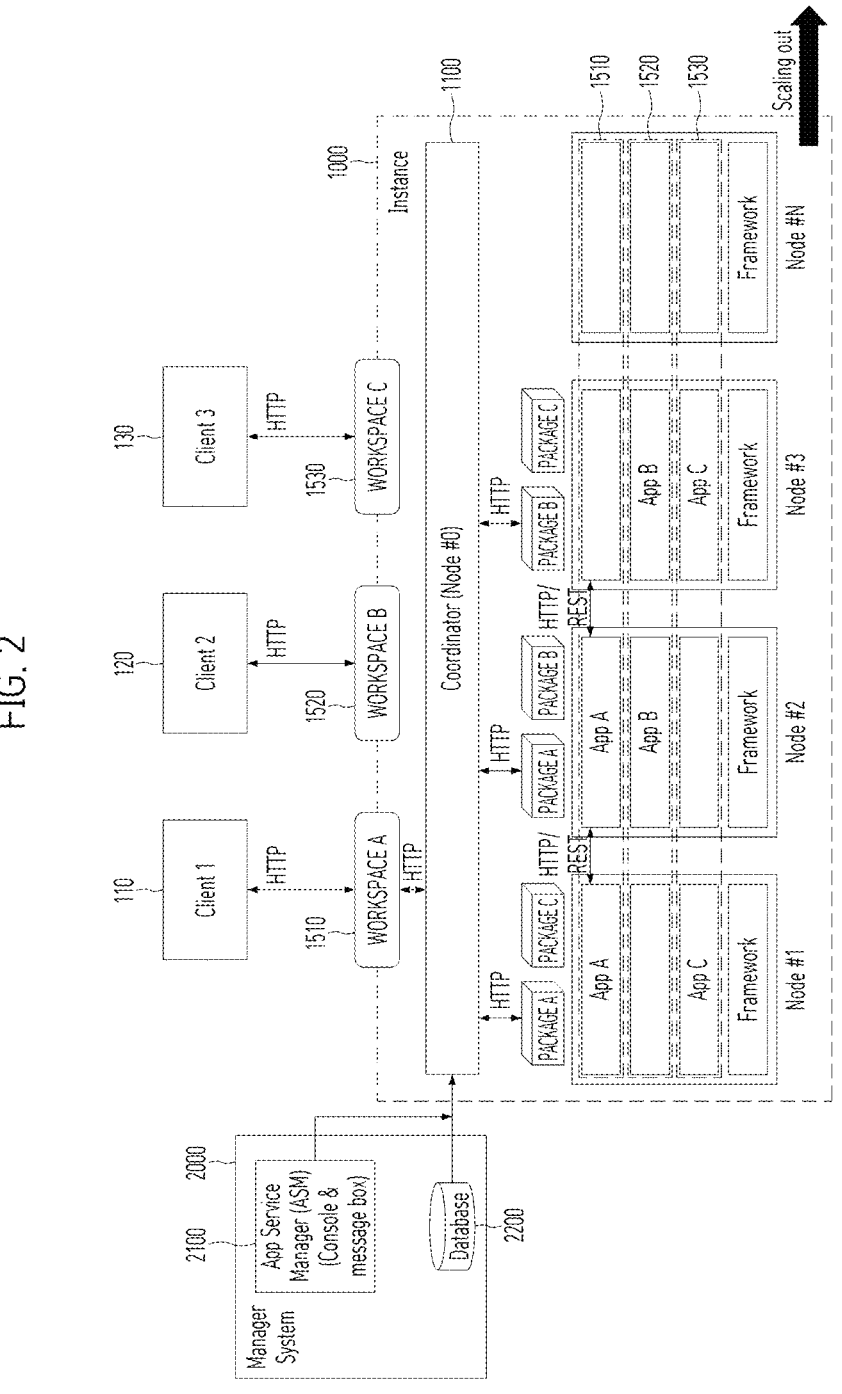
FIG. 2 is a diagram disclosing an example of providing the application service to a client through a workspace in the disclosed embodiments.

FIG. 2 is a diagram disclosing an example of providing the application service to the client through the workspace in the disclosed embodiments.

This diagram is a conceptual diagram for describing the workspace and multitenancy in the disclosed embodiments that provide the application service.

The embodiments may provide Software-as-a-Service (SaaS) to a user.

The embodiments may provide applications or SaaS-type software services used for transmission and reception of information such as transactions between parties.

In this figure, each of transaction parties is indicated as a client 1 (110), a client 2 (120), or a client 3 (130).

The clients 110, 120, and 130 may transmit and receive various information, including business transactions, with each partner. In this case, the clients 110, 120, and 130 may use the illustrated method of providing the application service.

The apparatus for providing the application service according to the embodiment includes an instance system 1000 that provides an application including SaaS-type software, and a manager system 2000 that provides the application service through the instance system 1000.

The manager system 2000 may provide the instance system 1000 that may scale out to the clients 110, 120, and 130.

In the instance system 1000, an interface of a service provided by the manager system 2000 to the clients 110, 120, and 130 may be executed.

The manager system 2000 may include a manager server 2100 that connects and controls the instance system 1000 and a database 2200 that may store transmitted and received information and requirements of the clients 110, 120, and 130. Functions of the manager system 2000 are described in detail below.

The instance system 1000 provided by the manager system 2000 may include at least one node.

In the example of this figure, node #0 (1100) may serve as a service coordinator that provides the application service and performs scale-out under the control of the manager system 2000.

In this example, the coordinator 1100, which is node #0, may be connected to a first node (Node #1), a second node (Node #2), a third node (Node #3), an Nth node (Node #N), etc., which are worker nodes, to control the scale of the system.

For example, an Interface protocol such as the HTTP protocol (hereinafter referred to as HTTP/REST) of the RESTful Application Programming Interface (API) may be used for connection between nodes, and the RESTful API may use HTTP so that data may be transmitted and received between servers.

For example, the coordinator 1100, which is node #0, may transmit and receive data to and from each of the first node (Node #1), the second node (Node #2), the third node (Node #3), . . . , and the Nth node (Node #N) using HTTP/REST.

Likewise, the first node (Node #1) may transmit and receive data to and from other nodes (Node #0, the second node (Node #2), the third node (Node #3), and the Nth node (Node #N)) based on HTTP/REST.

The coordinator 1100 may cause each node (in this example, the first node (Node #1) to the Nth node (Node #N)) to install the software package in response to a software package installation request from the manager system 2000.

Each node may include a framework capable of creating a workspace regardless of a type of system, which will be described later.

The coordinator 1100 may provide workspaces 1510, 1520, and 1530 driven in the framework of each node to the respective clients 110, 120, and 130, respectively.

The clients 110, 120, and 130 may have workspaces 1510, 1520, and 1530 isolated from each other, and may receive, change, or use applications or software packages through the isolated workspaces.

In this example, the first node (Node #1) may provide software package A and software package C provided by the framework inside the first node (Node #1) to the client through the coordinator 1100.

The second node (Node #2) may provide software package A and software package B provided by the framework inside the second node (Node #2) to the client through the coordinator 1100.

The third node (Node #3) may provide software package B and software package C provided by the framework inside the third node (Node #3) to the client through the coordinator 1100.

The manager system 2000 may stably provide the workspaces 1510, 1520, and 1530 isolated from each other to the clients 110, 120, and 130, respectively, through the instance system 1000.

For example, the client 1 (110) may independently use the workspace 1510.

The client 1 (110) may transmit and receive necessary data in the workspace thereof through a channel set with the coordinator 1100. For example, the client 1 (110) may receive necessary software packages A and C from the coordinator 1100 through an HTTP channel in a workspace A (1510). A detailed example of setting a channel between the workspace and the coordinator 1100 or between the coordinator 1100 and each node will be described later.

The client 2 (120) may receive necessary software packages A and B from the coordinator 1100 in a workspace B (1520) through, for example, the HTTP channel.

Likewise, the client 3 (130) may receive necessary software packages B and C from the coordinator 1100 in a workspace C (1530) through the HTTP channel.

The instance system 1000 may provide a virtualized system, so that the clients 110, 120, and 130 do not have to recognize which node provides a desired software package in the instance system 1000 in the workspaces 1510, 1520, and 1530 thereof.

The respective nodes (Node #1, Node #2, Node #3, and Node #N) that store and provide software packages by the coordinator 1100 may store software packages that may be provided to the workspaces 1510, 1520, and 1530. That is, several nodes (Node #1, Node #2, Node #3, and Node #N) may be virtualized to provide the workspaces 1510, 1520, and 1530 isolated from each other.

Each of the nodes (Node #1, Node #2, Node #3, and Node #N) includes a framework, and may perform a control operation so that each framework downloads the software package from a software package storage unit (not illustrated) and executes the software package. A detailed description thereof will be given below.

A software package required for the workspace A (1510) used by the client 1 (110) may be stored in at least one of the nodes (Node #1, Node #2, Node #3, and Node #N).

In this example, software package A is stored in the first node (Node #1) and the second node (Node #2). However, due to scale-out of the coordinator 1100, software package A may be transferred to and stored in other nodes (Node #3 and Node #N).

Software package B is stored in the second node (Node #2) and the third node (Node #3). However, due to scale-out of the coordinator 1100, software package B may be transferred to and stored in other nodes (Node #1 and Node #N).

Likewise, software package C is stored in the third node (Node #3) and the first node (Node #1). However, due to scale-out of the coordinator 1100, software package C may be transferred to and stored in other nodes (Node #2 and Node #N).

In this way, software packages may be distributed and installed on several nodes. The coordinator 1100 may store information on which node a software package is installed, perform routing for a software package request if necessary, and perform a task scheduling function for managed nodes.

Accordingly, the clients 110, 120, and 130 may obtain software packages from respective virtualized and isolated workspaces 1510, 1520, and 1530 without the need to recognize on which node the desired software package is stored due to scale-out of the coordinator 1100.

The manager system 2000 may provide the application service so that the clients 110, 120, and 130 may obtain desired software packages by controlling the coordinator 1100.

Nodes serve as worker nodes where adapter packages or software packages described below are installed and executed. In the instance system 1000, the worker nodes may be scaled out and expanded automatically or manually according to management of the manager system 2000, if necessary.

Figure 3:
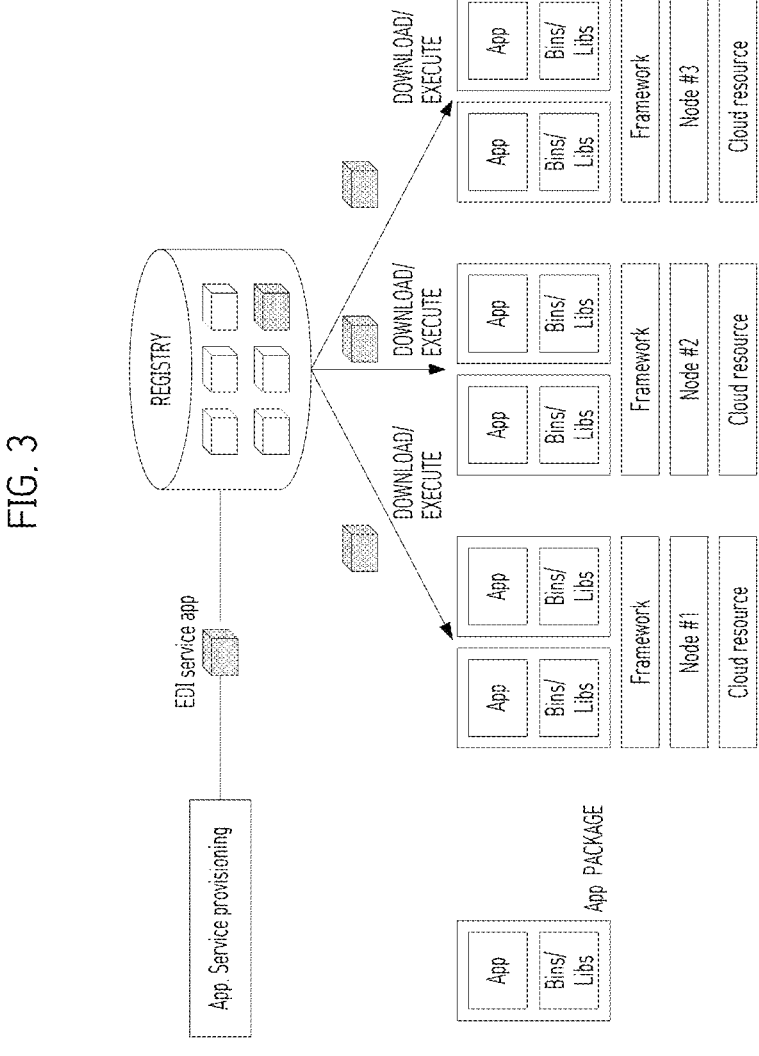
FIG. 3 is a diagram disclosing an example of distributing packages to each node in a disclosed example of an apparatus for providing the application service.

FIG. 3 is a diagram disclosing an example of distributing packages to each node in a disclosed example of an apparatus for providing the application service.

According to the embodiments, software developers may rapidly develop and distribute applications using software images.

The framework of each node may execute an application and use as many node resources as necessary to execute the application. When a node is included in a cloud system, the application may be executed based on cloud resources. When the node is an on-premises-based system, the application may be executed based on on-premises resources. In this figure, the case of a cloud is illustrated as an example.

The frameworks on the nodes included in the instance system may control the cloud/on-premise resources including the nodes for virtualization processing of the application and may allow application packages to be ported to other nodes.

An application service provider (ASP) may create a software package (service app) related to a service and store the software package in a storage device or application registry. Hereinafter, for ease of description, the application service provided by the ASP is illustrated as an EDI (Electronic Data Interchange) service, and the software package is illustrated as a software image (EDI service app) of the EDI service.

For example, EDI refers to a method of entering information related to a commercial transaction in an agreed-upon standard format and exchanging the entered information according to a standardized transmission and reception method. There may be a lot of EDI services depending on various transaction forms, goods or services being transacted, and transaction subjects.

The ASP may create a software package (EDI service app) related to this EDI service, and register the software package in a database or store the software package in the application registry.

The software package refers to a bundle of software including components in the software so that the client may install and use the software. In this example, the software package (App package) is indicated as a package that includes an application and executable binary parts or library parts of the application.

Therefore, the software package may take the form of a file that is a software image executed on a virtualized cloud resource.

Each client may download a software package (EDI service app) stored in the registry or registered in the database from each workspace (not illustrated), and change or execute the software package.

Software packages (EDI service app) stored in the registry or registered in the database may be downloaded or executed on nodes that provide each workspace, even when the packages are the same.

Each client may download the necessary software package (EDI service app) as a software image from each isolated workspace (not illustrated) and use the software package for the desired EDI service.

Each client may download the software image and use the software image to obtain the desired EDI service, or provide the EDI service to the partner of the client.

When the client downloads the software image from the isolated workspace and provides the desired EDI service, the software package (EDI service app) may be stored in the registry or registered in the database.

The ASP may provide the instance system so that the client may use, change, or provide a software package related to a service such as the EDI service, and may manage data transmission and reception with the instance system. A detailed description thereof will be given below.

Figure 4:
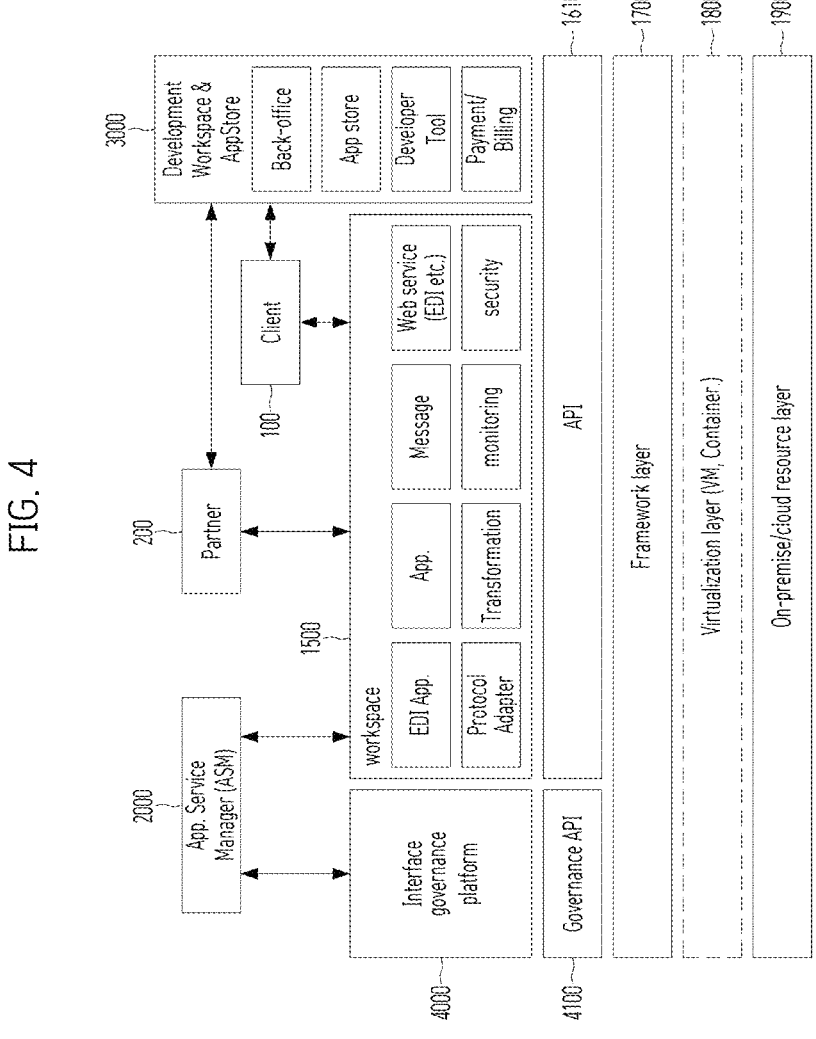
FIG. 4 is a conceptual diagram disclosing elements for each layer for provision of the application service according to an embodiment.

FIG. 4 is a conceptual diagram disclosing elements for each layer for provision of the application service according to an embodiment.

The apparatus for providing the application service according to the embodiment may be controlled and managed by the manager system 2000.

The manager system 2000 may provide application services such as EDI services using an on-premise system or a cloud system. Detailed examples of providing services by the manager system 2000 will be described below.

The computing system may include at least one of the on-premise system or the cloud system.

The computing system may include a container capable of virtualizing a computing resource or a virtualization layer such as a virtual machine (VM).

This figure illustrates the case where the virtualization layer is included, and the virtualization layer is indicated by a dotted line.

For example, the computing system may provide a container as the virtualization layer. The container may allow use of resources of a host as needed to execute an application on a host operating system (OS). When a container image is used, the application may be rapidly developed and distributed.

The computing system may include a framework layer 1700 that provides a framework. The framework may enable various applications to be driven through APIs 1610 and 4100.

Workspaces 1500 and 3000 or an interface governance platform 4000 is located on the API 1610 or the governance API 4100, and various applications may be driven by the APIs 1610 and 4100.

The client 100 may receive the application service provided by the manager system 2000, that is, a software package, by a system having layers illustrated in this figure.

For example, the client 100 may use a service such as an EDI application (EDI App.) through the isolated workspace 1500. In this example, the client 100 may use applications or services such as application services (App.), message services, web services, protocol adapter services, data transformation services, monitoring services, and security services different from the EDI through the workspace 1500. Applications or services in the workspace 1500 are disclosed in detail below.

A partner 200 is an actual transaction partner of the client 100, or another transaction subject related to the transaction, and may use the application service through the workspace 1500 or receive the application service such as the EDI service provided by the client 100.

When the client 100 proceeds with a transaction through an application related to the EDI service, the partner 200 may proceed with the transaction through the EDI service application provided by the client 100.

The manager system 2000 may provide an environment in which the client may develop an application necessary for a transaction of the client.

The manager system 2000 may develop and test applications in the development workspace 3000 and provide the developed application services through the workspace 1500. In addition, the manager system 2000 may manage a computing environment that provides the development workspace 3000 to the client 100 or partner 200, and allow the client 100 or the partner 200 to develop a necessary application in the development workspace 3000.

This development workspace 3000 may include a development tool application that may develop an application, a billing application (payment/billing) that determines the use and billing system for the developed application, an app store for selling the developed application, and a back-office application that supports and controls these functions.

For example, the client 100 or the partner 200 may develop, change, and test an application through the development workspace 3000. The client 100 or the partner 200 may autonomously develop an application or a software package in the development workspace 3000 as well as an application provided by the manager system 2000.

In addition, the client 100 may provide applications developed through the development workspace 3000 to other clients or partners through the app store 3000 illustrated in the drawing.

The partner 200 and the manager system 2000 may develop, test, and utilize a software package and provide the software packet for service provision together with the client 100 through the system provided.

The manager system 2000 may provide inspection, control, etc. of the client system through the interface governance platform 4000 on the solution API 4100, and these services will be described separately in detail.

Hereinafter, first, a description will be given of detailed examples in which the client 100 receives or provides a service using the software package through the workspace 1500.

FIG. 5 is a diagram disclosing a concept in which the apparatus for providing the application service sets a channel between an instance and the client or the partner according to an embodiment.

As disclosed, the instance system may include at least one node. For example, the instance system may include a coordinator node and a worker node that transmits and receives the software package to and from the coordinator node.

The instance system may not only expand worker nodes thereof, but also be expanded to two or more instance systems. Therefore, even when the number of clients increases, it is possible to provide continuously expanded system environments and services.

The application service manager 2100 may collect information such as resources from the client or the partner 300 so that the application service is provided.

In this case, when the application service manager 2100 directly accesses the system of the client/partner 300 and collects resource information of the client/partner 300, a security problem may occur.

Accordingly, the embodiment may cause the client/partner 300 to install an agent 350, and allow the client/partner 300 to directly manage connection information.

The agent 350 may set connection information for resource management information or connection information in the client/partner 300. In this example, the agent 350 may collect resource management information or connection information of the client/partner 300, user information of the client/partner 300, and other file system information. In addition, the agent 350 may access a database of the client/partner 300 to collect stored information. The agent 350 may store the collected information.

The agent 350 of the client/partner 300 may be connected to an agent adapter 1350 installed on an Nth node (Node #n) 1300, which is an arbitrary node of the instance system that may receive the application service.

The application service manager 2100 may obtain information related to the client/partner 300 collected from the agent 350 of the client/partner 300 from the agent adapter 1350 installed on the Nth node 1300.

The Nth node 1300 may include a setting storage unit (Config. Repository) 1330, which may store information set by the manager system 2100, for example, setting information for the agent or transmission/reception information between the agent and the agent adapter. The agent adapter 1350 may store various information received from the agent 350 of the client/partner 300.

The application service manager 2100 may include a message box 2110, and the message box 2110 may receive information stored by the agent adapter 1350 of the Nth node 1300 (outbox slot) or request information from the agent adapter 1350 (inbox slot).

The agent adapter 1350 delivers the information (inbox slot) received from the message box 2110 of the application service manager 2100 to the agent 350 of the client/partner 300. In addition, the agent adapter 1350 delivers the information (outbox slot) received from the agent 350 of the client/partner 300 to the message box 2110 of the application service manager 2100.

The message box 2110 is a registry that may store transmitted and received data, files, or documents, and may be configured as a separate server. Therefore, the message box 2110 may be referred to as a message server, but is indicated as a message box as a unit of logical division and monitoring in the example of this figure.

The agent 350 registered in the client/partner 300 may send data to the agent adapter 1350. Further, the agent 350 may receive or poll data from the agent adapter 1350 at regular intervals.

The setting storage unit (Config. Repository) 1330 of the Nth node 1300 that provides services to the client/partner 300 may store channel setting information between the agent 350 and the agent adapter 1350 or setting information received from the agent 350 by the agent adapter 1350.

The application service manager 2100 may provide or obtain information necessary for services provided to the client/partner 300 from the agent adapter 1350 installed on the node 1300.

The agent 350 collects only necessary information of the client/partner 300, and thus the security problem occurring in the client/partner 300 may be minimized. In addition, since the agent 350 does not retrieve unnecessary data and data is transmitted and received at regular intervals, channel overload may not occur between the Nth node 1300 and the client/partner 300.

Since the Nth node 1300 stores necessary information in the setting storage unit (Config. Repository) 1330, information collected by the agent 350 may be kept up to date and the channel may be made lightweight.

According to the embodiment, the latest state of information related to the client/partner 300 may be stored in the Nth node 1300, and thus security may be enhanced without burdening the client/partner 300.

An example of transmitting and receiving information necessary for the service of the agent adapter 1350 in the Nth node 1300 through the channel set as in the disclosed example will be described in detail below.

FIG. 6 is a diagram disclosing a specific example in which the apparatus for providing the application service sets a channel between the instance and the client or the partner according to an embodiment.

According to the concept disclosed above, the application service manager 2100 may enable the client or the partner 300 to provide, use, and change an application through the instance system 1000. The instance system 1000 may include the coordinator 1100 and the Nth node 1300, which is a random node.

The application service manager 2100 may distribute information for installing the agent 350 to the client/partner 300. For example, information for installing the agent 350 may include agent setting information, key information for agent setting, resource management information, user management setting information, etc.

For example, the agent setting information may include information such as time to synchronize channel information, timeout for an HTTP request, a key value of a session key related to an installation browser, and a path required for the agent to transmit and receive related information.

A channel is set to use a service provided by the application service manager 2100, and may be described, for example, as a component for connecting to a package such as an adapter package. Examples related thereto are described in detail below.

The agent 350 may be installed on the client/partner 300, and the agent 350 may collect resource management information, connection information, user information, etc. of the client/partner 300. If necessary, the agent 350 may access a database or a file system of the client/partner 300.

The agent 350 may request a software package from the coordinator 1100 of the instance system 1000. In this case, the agent 350 may request a channel service for receiving a software package from the agent adapter 1350 of the coordinator 1100. Here, the agent 350 may request and use HTTP for the channel service requested from the agent adapter 1350.

For example, when the agent 350 of the client/partner 300 forwards a request to a preset HTTP URI, the coordinator 1100 may allow HTTP traffic entering a specific port, that is, inbound HTTP connection, and transforms this HTTP service into a channel service delivered to the agent adapter 1350 of the Nth node 1300, which is a worker node.

Information for installing the agent 350 previously includes path information allowing access to the instance system 1000.

When the agent 350 is installed on the client/partner 300, the manager of the client/partner 300 may set management information, user information, etc. of the system of the client/partner 300 managed by the agent 350, and set a time of synchronization with the agent adapter 1350 of the Nth node 1300.

The application service manager 2100 may set setting information for the agent adapter 1350 installed in the instance system 1000 in relation to the registered agent 350 and information on whether synchronization with the registered agent 350 is active.

The application service manager 2100 may set outbox slot information in a message box for storing information transmitted by the registered agent 350 and inbox slot information in a message box for storing information received by the registered agent 350.

The application service manager 2100 stores information transmitted by the agent 350 and information received by the agent 350 according to the information set as above in the outbox slot and the inbox slot in the message box 2110, respectively. A slot in the message box is a logical division concept that stores data processing units, and the message box may store and output data processing units as a queue.

Meanwhile, the application service manager 2100 may set authentication key information allowing the registered agent 350 and agent adapter 1350 to perform authentication.

In this way, when the agent 350 is registered with the client/partner 300 and the agent adapter 1350 is set in the instance system 1000, the agent adapter 1350 may be connected to a resource set in the agent 350.

In addition, according to the information set by the agent 350, related information or data may be exchanged with the agent adapter 1350.

In this figure, a channel through which the agent 350 transmits information (outbox) output according to a set cycle from the resources of the client/partner 300 is indicated as a send channel. Further, a channel through which the agent 350 receives information (inbox) transmitted from the agent adapter 1350 is indicated as a receive/polling channel.

The agent 350 may send and receive data requested from the agent adapter 1350 through the set send channel and the set receive/polling channel.

FIG. 7 is a diagram disclosing an example of managing a channel in a distributed system and receiving a service according to an embodiment.

As illustrated, nodes in the instance system 1000 may transmit and receive data through a channel to provide services. The channel is a general term for a passage for calling data or a package to provide a service, or searching to determine on which node a previously registered channel is executed.

Here, an example is disclosed in which the coordinator 1100 of the instance system 1000 manages packages installed on nodes in a distributed environment through channel connection.

The coordinator 1100 may store channel information allowing connection of each worker node and information about packages stored in each worker node.

For example, the coordinator 1100 may register and store information about packages stored in the worker nodes 1110 and 1120. The coordinator 1100 may register and store information about an adapter package A and an integration package stored by the worker node 1110 of the first node (Node #1), and register and store information about an adapter package B stored by the worker node 1120 of the second node (Node #2).

The coordinator 1100 may receive a service request related to the package from the client or the partner. As described above, this example illustrates the case where a service request is received through an HTTP request including URL information.

The coordinator 1100 may set a service channel for worker nodes when registered in the coordinator 1100 and mapped based on URL information included in the HTTP request.

As in the example here, the coordinator 1100 sets up an HTTP service channel according to an HTTP request including URL information of the client or the partner. The coordinator 1100 may call the adapter package A provided by the first worker node (worker node #1) 1110 through the set HTTP service channel.

Since the client or the partner uses an isolated workspace provided by the coordinator 1100, the clients (or partners) may have different versions of packages in the respective workspaces and may use different versions of adapter packages.

The adapter package A requested by the client may be called through the HTTP service channel from the first worker node (worker node #1) 1110 according to information registered in the coordinator 1100.

The first worker node (worker node #1) 1110 may provide the adapter package A registered according to the HTTP service channel.

When the client or the partner develops an application package in the corresponding workspace, an integration package including the adapter package B may be required.

The coordinator 1100 knows that the first worker node (worker node #1) 1110 stores the integration package, and the second worker node (worker node #2) 1120 stores the adapter package B according to the registered information.

The coordinator 1100 may search for the integration package including the adapter package B in the first worker node (worker node #1) 1110 through an adapter function channel. Further, when the adapter package B is not included in the integration package stored in the first worker node (worker node #1) 1110, the first worker node (worker node #1) 1110 may call the adapter package B stored in the second worker node (worker node #2) 1120 through channel connection between the worker nodes.

Then, the second worker node (worker node #2) 1120 may provide the called adapter package B. In this case, the coordinator 1100 may register a channel providing the adapter package B as the adapter function channel, so that the adapter package B may be provided together with the integration package.

In the embodiment disclosed in this way, various packages may be distributed and installed on several nodes. To communicate between packages or call a specific adapter package from outside the instance system, the coordinator 1100 may manage and store channels for searching, calling, or registering the package in worker nodes capable of providing package services.

The agent adapter 1350 of the instance system 1000 may set a transmission channel and a reception channel from the agent 350 as illustrated. The agent adapter 1350 may set a channel with a specific agent using channel-related information, such as an identifier of the agent and a channel cycle.

In this way, the coordinator 1100 may manage various information so that the requested package-related services may be distributed and performed across worker nodes. The HTTP service channel is illustrated above. However, the package may be delivered through a file transfer channel such as FTP.

The coordinator 1100 may store adapter packages distributed across several worker nodes in a shared memory (not illustrated) or a registry.

In addition, the coordinator 1100 may store and manage data such as logs related to adapters used by several clients.

FIG. 8 is a diagram disclosing an example of managing setting information of an installed package according to an embodiment.

In the example of this figure, the coordinator 1100, an mth node (node #m) 3110, and an nth node (node #n) 3210, which are distributed systems in the instance system 1000, may include setting storage units 1115, 3115, and 3215 in the nodes, respectively.

The application service manager 2100 of the manager system 2000 may store various setting information (rectangles) related to the package. The stored setting information may include various setting information required when the package is executed on each node.

The application service manager 2100 may store the setting information of the package in the database 2200. The application service manager 2100 may obtain package setting information from a specific node, in this example, the mth node (node #m) 3110, or may store externally requested package setting information in the database 2200.

The coordinator 1100 may store the package setting information managed by the application service manager 2100 in a setting storage unit 1115 thereof. The application service manager 2100 may manage and store package setting information through a control screen, etc.

The mth node (node #m) 3110 and the nth node (node #n) 3210, which are worker nodes in the instance system 1000, may receive related package setting information from the setting storage unit 1115 of the coordinator 1100 and store the package setting information in each of the setting storage units 3115 and 3215.

In this example, the nth node (node #n) 3210, which is a worker node, may synchronize the package setting information with the package setting information stored in the setting storage unit 1115 of the coordinator 1100. This synchronization may be performed periodically, or may be synchronized at a different cycle depending on the setting.

When the nth node (node #n) 3210, which is a worker node, needs to execute a package, the node may execute the package using setting information synchronized and stored in the setting storage unit 3215 thereof.

The client/partner may change and store the package setting information of the mth node (node #m) 3110, which is a worker node, through a package setting screen of the coordinator 1100, etc.

When the package setting information of the mth node (node #m) 3110, which is a worker node, is changed, the changed package setting information may be transmitted to the application service manager 2100.

Again, the application service manager 2100 may store the changed setting information of the package transmitted from the mth node (node #m) 3110 in the database 2200.

FIG. 9 is a diagram disclosing an example of managing and using a package according to a workspace of the disclosed embodiments.

The client may create, execute, and change various packages in an isolated workspace.

For example, the client may execute the adapter package in the workspace, and the adapter package may be executed using setting information stored in a setting registry. However, in some cases, the package may be executed by referring to a resource file in addition to the setting information in the setting registry.

The resource file is a mapping program that is a type of resource package and may be installed in the workspace. The resource file may be accessed using a resource path when executing a package such as an adapter package, allowing the adapter package to be executed.

According to the disclosed embodiment, it is possible to develop or test and operate the package in the workspace.

Therefore, according to the embodiment, the resource file may be provided by separating the workspace for operation and the workspace for development.

In the example of this figure, when the adapter package is developed in the workspace 1510 for development, the adapter package may be used as a program that can not only read but also write the resource file. In this case, the resource file, which is a mapping program, may be accessed by being designated as a writable shared resource path.

On the other hand, when the adapter package is executed in the workspace 1520 for operation, the resource file may be provided as a resource package only readable and non-writable by the adapter package. In this case, the adapter package may be installed and accessed by referring to the resource package, and a resource file in the resource package cannot be changed.

FIG. 10 is a diagram disclosing an example of mapping EDI information as a type of application service according to an embodiment.

The disclosed embodiments may not only provide various application services, but also provide a platform environment for developing various application services.

Hereinafter, the EDI service will be described as an example of such an application service. As those skilled in the art may understand from the disclosure, various application services may be developed or provided using the embodiment, and thus the service is not necessarily limited to EDI service.

As a type of application service, EDI requires various types of transactions, transaction parties, and transaction forms for each industry. Therefore, when the disclosed embodiment is utilized for various types of complex transaction aspects for each industry, efficient transactions are possible, which is significantly effective in activating industrial transactions.

This figure illustrates an application service that transforms various information or documents required for the EDI service between transaction parties.

EDI has a wide variety of formats that follow specific rules and regulations depending on the industry, and a transaction may be established when an EDI document is created and processed according to these formats. The EDI service has formats for various industries such as transportation, logistics, finance, and insurance, as well as electronic commercial transactions. EDI is standardized by ISO, an international standardization organization, and is regulated and managed by UN/EDIFACT (United Nations/Electronic Data Interchange for Administration, Commerce and Transport) or ANSI (American National Standards Institute) X.12.

Depending on the nature of the transaction involving ordering and supply, different types of documents including different data or information may be used, and the systems used by the transaction parties may be different.

For the EDI service, documents need to be mapped between two transaction parties.

The example in this figure conceptually discloses an advanced mapping engine which is a program that transforms a document including data into a general-purpose system to provide the EDI service.

For example, the transaction party may provide an EDI document and an EDI schema required for the transaction. Such data may be transformed into decoded data (unmarshal data) by decoding bytes or strings included in EDI data (that is, the EDI document) according to an input schema.

The mapping engine may include reference information for mapping schemas to each other based on data to be transformed and schemas of the data to be transformed. Here, the mapping reference information is referred to as a mapping script.

The mapping reference information is for transforming unmarshalled data into a document of another target format and may have a script format.

The mapping engine may transform data (unmarshal data) obtained by decoding EDI data and an EDI schema by mapping the data to a file of a specific format (here, a JSON file as an example) that may be used as an interface for a general document and a schema for the file of the specific format (here, a JSON schema as an example).

In more detail, as the EDI schema, an EDI format of an SEF (Standard Exchange Format) standard may be used, or an EDI format such as EXF (EDI Exchange Format) may be used.

A file of a changed format may be a file in a format such as a general file (flat file), JSON, or XML.

When marshalling or unmarshalling is performed for each file type on the file of the changed format, the file may be transformed into a schema file defined as an annotation. In other words, it is possible to obtain a result of a marshalled or unmarshalled schema defined as a type corresponding to the data to be transformed and an annotation corresponding to a specific data type.

The embodiment may generate a schema through this mapping engine and provide the user with a graphical interface allowing creation of a mapping script, which is the mapping reference information.

FIG. 11 is a diagram disclosing an example of providing the application service using the integration package according to an embodiment.

According to an embodiment, a client 310 may provide an application service such as the disclosed example to a desired partner 320. The embodiment not only provides a service from the client 310, but also allows the client 310 to directly provide a customized service to the desired partner 320 using the embodiment.

Here, the EDI service among application services is described as an example. In order for the client 310 to make a transaction with the partner 320, the embodiment may provide the coordinator 1100 and the worker node 1300 included in the instance system.

The application service manager 2100 may provide and manage the instance system so that the client 310 and the partner 320 may exchange information required for a transaction through the instance system.

As disclosed, an agent (not illustrated) is installed in the client 310, and EDI information, which is information required for the transaction, may be requested through the agent. In this case, the request for the EDI information may be transmitted by HTTP traffic.

The coordinator 1100 of the instance system maps the HTTP request including the EDI information delivered from the client 310 to a designated channel and delivers the HTTP request to the corresponding worker node. The above example discloses that the coordinator 1100 checks and manages registration of a channel in response to the HTTP request including the URL information. The coordinator 1100 changes the HTTP request into a channel service and delivers the channel service to the agent adapter 1350 of the corresponding worker node 1300 that may receive the channel service.

The agent adapter 1350 transmits the requested EDI information to the message box 2110 of the application service manager 2100 through the channel service.

The message box 2110 of the application service manager 2100 may store the EDI information delivered from the agent adapter 1350 in a client inbox 2111.

The message box 2110 of the application service manager 2100 transmits the requested EDI information to an integration package 1380 of the worker node 1300.

Here, the integration package 1380 is a bundle of programs in which development items are integrated, and includes various development flows, Java or script programs. The integration package 1380 may allow these development items to be used in combination and solve integrated requirements.

The integration package 1380 may exchange information with the message box 2110, adapters 1350, 1370, and 1390 of the worker node, and the channel service of the coordinator to allow implementation of various requirements enabling the client 310 and the partner 320 to transact with each other.

When a specific channel is called according to the distributed channel service, the integration package 1380 may create and register routing for necessary information exchange in the package, and thus may solve requirements of the user.

Elements and usage examples of the integration package 1380 are described in detail below.

The integration package 1380 may deliver the EDI information stored in the client inbox 2111 of the message box 2110 to the mapping adapter 1370.

The mapping adapter 1370 unmarshalls the EDI information of the client 310 received from the integration package 1380 and outputs the EDI information as EDI transformation data mapped to information needed by the partner 320.

When the integration package 1380 receives the EDI transformation data output by the mapping adapter 1370, the EDI transformation data may be transmitted to and stored in a partner outbox 2113 of the message box 2110 and delivered to the EDI adapter 1390.

The EDI adapter 1390 may transform the EDI transformation data output from the integration package 1380 or stored in the partner outbox 2113 into a standardized format, for example, a format such as UN/EDIFACT or ANSXI X.12.

The EDI adapter 1390 may transmit the standardized EDI transformation data to the partner outbox 2113 of the message box 2110 and store the standardized EDI transformation data.

The coordinator 1100 may receive the standardized EDI transformation data stored in the partner outbox 2113 of the message box 2110 or transformed by the EDI adapter 1390 through a channel service, transform the data into HTTP traffic, and transmit the HTTP traffic to the partner 320.

As a result, the partner 320 may receive the EDI information delivered by the client 310 as the standardized EDI transformation data. Even when the partner 320 delivers EDI information of the partner 320 to the client 310, data may be delivered according to a similar process.

Therefore, the client 310 and the partner 320 may easily use the application service such as the EDI service according to the disclosed embodiment, and may easily conduct transactions according to a standardized format even when not knowing the standardized format and not accurately understanding documents and information requested by the transaction counterparty.

The client 310 or the partner 320 may develop or use several software packages the workspace thereof and link the software packages to the integration package 1380.

The embodiment may provide development of such packages and connection with existing packages through a significantly easy interface, and may sell, share, or separately provide the developed packages.

FIG. 12 is a diagram illustrating an example of an interface of a platform according to a disclosed example of providing the application service.

This figure illustrates an interface provided by the platform when the user accesses a platform according to an example of providing an application service.

When the client accesses a launching system, the platform may provide a user interface menu associated with a workspace dedicated to the user.

As illustrated in this figure, the client may use the instance system through an interface platform provided by the manager system or access the instance system using HTTP including a URL, etc.

In the example of this figure, the interface platform provided by the manager system may provide options for a user-only workspace 151, a message box 152, file transfer 153, a message (SMS) 154 sent to a mobile terminal, and information 155 about the corresponding standard mapping when information exchange is related to EDI.

The workspace 151 is a menu that allows the client to use a workspace of the client, and the message box 152 stores messages related to the client.

The file transfer 153 allows a method of sending a file transmitted and received through the instance system or a history thereof to be checked.

The user may check a package 161 used or developed by the user or a purchased package 162 by selecting the user interface menu.

FIG. 13 is a diagram illustrating another example of the interface of the platform according to the disclosed example of providing the application service.

This figure illustrates a user interface menu that can be seen when accessing a platform according to an example of providing an application service initiated by the client and selecting a workspace.

The client may check and use a workspace 171 created by the client, an instance system 172 related to the workspace, a creation date 173 for each space, description information 174 of the workspace, whether the workspace is activated 175, a service 176 and a package 177 related to the workspace, etc.

The following discloses an embodiment capable of providing an application linkable to different systems when the application is an application connecting different systems. Software or applications developed through the workspace of the embodiment may be shared and used by several clients. When systems used by the client or the partner are different from each other, an application developed by the client (or partner) needs to be available on a system of the partner (or client).

The instance system according to the embodiment may provide a framework capable of integrating these different systems, and the embodiment is disclosed as follows.

FIG. 14 is a diagram disclosing an example in which the apparatus for providing the application service provides a framework capable of integrating different systems according to an embodiment.

The apparatus for providing the application service according to the embodiment may include a framework that provides applications executable on different systems. Therefore, this integration framework may provide applications that allow users of different systems to connect with each other, making it efficient and ideal for providing the EDI service, etc. illustrated above.

This figure illustrates an integration system architecture as a framework that may integrate different systems. The integration system architecture provided by the framework of the embodiment includes one or more route engines.

The route engine provides routes by connecting endpoints, which are different systems, and processors, which are tasks performed between endpoints.

A route may describe a linkage interface between systems, and in this example, the route engine provides routes 1, 2, . . . , N.

A processor processes data for exchange between transmission and reception systems, that is, endpoints. In this example, a router processor and a message filter processor are illustrated.

A component refers to an adapter of a transmission/reception system to be linked. In this example, the integration system architecture provides an example of connecting different systems by providing a unified interface to the endpoint using components such as files, JMS, and HTTP.

A person who retrieves or receives data from a component (or is called) is referred to as a consumer, and a person who calls, transmits, or refers to data from a component is referred to as a producer.

A message is data exchanged for system communication and may include a body, a header, and attachments.

An exchange is a container that contains messages exchanged between systems, and is an object which is created at the start of a route flow and whose life cycle is maintained only until the end of the flow.

When such an integration system architecture is used, applications that may be used in different systems may be created and developed as an integration package. As an example thereof, the integration package 1380 has been illustrated in the example above.

The integration package developed based on the integration system architecture may provide an integration flow that may solve integration requirements in connection with the adapter package or the service provided by the platform according to the embodiment.

The integration package may implement necessary processes in the flow of the integration system architecture and may provide scripts or Java programs capable of transforming various data.

The client (or partner) may create integration packages necessary to provide a service thereof using the integration system architecture illustrated above based on the platform according to the embodiment.

The platform according to the embodiment may provide an environment in which the client (or partner) may significantly easily develop an integration package that implements the integration flow using graphic-based coding.

The following illustrates an environment in which the integration flow may be developed as an integration package provided by the integration system architecture of the platform according to the embodiment.

A platform according to the embodiment of the apparatus for providing the application service may provide a graphic-based development environment using a library.

The client (or partner) may develop a graphic-based integration flow using the example, and the integration flow may broadly include five functions.

Here, the five functions included in the integration flow are referred to as a connector, a service, a processor, a control flow, and a modifier. These names are illustrative and each function is described in detail as follows.

FIG. 15 is a diagram illustrating an example of coding a connector among integration flow functions based on graphics when developing an integration flow based on an embodiment.

The connector may include a From graphic element indicating the start of the route of the integration system architecture illustrated above.

The connector may include a To graphic element that defines external operations when a flow developed in a development environment, such as calling a service or adapter or storing data, is implemented.

As illustrated in this figure, an integration flow may be developed using a connector capable of expressing input/output (From/To) of the route using graphic coding in the graphic-based development environment provided by the embodiment.

To describe the connector in more detail, the connector serves as a consumer, which calls specific data (From Connector) and provides data processed through the flow to the outside of the integration flow (To Connector) as a producer.

Referring to the consumer, examples of the case where the integration flow calls specific data (From Connector) may include "direct" for calling a route in the application package and a timer for calling data periodically by a task scheduler.

In addition, other examples of the case where the integration flow calls specific data (From Connector) may include a channel that registers a route as a channel and starts the route when the channel is called, a message box that periodically checks for an unprocessed message and starts a route when there is an unprocessed message, or FTP that verifies whether a document is present in a registered FTP service path and starts a route when the document is present.

Such a consumer may include options such as a route ID in the integration package, Auto Start indicating whether to start the route at the time of package installation, and Start Order indicating a start order of the route for package installation.

The producer refers to an external output operation (To connector) as a result of performing the integration flow. Examples of a type of producer may include "direct" meaning that different direct routes in the same application package are called, and a message box meaning that a document is stored in a message box. In addition, examples of the producer may include a channel meaning that a different channel is called in the workspace, or FTP meaning that a document is transmitted to a registered FTP service.

Therefore, as illustrated in the example of this figure, an integration flow may be developed using a connector that includes route input/output (From connector/To connector) coding elements through graphic coding.

FIG. 16 is a diagram illustrating an example of coding a service among the integration flow functions based on graphics when developing the integration flow based on an embodiment.

Depending on the embodiment, the integration flow, which may be developed based on graphics, may be coded based on a visual interface using a service block.

In the example of this figure, the service block may include a getNextControlNumber element, an isDuplicatedControlNumber element, a putUsingConrolNumber element, a remoteCache element, etc. provided graphically.

The getNextControlNumber element means issuing a new control number, and the isDuplicatedControlNumber element is an element that verifies whether the control number is duplicated.

In this figure, the case where the control number is duplicated (True) and the case where the control number is not duplicated (False) may be defined together.

When developing an integration flow, among the service blocks, the putUsingConrolNumber element stores the used control number in storage and uses the control number to check for duplication, and the remoteCache element accesses a cache service of the workspace as an example.

Therefore, the integration flow may be coded based on graphics using the service block such as the example of this figure.

FIG. 17 is a diagram illustrating an example of coding the processor among the integration flow functions based on graphics when developing the integration flow based on an embodiment.

Depending on the embodiment, the integration flow, which may be developed based on graphics, may be coded based on a visual interface using a processor block.

In the example of this figure, the processor block may include a log element, a process element, an xslt element, a groovy element, a delay element, etc. provided graphically.

The log element allows information required when executing a flow to be recorded in a package log, and the package log may be checked in an adapter that monitors an execution status of the package.

The process element allows custom processing to be performed by calling a method Bean registered in an uploaded Java (Jar) package item.

The xslt element may perform XSLT transformation by selecting an XSLT package item.

The groovy element may allow a script to be called by selecting a Groovy package item.

The delay element may cause the route of the flow to be briefly delayed.

Therefore, the integration flow may be coded based on graphics using a processor block as in the example of this figure.

FIG. 18 is a diagram illustrating an example of coding a control flow among the integration flow functions based on graphics when developing the integration flow based on an embodiment.

Depending on the embodiment, the integration flow, which may be developed based on graphics, may be coded based on a visual interface using a control flow block.

In the example of this figure, the control flow block may include a split element, a for element, a while element, an xslt element, an If or Switch-Case element, a Try-Catch element, etc. provided graphically.

The split element allows information required when executing a flow to be recorded in a package log, and the package log may be checked in an adapter that monitors an execution status of a package. The split element is a function that may process one integrated document (Exchange) by splitting the document into several Exchanges, and may support Delimiter, XPath, and Bean methods.

The for element is used when processing a message several times, and provides the ability to process the message in a different way for each repetition.

The While element provides a function of activating a while loop that loops until a Simple expression is evaluated as false or null.

The If or Switch-Case element provides a function that allows a message to be routed to a correct destination based on content of a message exchange.

The Try-Catch element may support the same exception handling function as that of Try-Catch of Java.

Therefore, the integration flow may be coded based on graphics using the illustrated control flow block.

FIG. 19 is a diagram illustrating an example of coding a modifier among the integration flow functions based on graphics when developing the integration flow based on an embodiment.

Depending on the embodiment, the integration flow, which may be developed based on graphics, may be coded based on a visual interface using a modifier block.

In the example of this figure, the modifier block may include a loadProperty element, a setProperty element, a setHeader element, a setBody element, a removerHeader element, and a removeProperty element provided graphically.

The loadProperty element provides a function of retrieving a setting node from the setting registry and storing the setting node in an Exchange Property.

The setProperty element may provide a function of assigning a value to the Exchange Property.

The setHeader element may provide a function of specifying a value for an Exchange Message Header.

The setBody element may provide a function of specifying a value for an Exchange Message Body.

The removerHeader element may provide a function of removing a value from the Exchange Message Header.

The removeProperty element may provide a function of removing a value from the Exchange Property.

The integration flow may be coded based on graphics using the illustrated modifier block.

The following discloses an example in which users such as clients may be distinguished and each workspace may be isolated according to the embodiment disclosed above.

When software packages provided to clients using the workspace are the same and the same software image is executed for each client, all versions and types of software packages need to be prepared and provided for each client.

However, according to the embodiment disclosed below, even when the application service is provided using the same software package, resources may be efficiently used and a service isolated for each workspace used by the client may be provided.

A detailed example will be disclosed as below.

FIG. 20 is a diagram disclosing an example of providing a unique workspace isolated depending on the client according to an embodiment.

In the illustrated example, the instance system 1000 may include a coordinator (not illustrated) and one or more worker nodes. In this example, a plurality of worker nodes (Node #1, Node #2, Node #3, and Node #N) is illustrated.

The coordinator (not illustrated) according to the embodiment may allow access through user authentication when the user is connected, and provide each workspace according to the user.

In this example, it is assumed that the client 1 (110), the client 2 (120), and the client 3 (130) access the instance system 1000 according to the embodiment.

The manager system (not illustrated) may manage the coordinator and the worker nodes (Node #1, Node #2, Node #3, and Node #N) of the instance system 1000.

When each of the clients 110, 120, and 130 is connected through the coordinator (not illustrated), the instance system 1000 may provide each of the workspaces 1510, 1520, and 1530 isolated from each other according to users.

In this example, the client 1 (110) may be assigned and use the workspace A (1510), the client 2 (120) may be assigned and use the workspace B (1520), and the client 3 may be assigned and use the workspace C (1530).

When the client 1 (110) is assigned the workspace A (1510) on the instance system 1000, a worker node 1 (Node #1) may provide a package E, which is a workspace bundle unique to the workspace A (1510).

Here, the workspace bundle is a software package and represents a group of expandable software programs including detailed metadata.

In this instance, the worker node 1 (Node #1) may provide the software package E as a workspace bundle dependent on the workspace A (1510) or unique to the workspace A (1510) according to a request from the client 1 (110).

Here, the fact that the software package depends on the workspace A (1510) means that the software package E provided by the framework of the worker node (Node #1) includes authentication information related to the workspace A (1510).

That is, the package E, in which a framework of the worker node 1 (Node #1) is the software bundle including the authentication information related to the workspace A (1510) as a unique workspace bundle, is provided to the workspace A (1510).

Similarly, the package E, in which a framework of the worker node 2 (Node #2) is a software bundle including authentication information related to the workspace B (1520) as a unique bundle of the workspace B (1520) according to a request from the client 2 (120), is provided to the workspace B (1520).

Likewise, the package, in which a framework of the worker node 3 (Node #3) is a unique software bundle including authentication information related to the workspace C (1530) according to a request from the client 3 (130), is provided to the workspace C (1530).

Here, even though each of the worker nodes (Node #1, Node #2, and Node #3) provides the same software package E, the software package E including unique authentication information is provided for each of the workspaces 1510, 1520, and 1530.

Therefore, since an image in which the same software package E and different unique authentication information are combined is provided for each of the workspaces 1510, 1520, and 1530, the clients 110, 120, and 130 may have the effect of being isolated in workspaces thereof.

In this example, the framework of the worker node 1 (Node #1) provides the package E including the identification information of the workspace A and a separate package F to the workspace A (1510), and the framework of the worker node 2 (Node #2) provides the package E including the identification information of the workspace B and a separate package G to the workspace B (1520). Likewise, the framework of the worker node 3 (Node #3) provides the package E including the identification information of the workspace C and a separate package H to the workspace C (1530).

The identification information of each workspace may be used as information to authenticate each workspace. As an example of authentication information, a non-repudiation token based on an RSA (Rivest-Shamir-Adleman) encryption algorithm may be used.

Therefore, when each client receives an application service through each workspace, the instance system verifies the application service provided for each workspace based on the authentication information of each workspace, so that each client may authenticate authority to the application service.

Therefore, when an application service according to a software bundle is provided through each workspace, a unique software bundle is installed in each workspace, and a service and an execution area provided accordingly may be isolated.

When software packages are requested from workspaces, the worker nodes (Node #1 to Node #N) may approve or reject downloading or execution of a requested application based on authentication information unique to each workspace.

Meanwhile, a Java framework such as OSGi may be used as an example of the frameworks of the worker nodes (Node #1 to Node #N). OSGi is a type of Java framework and may provide a software bundle including Java components and metadata in an execution environment. In this case, the worker nodes (Node #1 to Node #N) may provide an OSGi framework.

FIG. 21 is a flowchart disclosing an example of providing a package to the client from the isolated workspace according to an embodiment.

A request for the application package is received from the client (or partner) using the workspace (S110).

The manager system may manage the instance system and provide a service for the application package.

The instance system may provide a workspace to each client (or partner) based on the coordinator and the worker nodes.

The workspace of each client (or partner) may be isolated, and the client (or partner) may request a service for the application package from the instance system through the isolated workspace.

Authentication of the requested application package is performed based on authentication information included in the software bundle related to the workspace (S120).

When a worker node that provides a workspace in the instance system installs a software bundle in the workspace, a software bundle including authentication information unique to that workspace may be installed.

Here, authentication information may provide authentication to use other application package services. For example, as the authentication information, it is possible to use a non-repudiation token based on the RSA (Rivest-Shamir-Adleman) encryption algorithm.

Therefore, even when the same software bundle is installed in the workspaces provided by the worker node, different authentication information may be included for each workspace. Using this, a software bundle may have a dependency on the workspace in which the bundle is installed.

In addition, the authentication information of the workspace may be used as an authentication key to authenticate the application package of the requested service.

Workspaces may be isolated from each other by providing a workspace where the same software bundle except for authentication information may be implemented. In other words, even when the same software is executed in a workspace, workspaces may be isolated from each other since other authentication information is included.

According to the authentication result, the service request for the received application package is approved or rejected (S130).

When a worker node provides an application package requested from a workspace, authentication information of a software bundle installed in the workspace may be used as authentication information for the workspace. An example of a framework that may provide such a workspace, the OSGi framework, etc. has been illustrated.

Therefore, the worker node may provide the requested application package to the workspace only when the workspace is authenticated, based on the authentication information of the software bundle installed in each workspace.

When the authentication information of the software bundle installed in the workspace does not match, the worker node rejects provision of the application package service requested to be provided from the workspace.

The apparatus for providing the application service according to the embodiment disclosed above may include a manager system and an instance system.

The instance system is at least one server including a coordinator and a worker node, and the server may include a storage medium for storing data and a processor.

In this instance, the processor of the server may receive a service request for the application package from the client and perform authentication of the requested application package based on the authentication information included in the software bundle related to the workspace. In addition, the processor of the instance system may perform calculation to approve or reject a service request for the received application package according to an authentication result.

When the above embodiment is performed as an instance system-based program, the program may receive the service request for the application package from the client using the workspace. Further, a computer-executable program may perform authentication of the requested application package based on the authentication information included in the software bundle related to the workspace, and approve or reject the received service request for the application package according to an authentication result.

Even when the same software package is provided to the client (partner) using the workspace, if a different software image is executed for each client (partner), all versions and types of software packages need to be prepared and provided for one client (partner).

However, when using a framework that provides a workspace in which a software bundle including unique authentication information for each client is executed as in the disclosed embodiment, workspaces may be isolated from each other, and the application service may be provided using the same software package, so that computing resources may be efficiently utilized.

An example of using a channel through which the client or the partner may transmit and receive related information based on the platform provided by the manager system has been disclosed above.

An embodiment in which the client and the partner may transmit and receive data while maintaining information security will be disclosed below. An example in which an agent in the client or the partner and an agent adapter in the platform provided by the instance system exchange information with each other has been disclosed above.

In this way, access without installing an agent in the client or the partner may cause security problems in the system of the client or the partner. To circumvent this problem, the client or the partner may install an agent. In addition, the manager system may easily perform patching or upgrading using the agent installed in the client or the partner.

In addition, the agent adapter may perform protocol transformation or data transformation for data transmission and reception, and thus may facilitate communication by transforming a channel transmitted from the agent or a protocol for data transmission and reception.

The agent may manage access information for the installed client or partner system, etc. In this case, the agent may set connection information for access to resources in the client or partner system. For example, the agent may set a database of the installed system, a file system, user information, resource access, or management information. In addition, information may be polled from the agent adapter according to a set cycle or condition.

The agent adapter in the platform provided by the instance system may be installed on the instance system as an application package. When the agent installed on the client or partner system is registered, the agent adapter may perform setting to collect or store information from the registered agent according to a set cycle or condition.

The coordinator of the instance system may set a channel connectable to the agent. In addition, when a request is received from the agent through the set channel, the coordinator may map the channel and deliver the request to the agent adapter of the worker node.

When installed on the system of the client or the partner, the agent may have a variety of setting information. For example, an agent application may have setting information including agent-related setting information, security key information related to agent execution, resource management setting information, user management information, etc.

The platform of the instance system may provide an access interface allowing the client or the partner to download and execute the agent application.

Hereinafter, a user interface of the agent or the agent adapter will be illustrated, and an example of controlling the same will be described.

FIG. 22 is a diagram illustrating an interface of an agent provided by a platform in the instance system when the agent is executed according to an embodiment.

The client or the partner may install the agent application provided by the platform of the instance system to execute the agent application.

This diagram illustrates the interface of the agent when the agent application is executed and the agent is executed by the administrator or the user.

An administrator of the client or the partner may check a state menu 2115 indicating a current state through the agent.

The administrator may check agent public key information, information on synchronizing the agent and the agent adapter, and a state message in case of synchronization error from the state menu 2115.

In addition, the administrator may obtain information about whether the channel set in the agent adapter is connected to the resource, a connection time, and a connection state from the state menu 2115.

The manager of the client or the partner may use a menu 2120 allowing management of resources thereof that may be managed through the agent. In the example of this figure, the menu 2120 of resource management illustrates a database, a directory, an SAP system, or an IBM MQ system as resources that may be included and managed in the client or partner system. The administrator may manage resources and set location information or access information and an access path for each resource through the menu 2120 of resource management.

In addition, the manager of the client or the partner uses a user management menu 2130 allowing management of the agent user through the agent. The administrator may use the user management menu 2130 to manage the agent user and set permission for each user.

FIG. 23 is a diagram illustrating an example of an interface of an agent adapter provided by the platform of the instance system according to an embodiment.

The client or the partner may use the agent adapter provided by the platform of the instance system. The client or the partner may register the agent illustrated in the agent adapter provided by the platform of the instance system.

This figure illustrates the interface of the agent adapter. According to this example, the client (or partner) may register, in the agent adapter, an identifier 2210 of the agent installed on the partner (or client) system that may mutually communicate with the agent adapter, a name 2220 of the agent, a description 2230 that may describe the agent, etc.

The interface of the agent adapter may include a message box slot 2240 that stores documents or information received by the agent, and a message box slot 2250 that stores documents or information transmitted by the agent.

Further, the interface of the agent adapter may include information on an agent public key 2290 for authentication of the agent. Here, a hash value of a public key is illustrated as agent public key information.

The interface of the agent adapter includes means 2295 for activating connection or synchronization with the registered agent as described above. This example discloses that the agent adapter transmits and receives information to and from the agent through a button 2295 synchronized (active) with the agent.

As described above, the agent adapter may register setting information of the agent, and the setting information of the agent may be stored in a setting registry of the worker node where the agent adapter is installed.

In this way, it is possible to register or change the setting information of the agent installed on the client or the partner using the agent adapter. The agent set through the agent adapter may connect resources of the system where the agent is installed and exchange data with the instance system.

As described, the transmission channel refers to a channel that retrieves certain information from the resources of the partner (or client) system at a certain cycle and transmits the information to the client (or partner) system. In addition, the reception channel refers to a channel that stores information received from the client (or partner) system in a set format at a set location on the partner (or client) system.

Therefore, setting of the transmission channel here refers to setting of retrieving information or documents from the agent installed on the system of the client or the partner and storing the information or documents in a message box.

Further, setting of the reception channel refers to setting of storing information or documents received by the agent adapter through the channel setting in a certain location of the system of the client or the partner.

Below, examples of channel settings are illustrated in detail. The agent adapter may control transmission and reception of information or documents through channel settings.

FIG. 24 is a diagram illustrating another example of the interface of the agent adapter provided by the platform of the instance system according to an embodiment.

The type of channel set in the agent adapter installed on the node of the instance system may be different, and different settings may be made for the transmission and reception channels in the agent adapter. The type of channel set in each adapter may be the same as the type of resource managed by the agent.

This diagram illustrates resources managed by a certain agent. In the example of this figure, the agent manages a database and directory of the system on which the agent is installed, an SAP system in the corresponding system (SAP JCO), and an IBM system in the corresponding system (IBM MQ).

In this case, the agent adapter may set JDBC (Java Database Connectivity) 2310, which is a Java API connectable to the database, as a channel type for the database, and set a file 2320 that may be transmitted to and received from the directory for the directory.

Here, the agent adapter may set Java Connector (JCO) 2330 as a channel type for the SAP system, and set Message Queue (MQ) 2340, which is network software, as a channel type for the IBM system.

Here, the SAP system and IBM system are illustrated, and even when the client or partner system includes another system, a channel type related to the system may be set.

FIG. 25 is a diagram illustrating an example in which the agent adapter of the platform of the instance system sets the transmission/reception channel according to an embodiment.

This example illustrates an example of setting the transmission channel transmitted by the agent adapter (top) and an example of setting the reception channel (bottom).

In this example, when setting the transmission channel (top), it is assumed that an identifier (agent ID) of the agent transmitted by the agent adapter is test-agent, an identifier of the channel (channel ID) is file-send, a type of adapter is file (FILE), a transmission direction is SEND, and an adapter version is 1.0.

The agent adapter may set the unit of the transmission schedule (polling schedule) to seconds or cron, and may set the channel according to the type of adapter.

In the illustrated example, source information 2410, which is location information of the file for the transmission channel, may be set. Here, as the source information 2410, it is possible to set a directory name (file-send), a file name or extension (*.txt), a file encoding type (UTP-8), etc.

Further, after transmitting information to the transmission channel, it is possible to set a processing mode 2420, time information for checking whether there is any changed content on the set channel (modification check wait millis), maximum file size information 2430, etc.

In this example, when setting the reception channel (bottom), it is assumed that an identifier (agent ID) of the agent received from the agent adapter is test-agent, an identifier of the channel (channel ID) is file-recv, a type of adapter is file (FILE), a transmission direction is transmission (RECV), and an adapter version is 1.0.

This example illustrates that it is possible to set location information (file-recv) of the file received through the reception channel, a file name or extension (*.txt), a file encoding type (UTP-8), etc. (2450).

FIG. 26 discloses an example of transmitting EDI data, which is transaction information, using the platform of the instance system according to an embodiment.

The agent adapter 1350 provided by the instance system according to the embodiment may exchange information with the system of the agent 350 installed on the client or partner. In this case, the exchanged information may be stored in the message box 2110 of the manager system that provides and manages the instance system.

The agent adapter 1350 installed on the worker node of the instance system according to the embodiment may include an agent controller 1351, a transmission/reception setting unit 1352, and a transmission/reception processor 1353.

Meanwhile, the agent 350 installed in the client or partner system may include an agent control processor 351, a transmission/reception setting processor 353, and a transmission/reception unit 357.

In general, since the agent adapter 1350 is a software package, the agent controller 1351, the transmission/reception setting unit 1352, and the transmission/reception processor 1353 may each be a logical component of software. Likewise, since the agent 350 is a software package, the agent control processor 351, the transmission/reception setting processor 353, and the transmission/reception unit 357 may each be a logical component of software.

To transmit and receive data from the client or partner system as data for transactions such as EDI data, the client or partner may install an agent to communicate with the internal system for information. This example illustrates the case where the client or partner system includes an internal system such as an SAP ERP system, a database such as RDBMS, or a message queue of the IBM system.

The agent controller 1351 may control the agent 350 installed in the client or partner system. For example, the agent controller 1351 may start, end, or update the agent 350. In this case, when the agent controller 1351 updates only request information for controlling the agent 350 without directly requesting and controlling the agent 350, the agent control processor 351 of the agent 350 may retrieve the updated request information at a set cycle and perform agent control according to the request information.

The transmission/reception setting unit 1352 of the agent adapter 1350 may change and set transmission/reception processing information of the agent 350. In this case, the transmission/reception processing information to be changed may not be transmitted to the agent 350 but may be stored in the transmission/reception setting unit 1352.

Then, the transmission/reception setting processor 353 of the agent 350 may periodically retrieve the transmission/reception processing information changed by the transmission/reception setting unit 1352 of the agent adapter 1350 and store the transmission/reception processing information as a file. The stored transmission/reception processing information is valid only while the agent 350 is being executed. When the agent 350 is restarted, the agent 350 may retrieve new transmission/reception processing information from the agent adapter 1350 and process the information again. Accordingly, the agent adapter 1350 may remotely set and control transmission and reception operations of the agent 350.

The transmission/reception unit 357 of the agent 350 may use the transmission/reception processing information stored as a file to retrieve information from the internal system (here, the SAP ERP system, an RDBMS database, and the message queue) and transmit the information to the transmission/reception processor 1353 of the agent adapter 1350, or change and store the information received from the transmission/reception processor 1353 of the agent adapter 1350 in the internal system.

Meanwhile, the transmission/reception processor 1353 stores system information transmitted by the transmission/reception unit 357 of the agent 350 in the message box 2110 in the manager system, or causes the transmission/reception unit 357 of the agent 350 to receive various information set in the agent adapter 1350, and stores the information in the message box 2110.

In this way, the platform according to the instance system may install the agent on the client or partner system and allow the installed agent to communicate with the agent adapter of the platform, thereby allowing stable data communication of the client or partner system.

In addition, the agent communicates with the agent adapter through authentication, and the agent adapter may remotely perform settings for data transmission and reception of the agent. Accordingly, setting management may be performed safely and easily by minimizing direct setting of operations or information on the agent by the agent adapter.

FIG. 27 is a diagram disclosing an example in which the platform of the instance system provides data to the client system according to an embodiment.

The platform of the instance system according to the embodiment may provide data transmitted from the partner system to the client system.

The embodiment sets channel information to be provided to a first computing system outside the platform based on a platform that provides an isolated workspace (S171).

The platform providing the isolated workspace includes the instance system and may include one or more nodes. As illustrated, the first computing system may be a partner (or client) system. In this case, channel information to be provided to the agent installed in the partner system may be set in the agent adapter installed in the worker node of the illustrated instance system.

When the agent adapter is installed in the worker node of the instance system that provides the workspace, the agent adapter may set channel information thereof in the coordinator of the instance system through the worker node.

The channel information includes a channel type, and the channel type may include a channel type allowing access to the database, a file type that may be transmitted and received in a directory, a connector type of a computing system, a message type of computer network software, etc. An example related to channel settings is disclosed in FIG. 25.

Data related to the first computing system is received according to the set channel information (S175).

When the channel information is set in the agent adapter as above, data related to the first computing system may be received from the agent installed in the partner (or client) system that is the first computing system.

That is, under certain conditions, information related to the partner system may be received from the agent of the partner system according to the set channel information.

The received data related to the first computing system is provided to a second computing system using the workspace outside the platform (S179).

The received information may be provided to the client system, which is the second computing system. In this way, data such as transaction information may be transmitted and received between the partner system and the client system through the platform of the instance system according to the embodiment.

A detailed example in which the worker node in which the agent adapter is installed in the instance system receives data transmitted from the partner system is disclosed in FIG. 26.

FIG. 28 discloses an example in which the platform of the instance system receives data from the partner system according to an embodiment as below.

Channel information set based on the platform that provides the isolated workspace is provided to an agent installed in the first computing system outside the platform (S181). An example related to channel settings has been disclosed in FIG. 25.

When the agent adapter is installed on the worker node in the instance system that provides the workspace, the agent adapter may provide set channel information to the agent of the external first computing system (partner or client system) under certain conditions.

The channel information includes a channel type, and the channel type may include a channel type allowing access to the database, a file type that may be transmitted and received in a directory, a connector type of a computing system, a message type of computer network software, etc. An example related to channel settings has been disclosed in FIG. 25.

Based on the provided channel information, data collected in relation to the first computing system may be received (S185).

The agent adapter installed in the instance system may receive data related to the partner (or client) system, which is the first computing system, based on the provided channel information.

The collected data may be stored in a storage medium and the stored data may be provided to the second computing system outside the platform (S189).

Data of the partner system, which is the first computing system, may be information related to or necessary for a transaction such as EDI, and the client system, which is the second computing system, may store the information received from the partner system, which is the first computing system, in a storage medium such as a message box. Further, the stored data may be provided to the client system based on the platform that provides the workspace.

An example of providing for storing the received data of the partner system in the message box has been disclosed in FIG. 26.

The apparatus for providing the application service according to the embodiment disclosed above may include a manager system and an instance system.

The instance system is at least one server including a coordinator and a worker node, and the server may include a storage medium for storing data and a processor.

The instance system may provide a platform including an isolated workspace, and the processor of the server may set channel information to be provided to the first computing system outside the platform based on the platform. Here, the first computing system may be the partner system (or client system).

The processor of the server may receive data collected in relation to the first computing system according to the set channel information, and provide the collected data to the second computing system using the isolated workspace. Here, the second computing system may be a client system (or partner system).

Meanwhile, the processor of the server may provide channel information set based on the platform to the first computing system outside the platform.

The processor of the server may receive data collected in relation to the first computing system based on the provided channel information, store the collected data in a storage medium, and provide the stored data to the second computing system outside the platform.

Here, the first computing system may be a partner system (or client system), and the second computing system may be a client system (or partner system).

An example of the apparatus for providing the application service may be given with reference to the above detailed example of the instance system and channel setting.

When the above embodiment is performed as a program based on the instance system, the program may set channel information to be provided to the first computing system outside the platform based on the platform, receive data collected in relation to the first computing system according to the set channel information, and provide the collected data to the second computing system using the isolated workspace.

In addition, the program may provide channel information set based on the platform to the first computing system outside the platform, receive data collected in relation to the first computing system based on the provided channel information, allow the collected data to be stored in a storage medium, and provide the stored data to the second computing system outside the platform.

Here, the first computing system may be a partner system (or client system) and the second computing system may be a client system (or partner system).

According to the disclosed embodiment, information may be transmitted and received without causing security problems in the client or partner, and patching or upgrading may be easily performed using an agent installed in the client or partner outside the platform.

FIG. 29 is a diagram disclosing an embodiment of executing the adapter in the workspace according to an embodiment.

For easy development of the adapter package, the present invention provides an easy construction method for various standard linkage protocols and aims to provide an app store 1510 for exchanging the adapter package between developers.

Here, the app store 1510 may include an adapter package sales unit 1501 and an adapter package purchase unit 1502. In this instance, the app store 1510 may refer to the above-described embodiment and may represent a platform where developers may upload the adapter package and the user may purchase and download the adapter package. Details thereof will be described later. In one embodiment, approval of the administrator is required for a developer to sell the adapter package through the app store 1510.

As described above, the client (here, the client may include both the developer and the user) 100 may create, execute, and change various packages in the workspaces 1500 and 3000. In particular, the client 100 may execute the adapter package in the workspaces 1500 and 3000. An embodiment of executing the adapter package has been described above. In one embodiment, the developer may develop an adapter in the application service manager and execute the adapter in the workspaces 1500 and 3000 to test the developed adapter. In this instance, each adapter package may be installed in the workspaces 1500 and 3000, and a program (program code and related configuration) included in the installed adapter package may be executed in the workspaces 1500 and 3000.

In one embodiment, when executing the adapter, requirements may be solved by interaction with the above-described platform. In other words, the platform illustrated in the figure may be provided through the above-described application service manager and is not a concept included in the workspaces 1500 and 3000.

The service provided by the platform may support the following functions.

The message box service represents a service that retrieves and stores transmitted and received documents.

A communication protocol access service represents a service for accessing external communication protocols. For example, the service represents a service for HTTP/HTTPS and FTP access.

A setting registry service represents a service that stores and retrieves a configuration necessary for execution of the adapter.

In this way, a platform service provider has an advantage of being able to expect additional profits and expansion effects by providing an app store to buy and sell adapters and the workspaces 1500 and 3000 to develop and execute adapters.

In addition, there are advantages in that the user may construct various standard linkage protocols through processes of purchasing, installing, configuring, and executing the created adapters, and the developer developing the adapters may generate profits by developing and selling the adapters.

FIG. 30 is a diagram disclosing an example of the adapter package.

A package is a bundle of programs (code files or configuration files) installed and executed in the workspace, and includes an adapter package, an integration package, and a resource package. Descriptions of the integration package and the resource package have been given above.

The adapter package represents a package that supports the use of various services in various types of protocols and platforms for integration. In general, the adapter package is configured in a web-based manner using services in the platform, and set details (channels) may be used in the integration package. A description thereof has been given above.

In one embodiment, the adapter package may include the following adapters. In other words, a wide variety of requirements may be addressed using the adapter packages described later.

A first adapter package 1520*a* may include a protocol adapter. Here, the protocol adapter includes standard protocol communication adapters such as EDIINT and OFTP.

The second adapter package 1520*b* may include a mapping/transform program adapter. Here, the mapping/transform program adapter refers to an adapter provided to facilitate mapping and transform tasks.

A third adapter package 1520*c* may include a web scraping adapter. Here, the web scraping adapter refers to a scrap function adapter in a web service provided only as a web service rather than standard communication.

A fourth adapter package 1520*d* may include a development wizard adapter. Here, the development wizard adapter represents an adapter that creates a linked flow (program flow) of specific patterns using a wizard method.

It is obvious that the adapter package may include other adapters developed by the developer through the workspace in addition to the adapters described above.

FIG. 31 is a diagram disclosing an example of executing the adapter in the workspace according to an embodiment.

In one embodiment, it is possible to provide an application service manager that develops an adapter and a workspace that executes the developed adapter (S210).

The developer may develop the adapter through the application service manager described above. Thereafter, the developer may execute the developed adapter in the development workspace to test the developed adapter.

More specifically, the developer may develop and update the adapter package. To this end, the developer may install the adapter package into the workspace and execute the adapter.

In this instance, the development workspace that executes the developed adapter for testing and the operation workspace that actually uses the adapter may be separated from each other. In this instance, distinction between the development workspace and the operation workspace corresponds to a logical concept.

In one embodiment, an app store that sells and purchases the developed adapter package may be provided (S220).

The developer may include the developed adapter in the adapter package and sell the adapter through the app store. In one embodiment, the developer of the adapter package may grant developer privileges to other users.

In particular, the developer of the adapter package may develop custom classes and register the custom classes as components in application context, which will be described later. In this instance, the developer may refer to other components and may also refer to a web service (Rest and Servlet classes).

The developer may designate a designated class as a Singleton Component. Here, it is possible to refer to the component through Application Context in other components, Rest, or Servlet Service.

The user may purchase the adapter package sold in the app store.

In one embodiment, it is possible to install the purchased adapter package and provide a workspace to execute the adapter included in the adapter package (S230).

The user may install the adapter package in the workspace and install and execute the adapter included in the adapter package. In one embodiment, the user purchasing the adapter package may install the adapter package only in the workspace owned by the user since an isolated workspace is used for each user as described above.

FIG. 32 is a diagram disclosing an example in which the adapter uses the framework according to an embodiment.

A core may provide the following services. In this instance, the core corresponds to the framework described above.

(1) Configuration Repository: A Configuration repository may store and manage configuration setting information. In this way, it is possible to store setting data of a system and provide access to necessary configuration information.

(2) Distributed Task Service: A distributed task service may process and manage tasks in a distributed environment. In this way, it is possible to process task distribution, state tracking, etc. between several nodes or systems.

(3) Channel Registry: A channel registry may register and manage a communication channel. In this way, it is possible to register and use a channel for communication between different systems or packages.

(4) Message Box Service: A message box service may support message-based communication. In this way, it is possible to support asynchronous communication between various systems by providing functions such as message transmission, reception, storage, and routing.

(5) File Watch System: A file watch system is a system that processes file change and monitoring, and may monitor changed content of a file system and perform a necessary task.

The adapter of the present invention may use an API to use the framework. In other words, the adapter may use services of the core through the API.

The API may provide the following services.

(1) Configuration Service: A configuration service is a service interface that provides access to configuration setting and may support viewing, modification, and deletion of configuration data.

(2) Task Service: A task service is a service interface for using a function related to task processing, and may provide task management functions such as task creation, state inquiry, and result return.

(3) Channel Access Service: A channel access service is a service interface that provides access to a communication channel and may provide functions such as channel creation, message transmission, and reception.

(4) Message Box Access Service: A message box access service is a service interface that provides access to the message box and may provide functions such as creating, transmitting, receiving, and deleting messages.

(5) User Class: A user class is a class registered in the registry using the API and may be referenced by a web service or other classes.

(6) File Watcher: A file watcher is an interface that processes file monitoring, and may process a file change event and perform a necessary task.

User implement may provide the following services.

(1) Web Service: A web service is implementation code used by the user to develop a web-based service, and may provide necessary setting for execution by the adapter through a web interface.

(2) User Classes: A user class is a user-defined class created by the developer to implement logic of the developer, and may implement specific domain or business logic by utilizing a function of the core or the API.

(3) File Watcher Implementation: File watcher implementation is implementation code that processes file monitoring, and may interact with the file watch system to process a file change event and perform a necessary task.

FIG. 33 is a diagram disclosing an example of a service provided by the adapter package according to an embodiment.

Application context is a component included in the framework and may include a service API for adapter package development. For example, the service API may include WorkspaceIdentity, MessageAccessService, MessageSlotInfoService, ConfigurationService, TaskService, ChannelAccessService, FileAccessService, etc.

In one embodiment, the developer of the adapter package may designate a method performed according to a life cycle of the adapter package. In this instance, the developer may use an annotation related to the life cycle. For example, at the time of designation, a specific method may be executed when the package starts or ends. A description thereof will be given below.

In addition, services registered in the application context may interact with the user class registered as a bean. For example, the user implement class registered as a bean may include FileWatcher, TaskImple, ChannelProcessorImple, and other user-defined classes. These classes implement specific functions or business logic of the application and may be registered as beans in the application context and used for other components. In this way, it is possible to manage the instance of the user class in the framework and generate and use an object required in the application.

In one embodiment, the application context may register the user component as a bean, which is referenced in the web service (for example, Rest and Servlet). In one embodiment, when referring to the user component in the web service, the user component is directly referenced through the application context. A method is as follows.

Method:

T getInstacne (Class<T> type): Return a service and object registered in the application context WorkspaceIdentity getWorkspaceId( ) Refer to WorkspaceIdentity String getPackageId( ) Return an ID value of the package In this instance, Rest API may be implemented through JAX-RS API. To this end, a REST service may be registered as @RestService Annotation and access is allowed through /pkg/{workspace_install_path}/{package_install_path}/rest/{path}.

In addition, a Servlet API may be implemented through javax.servlet API.

To this end, Servlet is registered as @Servlet ("Servlet pattern"), and access is allowed through pkg/{workspace_install_path}/{package_install_path}/{Servlet pattern}.

WorkspaceIdentity is described as below. WorkspaceIdentity includes information about the workspace to which the adapter package belongs and may create a Ticket. WorkspaceIdentity corresponds to a class for workspace authentication when the adapter package uses a cloud EDI service. WorkspaceIdentity is required when using the API provided by the cloud EDI platform. A method is as follows.

Method:

getId( ) Return a unique ID of the workspace to which the package belongs getTicket( ) Return the Ticket that may authenticate the workspace to which the package belongs TaskService is described as follows. TaskService may provide functions related to distributed task scheduling. TaskService may register a task in a distributed environment and perform scheduling for periodic execution. A task registered by a distributed task service may be executed according to a designated time or event.

In other words, TaskService may be used in the adapter package to register and cancel a specific task in and from the distributed scheduler. The user may implement a task interface, and the distributed scheduler may support Cron and Second methods. A method is as follows.

Method:

register (TaskConfig config, Task task): Register a task in the distributed scheduler return: task unique ID)

unregister (String taskId): Cancel registration of a task having a unique ID from the distributed scheduler MessageBoxAccessService is described as follows. MessageBoxAccessService accesses an EDI message box to enable transmission and reception of documents. For example, a cloud-based message box may be accessed to transmit data, and received data may be processed. Here, the message box refers to an API for accessing a message box registry to store, view, and delete documents. A method is as follows.

Method:

send( ) Store a document in MessageBox queryPendingMessageList( ) Return a message record (message header) list in a transmission standby state (TBDL, WAIT) in the corresponding slow/path name receivePayload( ) Return a message body updateMessageStatus( ) Change a message state deleteMessage( ) Delete a message MessageSlotInfoService is described as below. MessageSlotInfoService corresponds to a service having slot information of a message box. A method is as follows.

Method:

getSlotId(String workspaceId, String pathname): Return a message slot ID matching a workspace ID and a path name getMessageBoxId(String slotId): Return a message box ID to which a message slot belongs getSlotMap(String workspaceId): Return a message slot list accessible in the workspace ConfigurationService will be described as below. ConfigurationService corresponds to a service allowing configuration information to be viewed, changed, and deleted by accessing a setting registry (Config Repository). In this way, it is possible to manage setting data and access necessary configuration information. ConfigurationService represents an API that allows a package to directly access the setting registry to read, modify, change, or delete a configuration of the package. A method is as follows.

Method:

list (WorkspaceIdentity, String packageId, String nodePath): A method for providing a web service that retrieves a node path list in a requested path of a specific workspace and a package, and retrieves configuration information necessary for a configuration screen UI in Web Admin In this instance, it is recommended to use FsWatchSystem to apply a set value in the adapter package.

create(WorkspaceIdentity, String packageId, ConfigNode node): Set a configuration node update(WorkspaceIdentity, String packageId, ConfigNode node): Change the configuration node remove(WorkspaceIdentity, String packageId, ConfigNode node): Delete the configuration node FileWatchSystem is described as below. FileWatchSystem may provide a function to monitor file changes in a given path or directory and perform necessary tasks. More specifically, FileWatchSystem may periodically monitor directories in registered paths, detect creation, change, and deletion of files, and perform an interface through a registered FsWatcher. Here, FsWatcher may implement actions to be performed when detecting changes to files in the path. For example, a method is as follows.

Method:

init(Set<File> fset, String path): Performed at the time of initial registration by FsWatcher. Forward a file set in the path registered as a parameter process(FsEvent): Forward a file and event type where changes are detected FileAccessService is described as below. FileAccessService may use a file access service to access an FTP server in a cloud EDI or access a file by accessing an external FTP. A method is as follows.

Method:

put(String workspaceId, String serviceName, String folderPath, String filename, byte[ ] body): Transmit a file through an FTP service path having ServiceNamed registered in the workspace get(String workspaceId, String serviceName, String folderPath, String filename): Receive a file present on the FTP service path having ServiceNamed registered in the workspace list(String workspaceId, String serviceName, String folderPath, String pattern): Search for a list of files matching a GLOB pattern among files in the target path.

delete(String workspaceId, String serviceName, String folderPath, String filename): Delete files on the target path ChannelAccessService is a component that provides a distributed channel access service according to a channel request, and may process a message or an event received from a channel by a specific process subscribing to the channel. In this way, data may be transmitted through the channel, and data may be received from the channel and processed. A method is as follows.

Method:

create(String channelId, String channelName): Create a channel in advance in the workspace subscribe(ChannelProcessor processor): Register an interface to be processed as a default channel of the package.

Subscribe(String channelId, ChannelProcessor processor):

Register a Channel Using a Specific Channel ID unsubscribe( ) Unregister the default channel of the package unsubscribe(String channelId): Unregister a specific channel call(ChannelRequest request): Call a specific channel FIG. 34 is a diagram disclosing an example of the adapter developed in the workspace according to an embodiment.

Through the above-described embodiment, the developer may develop a first adapter package 324 that serves as a router. Here, an adapter included in the first adapter package 324 corresponds to a service that facilitates routing by setting.

According to an embodiment, the client 310 may provide an application service such as the disclosed example to the desired partner 320. The embodiment not only provides a service from the client 310, but also allows the client 310 to directly provide a customized service to the desired partner 320 using the embodiment.

In this figure, an embodiment of providing an EDI service using the above-described first adapter package 324 will be described. In order for the client 310 to perform a transaction with the partner 320, the embodiment may provide the coordinator 1100 and worker nodes 1300*a* and 1300*b* included in the instance system. Here, the first worker node 1300*a* and the second worker node 1300*b* correspond to the same or different nodes.

In one embodiment, a first agent 312 is installed in an adapter package 311 with which the client 310 communicates, and EDI information, which is information required for a transaction, may be requested through the first agent 312. Here, the EDI information corresponds to an original EDI message 313.

The first agent 312 with which the client 310 communicates transfers the received requested EDI information to a message box service 2110. In one embodiment, the message box service 2110 may be provided by an application service manager.

The message box service 2110 may store the EDI information received from the first agent 312 in the client inbox 2111.

Thereafter, the EDI information may be transmitted to the first adapter package 324 executed on the first worker node 1300*a* in the instance system. Here, the first adapter package 324 may serve as a router as described above.

In one embodiment, the first adapter package 324 may store EDI information including the original EDI message 313 in the first partner outbox in the message box service 2110 based on information received from the coordinator 1100. In addition, the first adapter package may transmit the EDI information including the original EDI message 313 to the integration package 1380 of the second worker node 1300*b* based on the information received from the coordinator 1100. In this instance, the first adapter package may refer to the distributed scheduler of the coordinator 1100 and look up an adapter channel registry.

The integration package 1380 may transform the EDI information received through the above-described embodiment. In this instance, the integration package 1380 may subscribe to the adapter channel registry. Here, subscription refers to a process of registering (subscribing to) a "distributed channel name" to be called when a specific flow or logic of the integration package is called from the router package. For example, the router package of node #1 may make a call by looking up the coordinator 1100 to determine a node on which the corresponding channel is present.

Accordingly, the second worker node 1300*b* including the integration package 1380 may store EDI information including a transformed EDI message 314 in a second partner outbox of the message box service 2110.

Thereafter, the message box service 2110 may deliver the EDI information including the original EDI message 313 stored in the first partner outbox to a first partner 322 of an adapter package 321 that communicates with the partner 320. In addition, the message box service 2110 may transmit the EDI information including the transformed EDI message 314 stored in the second partner outbox to a second partner 323 of an adapter package 321 that communicates with the partner 320. Here, the first partner 322 and the second partner 323 correspond to transaction partners of a client company. A reason therefor is that the client company (client) may exchange documents with several partners.

As a result, the partner 320 may receive the EDI information delivered by the client 310 as standardized EDI transformation data. Even when the partner 320 delivers the EDI information thereof to the client 310, the data may be delivered according to a similar process.

Therefore, the client 310 and the partner 320 may easily use an application service such as the EDI service according to the disclosed embodiment, and may easily perform a transaction according to a standardized format even when the standardized format is not known or a transaction counterparty does not accurately understand a requested document and information.

In addition, the client 310 and the partner 320 may develop and use the adapter package in the workspace thereof, and link the adapter package to the integration package 1380. The embodiment may provide development of such a package and connection with the existing package through a significantly easy interface, and may sell, share, and separately provide the developed package.

FIG. 35 is a diagram disclosing an example of providing the framework for developing the adapter package according to an embodiment.

In one embodiment, the application service manager that develops the adapter package may be provided (S240). To this end, the application service manager may provide the developer with a developer tool. A description of the application service manager is given with reference to FIGS. 2 to 4.

In one embodiment, a first workspace for testing the developed adapter package may be provided (S250). Here, the first workspace corresponds to the development workspace. A detailed description of the development workspace is given with reference to FIGS. 2 to 4 and FIG. 9.

In one embodiment, A second workspace that executes the developed adapter package may be provided (S260). Here, the second workspace corresponds to the operation workspace. The client (developer or user) may use various application services by executing the adapter package in the operation workspace. Here, the application service may include at least one of a message box service, a communication protocol access service, or a setting registry service. A description thereof is given with reference to FIGS. 11, 32, and 33.

Thereafter, the method of providing the application service may upload the developed adapter package to the app store. In one embodiment, the developed adapter package may or may not be uploaded to the app store based on approval of the administrator. A detailed description thereof will be given below. The user may download the uploaded adapter package from the app store and execute and operate the downloaded adapter package in the isolated workspace of the user.

FIG. 36 is a diagram disclosing an example in which the apparatus for providing the application service provides the application package in the app store platform according to an embodiment.

The apparatus for providing the application service according to the embodiment of the present invention may include the instance system 1000 and the manager system 2000.

The manager system 2000 may provide an environment in which the client 110 may develop an application package. In other words, the client 110 of the user (third party, developer) may develop an application package through an environment provided by the manager system 2000 for needs thereof or for sales purposes.

In one embodiment, the application package may include at least one of an adapter package, an integration package, or a resource package. In this case, the adapter package may include a protocol adapter for linkage or a software package having several functions. In addition, the integration package may include a software package having a substantial integration flow. The integration package may be purchased by the client 120 and then changed to meet requirements of the client 120. In addition, the resource package may include a package that separately packages resource files additionally required for adapter package operation.

The client 110 may test the developed application package through the development workspace 3000 and transmit an upload request including the tested application package and additional metadata to the application service manager 2100 of the manager system 2000.

The application service manager 2100 may analyze several predefined approval conditions for the application package, determine whether the application package is suitable for sale, and approve the upload.

When approved, the corresponding application package may become an application package that may be purchased by the client 120 in the app store.

The client 120 may transmit a request to purchase an application package to the application service manager 2100 in order to purchase the corresponding purchasable application package.

The client 120 may install the purchased application package in the workspace 1520 thereof. The client 120 may set the installed application package to meet requirements thereof and actually operate the application package.

FIG. 37 is a flowchart disclosing another embodiment of the method of providing the application service according to an embodiment.

A request to upload an application package to the app store is received from the first client (S301).

In one embodiment, the upload request may include an application package and metadata for the application package. For example, the metadata may include at least one of a package name for the application package, detailed description of the package, a package type, package version information, payment type (for example, lump sum, subscription, and installment payment), sales price by country currency, registrant user information, or a registration time.

According to the upload request, upload of the application package to the app store is approved based on a predefined approval determination condition for the application package (S303).

In one embodiment, when at least one of source code for the application package, a list of external access permission request hosts for the application package, an external library used for the application package, or a file size of the application package satisfies the predefined approval determination condition, uploading of the application package to the app store may be approved.

In one embodiment, when there is no security vulnerability in the source code for the application package or the source code does not contain malicious code, upload of the application package to the app store may be approved.

In one embodiment, when the application package includes the adapter package, permissions for socket connections and file access to the adapter package may be restricted. Therefore, in the case of the adapter package that needs to be connected to an external network for a specific purpose (for example, Mail Sender, Web Scraper, etc.), a list of external access permission request hosts that need to be connected is checked, and when an external host included in the list is an externally accessible host, upload of the application package to the app store may be approved. In this case, the list of external access permission request hosts may be included in a resource file in the adapter package.

In one embodiment, in order for an application package to be installed and operate normally, external libraries referenced by the application package need to be provided in the installed platform environment. In this case, in the case of an external library not provided in the corresponding platform environment, additional procedures need to be performed so that the application package may be referenced, and thus dependency on the referenced external library may be checked. Accordingly, when the external library may be used by the application package, upload of the application package to the app store may be approved.

In one embodiment, when a file size of the application package is not greater than a threshold, upload of the application package to the app store may be approved. In other words, by checking the file size of the application package, it is possible to check whether the application package does not include unnecessary resources and whether the application package does not occupy excessive resources in the platform environment.

The app store provides the approved application package (S305).

In one embodiment, the approved application package may be registered in the app store based on metadata for the application package, and the application package may be provided according to a purchase request for the application package.

FIG. 38 is a flowchart disclosing another embodiment of the method of providing the application service according to an embodiment.

A purchase request for the application package is received from a second client (S311).

In one embodiment, the purchase request for the application package, which is a package uploaded to the app store and available for purchase, may be received from the second client.

According to the purchase request, the application package is provided to the second client (S313).

In one embodiment, when the application package is approved for sale based on the application package for the purchase request and package description and sales condition included in metadata of that application package according to the purchase request, the application package may be provided to the second client.

In one embodiment, the provided application package may be installed in the workspace of the second client. That is, the application package purchased by the second client may be installed in the workspace, which is an executable area of the second client. In one embodiment, the installed application package may be executed and operated according to setting information of the second client.

FIG. 39 is a diagram disclosing an example in which the apparatus for providing the application service provides a service for the application package according to an embodiment.

An apparatus for providing the application service 400 according to the embodiment of the present invention may provide SaaS to a client 100 that provides an internal system to at least one customer and at least one partner 200.

For example, the internal system may include enterprise resource planning (ERP), customer relationship management (CRM), and warehouse management system (WMS), and may include various systems without being limited thereto.

In one embodiment, the client 100 may provide a service through the internal system to at least one client company (not illustrated) connected through multitenancy.

In one embodiment, the apparatus for providing the application service 400 may provide the client 100 with an application package in the form of an API so that the service may be used by incorporation into the internal system of the client 100.

In one embodiment, the client 100 and the apparatus for providing the application service 400 may transmit and receive messages. In this instance, the client 100 may transmit a message to the apparatus for providing the application service 400. For example, the message may include an EDI message.

The apparatus for providing the application service 400 may identify the client 100 based on an authentication key corresponding to the client 100 included in the message and provide a service for the application package to the identified client 100. In one embodiment, the authentication key may include an API key corresponding to the client 100 for the application package.

According to the present invention, an API key and asymmetric key encryption (Rivest-Shamir-Adleman, RSA) method may be applied to provide multitenancy.

Therefore, according to the present invention, the apparatus for providing the application service 400 may connect EDI/API with a service provider that provides enterprise services such as ERP, CRM, and WMS to several companies. Accordingly, when a plurality of suppliers is connected to one company, such as a domestic or foreign distributor or an automobile manufacturer, and uses EDI/API, a first connected company may be commonly used by a plurality of suppliers.

FIG. 40 is a diagram disclosing another example in which the apparatus for providing the application service provides the service for the application package according to an embodiment.

The client 100 may include an agent 350 including an API provider 610, a message management unit 620, an encryption/decryption unit 630, and a transmission/reception unit 640, a management screen unit 650, and a database 660. In this case, the API provider 610 may provide an API for data transmission and reception functions and monitoring to allow use in an internal system (for example, ERP system).

In addition, the management screen unit 650 may manage an API key for each client using the internal system and display a screen for monitoring message transmission and reception details.

In one embodiment, the apparatus for providing the application service 400 may provide the client 100 with a user interface (UI) for managing an authentication key and monitoring message transmission and reception details. In this way, the user of the client 100 may check a history of processing of transmission and reception of documents of the message and content of the transmitted and received documents through the management screen unit 650. For example, a processing history, a state, and a processing time of a document may be viewed.

The message management unit 620 may encrypt and delete messages according to message management and storage policies. In addition, the message management unit 620 may store messages and transmission/reception history information in the database 660.

The encryption/decryption unit 630 may encrypt and decrypt data, and perform digital signature and verification on data. For example, the encryption/decryption unit 630 may perform encryption/decryption, signature, and verification based on an RSA encryption algorithm.

The transmission/reception unit 640 may transmit a message including data, an electronic signature, and an authentication key to the agent adapter 1350 of the apparatus for providing the application service 400, and receive a message from the agent adapter 1350.

The transmission/reception unit 640 may retrieve information from the internal system (for example, ERP system), transform the information into data, and transmit the data to the transmission/reception unit 710 of the agent adapter 1350, or may transform data received from the transmission/reception unit 710 of the agent adapter 1350 and store the data in the internal system.

In one embodiment, the apparatus for providing the application service 400 may include an agent adapter 1350 and a manager server 2100. The agent adapter 1350 may include a transmission/reception unit 710, a client company identification unit 720, an encryption/decryption unit 730, and a format transformer 740.

The transmission/reception unit 710 may receive a message from the agent 350 of the client 100 or transmit a message to the agent 350. In one embodiment, the transmission/reception unit 710 may store a message received from the transmission/reception unit 610 of the agent 350 in the message box 2110 in the manager system 2100, or may allow the transmission/reception unit 610 of the agent 350 to receive various information set by the agent adapter 1350 and store the information in the message box 2110. The client company identification unit 720 may identify a client company that receives services through the internal system of the client 100 using the authentication key included in the message.

The encryption/decryption unit 730 may encrypt and decrypt data, and apply electronic signatures to and perform verification on data. For example, the encryption/decryption unit 730 may perform encryption/decryption, signature, and verification based on the RSA encryption algorithm. The format transformer 740 may transform a data format of decrypted data. The transmission/reception unit 710 may transmit a message whose data format has been transformed to the partner 200.

FIG. 41 is a flowchart disclosing an example of the method of providing the application service according to an embodiment.

A message including an authentication key of the client company for the internal system of the client 100 is received from the client (S401).

In one embodiment, the message may further include data encrypted using a public key of the apparatus for providing the application service 400 based on the RSA encryption algorithm, and an electronic signature signed using a private key of the client 100 based on the RSA encryption algorithm. For example, the data may include data for transactions such as EDI data.

The client company is identified based on the authentication key (S403). In one embodiment, the authentication key may include an API key representing identification information of the client company. For example, the API key may contain unique code to identify the client company.

In one embodiment, based on an authentication key table previously stored in the apparatus for providing the application service 400, the client company may be identified by comparing an authentication key list for client companies included in the authentication key table with an authentication key included in the received message.

A service is provided based on a message for the identified client company (S405). In one embodiment, encrypted data may be decrypted, a data format of the decrypted data may be changed, and the data may be transmitted to a partner. That is, according to the present invention, it is possible to provide an affiliate service of the client 100 that provides services through the internal system to several client companies.

FIG. 42 is a flowchart disclosing an example in which the method of providing the application service provides a service according to an embodiment.

The encrypted data is decrypted using the private key of the apparatus for providing the application service 400 based on the RSA encryption algorithm (S411). In one embodiment, data encrypted using the public key of the apparatus for providing the application service 400 based on the RSA encryption algorithm may be decrypted using the private key of the apparatus for providing the application service 400. In one embodiment, a hash value may be generated by hashing the decrypted data.

The electronic signature on the decrypted data is verified using the public key of the client 100 based on the RSA encryption algorithm (S413). In one embodiment, the electronic signature signed using the private key of the client 100 based on the RSA encryption algorithm may be verified using the public key of the client 100. In one embodiment, the client 100 may confirm that a hash value generated by hashing data before encryption coincides with a hash value generated by hashing the decrypted data.

The data format of the decrypted data is changed based on a pre-stored schema for the data and a pre-stored mapping script (S415).

In one embodiment, for EDI service, documents need to be mapped between two transaction parties, bytes or strings included in data (for example, EDI data) according to the pre-stored schema are decoded and transformed into decoded data, schemas are mapped to each other based on data and schemas of data to be transformed based on the mapping script, and a data format may be changed.

Data having the changed data format is transmitted to the partner 200 (S417). In one embodiment, according to the present invention, data regarding transactions between companies may be standardized and transmitted between transaction parties to convey information. In this case, connection may be efficiently performed without constructing an EDI system individually at the client company connected through multitenancy to the client 100 that provides a service of the internal system.

FIG. 43 is a diagram disclosing an example in which the apparatus for providing the application service transforms a data format according to an embodiment.

In the illustrated example, an apparatus for providing the application service 300 may include an instance system (not illustrated) and a manager system (not illustrated). The instance system may include a worker node (for example, Node #N) on which the agent adapter 1350 and the mapping adapter 1370 are installed, and may provide application services to the client 100 and the partner 200.

The manager system (not illustrated) may include the application service manager 2100, and the application service manager 2100 may obtain data collected by an agent 350 of the client 100 and an agent 450 of the partner 200 from the agent adapter 1350 installed on the worker node. The mapping adapter 1370 may unmarshall source document data of the client 100 and output the source document data as target document data mapped to information required by the partner 200.

Accordingly, the apparatus for providing the application service 300 according to the embodiment of the present invention may include an agent adapter 1350, a mapping adapter 1370, and an application service manager 2100.

The agent adapter 1350 may include a transmission/reception unit 810. The transmission/reception unit 810 may receive source document data from the agent 350 of the client 100. For example, the source document data may be expressed as text data. In one embodiment, source document data received from the agent 350 may be stored in a message box 2110 included in the application service manager 2100.

The mapping adapter 1370 may include a deserialization unit 820, a mapping unit 830, and a serialization unit 840. In this case, the deserialization unit 820 may transform source document data having a first data format into source structure data based on a pre-stored source schema. The mapping unit 830 may transform source structure data into target structure data based on at least one of a pre-stored source schema, a pre-stored mapping script, or a pre-stored target schema. The serialization unit 840 may transform target structure data into target document data having a second data format based on a pre-stored target schema. In one embodiment, the transformed target document data may be stored in the message box 2110.

In one embodiment, at least one of the source schema, the mapping script, or the target schema may be generated based on user input of the client 100 or the partner 200 for a GUI of a platform of the instance system 1000 provided to the client 100 or the partner 200, and may be received through the agent adapter 1350 and stored in advance in the message box 2110.

The agent adapter 1350 may receive the target document data having the second data format transformed from the source document data having the first data format from the message box 2110 and transmit the target document data to the agent 450 of the partner 200.

FIG. 44 is a diagram disclosing an example in which the apparatus for providing the application service transforms the data format using a schema and a mapping script according to an embodiment.

The deserialization unit 820 may transform the source document data having the first data format into the source structure data based on the pre-stored source schema. In one embodiment, the first data format may include at least one of a first data format or a first data structure.

The deserialization unit 820 may transform source document data (for example, text) into source structure data (that is, internal structure) as opposed to serialization. In other words, the deserialization unit 820 may parse source structure data from source document data.

That is, the deserialization unit 820 may perform serialization (parsing) to create an internal document structure to which source document data (that is, the original data) may be mapped based on structure information and annotation information of a source schema for the source document data. The mapping unit 830 may transform source structure data into target structure data based on at least one of a pre-stored source schema, a pre-stored mapping script, or a pre-stored target schema. In one embodiment, the mapping script may include at least one of statement information representing grammar of a programming language or expression information representing a specific result value.

In one embodiment, the mapping unit 830 may perform mapping to transform source structure data into target structure data using structure information including a structure (tree) and a name (identifier) of the corresponding source document data.

In one embodiment, at least one of a source schema, a mapping script, or a target schema may be included and stored in a mapping program. The mapping unit 830 may transform source structure data into target structure data based on the mapping program. In this instance, annotation information of the source schema and the target schema is used only in serialization and deserialization and is not used in the mapping program. A reason therefor is that mapping based on the mapping script is intended to focus only on mapping data between schema nodes of the source schema and the target schema.

That is, according to the present invention, functions of the mapping script and the annotation information of the schema are intentionally separated (SoC-Separation of Concerns), so that the mapping script is intensively used only for mapping, regardless of serialization and deserialization, and the annotation information of the schema is intensively used only for serialization and deserialization. In this way, it is possible to effectively support specialized language (DSL)-based mapping.

In addition, according to the present invention, serialization and deserialization may be performed to transform the data format (that is, at least one of the data format or the data structure), and the mapping may be performed to transform source structure data into target structure data regardless of transformation of the data format.

The serialization unit 840 may transform target structure data into target document data having the second data format based on a pre-stored target schema. In one embodiment, the second data format may include at least one of a second data format or a second data structure. That is, for example, the target document data may have a data format different from that of the source document data. In addition, as another example, the target document data may have the same data format and a different data structure when compared to the source document data.

Specifically, the serialization unit 840 may perform serialization to transform target structure data into target document data (for example, text) having the second data format based on structure information and annotation information of the target schema stored in advance.

For example, the serialization unit 840 may transform target structure data included in an internal program language variable into target document data such as EDI, XML, or JSON.

Therefore, according to the present invention, DSL may be used to define a schema for serializing/deserializing documents in various data formats using annotation information.

In addition, according to the present invention, it is possible to provide a self-mapping script language that may solve various mapping requirements using relatively simple programming language syntax.

In addition, according to the present invention, a unified schema definition grammar may be provided for documents of various data formats.

In addition, according to the present invention, it is possible to provide the ability to create simple mapping to complex mapping using a relatively simple mapping script language and Lua custom function.

In addition, according to the present invention, it is possible to easily develop functions by providing these functions as DSL.

FIG. 45 is a diagram disclosing an example of deserialization and serialization based on the schema according to an embodiment.

In one embodiment, deserialization may be performed to transform document data into structure data based on a schema for the document data. For example, the document data may include data of various documents such as EDI document, XML document, and JSON document. In this case, deserialization may be referred to as unmarshaling or a term having an equivalent technical meaning. In one embodiment, document data for deserialization may include source document data, and structure data may include source structure data.

In one embodiment, serialization may be performed to transform structure data into document data based on a schema for the document data. In this case, serialization may be referred to as marshaling or a term having an equivalent technical meaning. In one embodiment, structure data for serialization may include target structure data, and document data may include target document data.

In one embodiment, the schema may include at least one of structure information or annotation information for the document data. The structure information represents structure data of the document data and may include data defined as a data type. For example, the data type may include at least one of Primitive, Record, Array, or TypeRef.

Primitive may designate primitive types such as string, int, long, double, and decimal. For example, string represents a string data type, and int represents an integer data type. Other types may be located below record, and record may include collection of different types of data. Array may be defined as an array for a specific type and may include collection of the same type of data. TypeRef may be retrieved by referring to previously defined record.

In one embodiment, the annotation information corresponds to a data type and may include information used when recognizing (parsing and deserializing) corresponding data in document data. For example, @XmlElement (name=" " may represent an annotation, XmlElement written after @ represents a name of the annotation and includes an element of a name, which is name, and a value thereof may be "employee".

In addition, for example, when @JsonProperty(name=" " annotation information is included in a schema, a box of JSON document may be displayed as employee-id rather than id depending on the corresponding annotation information during marshaling. On the other hand, when @JsonProperty(name=" " annotation information is not included in a schema, a box of JSON document may be displayed as id depending on the structure information of int id; of the schema during marshaling. In one embodiment, this schema may be defined as a Backus-Naur Form (BNF), which is a grammar expression that may define syntax of a programming language.

FIG. 46 is a diagram disclosing an example of the mapping script according to an embodiment.

The mapping script may be used to transform source structure data into target structure data according to the form of the target schema. In one embodiment, the mapping script may include at least one of statement information representing grammar of a programming language or expression information representing a specific result value.

Here, the statement information may represent each line of the programming language of the mapping script. In other words, the mapping script may include statement information. In one embodiment, the statement information may indicate a correspondence between structure information of a source schema and structure information of a target schema.

For example, the statement information may include MapStmt, LoopStmt, IfStmt, MatchStmt, LoopVarSetStmt, and LoopVarIncStmt, and may include various statement information without being limited thereto. In this case, MapStmt may include statement information that performs mapping. LoopStmt may include statement information representing a loop and may perform the same function as that of a for statement in a general programming language. IfStmt may include statement information representing a conditional statement and may perform the same function as that of an if statement in a general programming language. MatchStmt may include statement information representing a conditional control statement and may perform the same function as that of a switch statement in a general programming language. LoopVarSetStmt may declare a variable to be used in a loop. LoopVarIncStmt may include statement information that increments a specific variable (for example, LoopVar).

In addition, expression information may designate where to retrieve a value to be used, and may indicate an expression reduced to a single value through evaluation. For example, expression information may include Constant, Path, Custom Function, and LoopVar, and may include various expression information without being limited thereto. In this case, Constant may be expressed by directly designating a string or number. Path may represent a specific path of a source. Custom Function may represent a function created by the user. LoopVar Loop represents a variable in a loop statement. For example, LoopVar such as #i may be represented.

In one embodiment, a mapping script may be included in a mapping program. In one embodiment, this mapping script may be defined as a BNF, which is a grammar expression that may define syntax of a programming language.

FIG. 47 is a flowchart disclosing an example in which the method of providing the application service transforms the data format according to an embodiment.

Source document data having the first data format is received from the client 100 (S501). For example, the first data format may include at least one of a first data format or a first data structure. In this case, the first data format may include EDI, flat file, JSON, or XML format.

For example, the EDI format may include the standardized X.12 or EDIFACT format, and may include various formats without being limited thereto. In one embodiment, when the source document data is EDI data, a source schema is an EDI schema and may use an EDI format of an SEF standard or an EDI format such as EXF.

In addition, a flat file may refer to a file including records not having structural correlation. For example, the flat file may include a text document with all document processing, other structural characters, or markup removed.

Source document data having the first data format is transformed into target document data having the second data format (S503).

In one embodiment, source document data may be transformed into source structure data based on a pre-stored source schema for the source document data, source structure data may be transformed into target structure data based on a pre-stored mapping script for the source structure data and the target structure data, and target structure data may be transformed into target document data having the second data format based on a pre-stored target schema for the target document data.

In one embodiment, specifically, deserialization may be performed to transform source document data having the first data format into source structure data based on at least one of structure information for source document data included in a pre-stored source schema or annotation information for structure information.

In one embodiment, mapping may be performed to transform source structure data into target structure data based on at least one of structure information for source document data included in a pre-stored source schema, statement information of a programming language included in a pre-stored mapping script, expression information, or structure information for target document data included in a pre-stored target schema.

In one embodiment, serialization may be performed to transform target structure data into target document data having the second data format based on at least one of structure information for target document data included in a pre-stored target schema or annotation information for the structure information.

Target document data having the second data format is transmitted to the partner 200 (S505). For example, the second data format may include at least one of a second data format or a second data structure. In this case, the second data format may include EDI, flat file, JSON, or XML format, and may include various formats without being limited thereto.

The following discloses an embodiment in which the client or partner may develop a necessary application based on an application package downloaded from a workspace.

The client or partner may access a workspace thereof in a platform of an instance system, and develop an application necessary for various tasks or transactions based on a GUI provided by the platform.

For example, when the client develops an application that delivers EDI information as a service, the client may develop a mapping program that may map standardized transaction information with the partner and provide information to the partner based thereon. Alternatively, the mapping program developed in this way may be sold on the platform of the manager system.

Even though the mapping program is illustrated here, the client or partner requires mapping of different information or documents depending on the type of operated business, the type of transaction, etc. Here, mapping refers to a process of transforming a-data (source) having an A-schema into b-data (target) having a B-schema. Here, a schema represents a structure of data, and nodes each having a name have a hierarchical structure.

Since types of these businesses are significantly diverse, the embodiment herein discloses an example in which a mapping program capable of mapping EDI information to the user may be significantly easily developed.

The platform according to the embodiment may provide an environment and interface allowing development of a mapping program, which is disclosed in detail as follows.

FIG. 48 is a diagram disclosing an example of providing a user interface for developing a mapping flow in the disclosed embodiments.

The user interface for developing the mapping flow of the present invention may include a development tool palette 901 and a development GUI code area 902.

Here, the development tool palette 901 may include graphic blocks corresponding to the structure and functions of the language used in the mapping program. That is, the development tool palette 901 may include the entire list of keywords used in the mapping program. For example, the development tool palette 901 may include graphic blocks corresponding to control structures and functions such as "Statements", "MAP", "If", "Then", "Loop for", "LoopVar", "LoopVar++", and "Match" used in the mapping program. However, it is obvious that the functions included in this figure are only examples and other functions may be included.

In one embodiment, the method of providing the application service may provide a user interface including the development tool palette 901 and a development GUI code area 902. In the user interface, the user may select a graphic block included in the development tool palette 901 and then drag and drop the graphic block into the development GUI code area 902.

For example, the user interface receives an input signal 903a, from the user, for selecting a graphic block of a first function (for example, "Statements" block) and then dragging and dropping the graphic block into the development GUI code area, the graphic block of the first function may be output in the development GUI code area 902. In this instance, the drag-and-drop input signal is only an example and other preset input signals received from the user may be employed.

Here, the "Statements" block is a block that sequentially includes other blocks and needs to be a top block of the mapping program. That is, the "Statements" block corresponds to a block including start and end of the mapping program.

Thereafter, when the user interface receives an input signal 903b, from the user, for selecting a graphic block of a second function (for example, "LoopVar" block) and then dragging and dropping the graphic block into the development GUI code area 902, the graphic block of the second function may be output in the development GUI code area 902. In this instance, the development GUI code area 902 may automatically include the second function in the first function.

In addition, the development GUI code area may output an input field of a parameter included in the graphic block of the second function without change. Referring to the "LoopVar" block mentioned above, the "LoopVar" block in the development tool palette is a block that declares a loop variable to be used in the "Loop for" block, and "variable name" and "initial value" need to be set. Accordingly, since there are two input fields for the parameters of the "Loop-Var" block (the variable name and the initial value), the input fields for the parameters may be output without change while outputting the "LoopVar" block in the development GUI code area.

Thereafter, the user may directly enter parameters in the input fields of the parameters of the "LoopVar" block. For example, the user may input the variable name "k" and the initial value "1" in the "LoopVar" block. Accordingly, the development code may declare a repetition variable k in a repetition statement and assign 1 as an initial value.

Thereafter, when the user interface receives an input signal (not illustrated), from the user, for selecting a graphic block of a third function (for example, a "Loop for" block) and then dragging and dropping the graphic block into the development GUI code area 902, the graphic block of the third function may be output in the development GUI code area 902. In this instance, the development GUI code area 902 may automatically include the third function in the first function after the second function.

In this way, the user interface for mapping flow development of the present invention may visually assist the user in forming a code structure in the development GUI code area 902 using a graphic block included in the development tool palette 901. In this way, there is an advantage of allowing the user to define a mapping program relatively easily even when the user is not familiar with development scripts.

FIG. 49 is a diagram disclosing an example of providing the user interface for developing the mapping flow in the disclosed embodiments.

The user interface for developing the mapping flow of the present invention may provide development source code 905 corresponding to the development GUI code area 902.

More specifically, the method of providing the application service may output source code corresponding to a function output to the development GUI code area 902 in a development source code area 904. That is, referring to the above-described embodiment, when the user selects a graphic block included in the development tool palette, outputs a function to the development GUI code area 902, and inputs a parameter corresponding to the function, the method of providing the application service may generate and output source code 905 corresponding to the function and the parameter on the development source code area 904.

In one embodiment, when the user directly modifies the source code 905, the user interface for developing the mapping flow may reflect the source code in real time and output a graphic block corresponding to the modified source code 905 in the development GUI code area 902.

In this way, developers may visually configure the mapping program through the development tool palette and development GUI code area 902, transform the mapping program into the source code 905, and check the source code 905.

However, even though developers not familiar with programming may easily access programming through the user interface of the present invention, developers familiar with programming may be more familiar with a source code method of compressively showing the program. Furthermore, in a flow of a mapping program where a large amount of mapping is repeatedly performed, the source code method may be more productive.

In other words, through the present invention, according to inclination of an individual, the developer may selectively use a method of directly modifying the development source code area 904 of the source code method or dragging and dropping the graphic block in the development GUI code area 902.

This GUI-based easy mapping program definition tool aids developers in easily implementing and managing complex mapping logic through a user-friendly interface and a visual programming method.

FIG. 50 is a diagram disclosing an example of providing the user interface for developing the mapping flow in the disclosed embodiments.

In one embodiment, the method of providing the application service may utilize a GUI-based library to provide a UI for developing the mapping flow. In this instance, Blockly library of Google may be utilized as a GUI tool for developing or editing the mapping flow. However, the GUI tool is not limited thereto.

More specifically, the user interface for developing the mapping flow may include a mapping program editing screen and a function editing screen.

This figure illustrates the mapping program editing screen. In one embodiment, the mapping program editing screen includes a mapping program area 906, a source schema area 907, a target schema area 908, and a mapping expression area 909.

Here, the mapping program area 906 may include the development tool palette and development GUI code area described above. That is, in the mapping program area 906, the user disposes necessary blocks (statements) in flow order so that transformation may be performed between a complex source schema and a target schema.

In one embodiment, the mapping program area 906 may include an icon 910 for outputting a source code area. When the user selects the icon 910, the user interface may output a source code area pop-up window for outputting source code corresponding to the development GUI code included in the mapping program area 906. Here, the source code area pop-up window may include the development source code area described above.

Further, in one embodiment, the user may select a MAP block among development GUI codes being output in the mapping program area 906. Accordingly, the user interface may output a source schema and a target schema corresponding to the map block to the source schema area 907 and the target schema area 908, respectively.

More specifically, the source schema area 907 indicates information on a data schema before transformation. In one embodiment, the user may add or delete information on the source schema.

The target schema area 908 represents information on a data schema after transformation.

The source schema area 907 and the target schema area enable easy connection between the source schema and target schema nodes.

Further, in one embodiment, the user interface may output a mapping line between a node included in the source schema and a node included in the target schema. In this way, the user may visually recognize whether a node of the source schema is mapped to a node of a certain target schema.

Further, in another embodiment, when the user interface receives an input signal for selecting a node included in the source schema and then dragging and dropping the node onto a node included in the target schema, the corresponding mapping expression may be automatically output to the mapping expression area 909.

The mapping expression area 909 is an area where mappings between actual nodes are performed and is displayed when a mapping block is selected among preceding blocks (statements), allowing several mapping expressions between the respective nodes to be inserted. In other words, the mapping expression area 909 corresponds to an area in which detailed values of the mapping expression are set. A description thereof will be given below.

FIG. 51 is a diagram disclosing an example of providing the user interface for developing the mapping flow in the disclosed embodiments.

The mapping expression area 909 corresponds to an area where mapping between actual nodes is performed. In one embodiment, when the user selects a map block among blocks included in the mapping program area 906, the user interface may provide a GUI block allowing input of a path, a data type (for example, string), a function, and an input value (arguments) included in the mapping block in the mapping expression area 909.

Accordingly, the user may select a function block and select one of various functions used in the mapping block. The various functions used in the mapping block will be described later.

FIG. 52 is a diagram disclosing an example of providing the user interface for developing the mapping flow in the disclosed embodiments.

In one embodiment, the user interface for developing the mapping flow may provide a schema editing screen. Here, the schema editing screen may include a schema editing area 911 and an annotation area 912.

As described above, the schema editing area 911 is an area where the user edits the schema used in the mapping flow, and this figure illustrates an example. Here, the schema editing area 911 represents a structure of data and may represent a hierarchical structure of nodes having names. Here, each node may have Int, String, etc. as a type. For example, the user may create a sample node in the mapping program area and set a data type or structure for each node. For example, "String" represents a string data type, and "Int" represents an integer data type.

The annotation area 912 corresponds to an area for editing information required when the data is expressed as text (serialization) in addition to the hierarchical structure of the data. In addition, the annotation area 912 corresponds to an area for editing additional information required when recognizing (parsing, deserializing) text as corresponding data in addition to the hierarchical structure of the data. Accordingly, the annotation area 912 may include an annotation list 913. Here, the annotation list 913 may include an annotation name and a document type.

In this instance, each annotation may be added several times per node, and several annotations having the same name cannot be added. There are several types of annotations depending on the document type (XML, JSON), and each annotation may have unique properties (arguments).

For example, "ZmlAttribute" may indicate that this node is an attribute rather than an element of XML when the corresponding node is serialized or deserialized in XML.

Further, the annotation area 912 may further include a user annotation list 914. Here, the user annotation list 914 may further add name and namespace as unique attributes (arguments) corresponding to existing annotations. However, name and namespace are not required values. In other words, both name and namespace may be optionally added. Here, the name may be used to describe a function or meaning of the corresponding argument, and namespace may be expressed in a URI (Uniform Resource Identifier) format to identify a logical group to which an attribute belongs. For the above example, as an additional attribute in "XMLAttribute", name may be designated when an XML Attribute name is different from a node name, and namespace may be designated when the corresponding XML Attribute belongs to a specific XML namespace.

They are used in subsequent interactions with XML or JSON and may indicate which members need to be processed in what way when serializing or deserializing data.

FIG. 53 is a diagram disclosing an example of providing the user interface for developing the mapping flow in the disclosed embodiments.

As described above, the user may customize functions included in the mapping block. When attempting mapping of certain data from the source schema to the target schema in the mapping program, a necessary function may be created and used in the mapping expression area.

In one embodiment, the function editing screen provided by the user interface to develop the mapping flow may include a function list area 915 and an editing area 916.

The function list area 915 represents an area where the user may customize functions. For example, the user may create a function and set the number of parameters for the function. For example, a "concat" function serves to concatenate strings, and thus is a function that combines given strings into one to create a new string. Accordingly, the "concat" function may receive two strings as parameters.

A+button included in the function editing screen allows the user to add a function to a function list. Further, functions output to the function list area 915 may be edited using an edit button, and functions output to the function list area 915 may be deleted using a delete button.

The editing area 916 corresponds to an area for editing information on a function selected in the function list area 915.

Here, each function performs an operation thereof and may be useful in programming or data processing tasks. The user may create functions using different implementation methods and grammars depending on the language or context actually used.

FIG. 54 is a diagram disclosing an example of the method of providing the application service in the disclosed embodiments.

In one embodiment, the method of providing the application service may provide the user interface including the development tool palette and the GUI block area (S601), which is understood with reference to content described above using FIGS. 15 to 19 and FIG. 48.

In one embodiment, the method of providing the application service may create a first function block corresponding to a first graphic block in response to receiving a signal for selecting the first graphic block included in the development tool palette from the user (S603). In this instance, the development tool palette may include at least one graphic block. For example, the user may select one of at least one graphic block included in the development tool palette, drag the graphic block, and drop the graphic block on the development GUI code area.

In one embodiment, the method of providing the application service may output the generated first function block to the GUI block area (S605). In this instance, the method of providing the application service may output source code corresponding to the function block included in the GUI block area to the source code area. One embodiment is characterized in that, upon receiving a signal to modify the source code from the user, the method of providing the application service modifies the function block being output to the GUI block area in real time, and the function block is modified based on the source code, which is understood with reference to content described above using FIG. 49.

The invention claimed is:

1. A method of providing an application service based on a computing system, the method comprising:

receiving, by a processor of the computing system, a channel request for transmitting and receiving information from a client system connected with the computing system, the computing system being configured to manage a platform for providing the client system with isolated workspaces in which application packages are executed, respectively; and providing, by the processor, a platform service for transforming the application packages in the isolated workspaces, wherein the providing a platform service comprises:

receiving, by the processor, source document with a first schema from the client system;

transforming, by the processor, the source document with the first schema into target document with a second schema based on a mapping script for transaction between the client system and a partner system through processes including:

performing deserialization by transforming the source document into source structure data based on the first schema;

customizable mapping the source structure data into target structure data; and performing serialization by transforming the target document based on the second schema, wherein the source document is transformed into source structure data in accordance with the first schema, wherein the source structure data is mapped into target structure data based on the mapping script, and wherein the target structure data is transformed into the target document in accordance with the second schema; and providing, by the processor, an Electronic Data Interchange (EDI) service between the client system and the partner system by transmitting the target document with the second schema to the partner system, wherein the platform service provides a development tool enabling graphic coding through a user interface, wherein the development tool includes a schema editing area and an annotation area in the user interface, wherein the schema editing area represents a hierarchical structure of data types for the customizable mapping, and the schema editing area allows a user to edit the customizable mapping through the user interface, wherein the annotation area includes first editing information required when the deserialization is performed, and the annotation area further includes second editing information required when the serialization is performed, and wherein the annotation area further includes annotation list having an annotation name and a document type.

2. The method according to claim 1, wherein the providing a platform service comprises:

receiving, by the processor, from the client system, a service request for the application packages;

authenticating, by the processor, the requested application packages based on authentication information included in a software bundle related to the isolated workspaces; and providing, by the processor, a service for the received application packages according to a result of the authentication.

3. The method according to claim 1, wherein the providing a platform service comprises:

setting, by the processor, channel information to be provided to a first computing system outside the platform based on the platform for providing the isolated workspaces;

receiving, by the processor, data collected in relation to the first computing system according to the set channel information; and providing, by the processor, the data collected to a second computing system using the isolated workspaces.

4. The method according to claim 1, wherein the providing a platform service comprises:

providing, by the processor, the client system with an application service manager for developing an adapter package;

providing, by the processor, the client system with a first workspace for testing the developed adapter package; and providing, by the processor, the client system with a second workspace for executing the developed adapter package.

5. The method according to claim 1, wherein the providing a platform service comprises:

receiving a request to upload the application packages to an app store from the client;

approving upload of the application packages to the app store based on a predefined approval determination condition for the application packages in response to the upload request; and providing the approved application packages in the app store.

6. The method according to claim 1, wherein the providing a platform service comprises:

receiving, by the processor, a message including an authentication key from the client system;

identifying, by the processor, the client system based on the authentication key; and providing, by the processor, a service based on the message for the identified client system.

7. The method according to claim 1, wherein the providing a platform service comprises:

creating, by the processor, a first function block corresponding to a first graphic block in response to receiving a signal from the client system to select the first graphic block included in the development tool palette by a user; and outputting, by the processor, the created first function block to a graphical block area in the user interface.

8. The method according to claim 1, wherein the first schema includes annotation information for a structure of the source document, and the second schema includes annotation information for a structure of the target document, and wherein the mapping script includes statement information representing grammar of a programming language.

9. An apparatus for providing an application service based on a computing system, the apparatus comprising:

a database configured to store data; and a processor of the computing system configured to process the data, wherein the processor is configured to:

receive a channel request for transmitting and receiving information from a client system connected with the computing system, wherein the computing system is configured to manage a platform for providing the client system with isolated workspaces in which application packages are executed, respectively, receive source document with a first data schema from the client system, transform the source document with the first schema into target document with a second schema based on a mapping script for transaction between the client system and a partner system through processes including:

performing deserialization by transforming the source document into source structure data based on the first schema;

customizable mapping the source structure data into target structure data; and performing serialization by transforming the target document based on the second schema, and transmit the target document data having the second schema to the partner system and provide an Electronic Data Interchange (EDI) service between the client system and the partner system, wherein the processor further provides a development tool enabling graphic coding through a user interface, wherein the development tool includes a schema editing area and an annotation area in the user interface, wherein the schema editing area represents a hierarchical structure of data types for the customizable mapping, and the schema editing area allows a user to edit the customizable mapping through the user interface, wherein the annotation area includes first editing information required when the deserialization is performed, and the annotation area further includes second editing information required the serialization is performed, and wherein the annotation area further includes annotation list having an annotation name and a document type.

10. The apparatus according to claim 9, wherein the first schema includes annotation information for a structure of the source document, and the second schema includes annotation information for a structure of the target document, and wherein the mapping script includes statement information representing grammar of a programming language.

11. A non-transitory computer-readable storage medium storing a computer-executable program for providing an application service based on a computing system, the computer-executable program performing steps comprising:

receiving a channel request for transmitting and receiving information from a client system connected with the computing system, wherein the computing system is configured to manage a platform for providing the client with isolated workspaces in which application packages are executed, respectively; and providing a platform service for transforming the application packages in the isolated workspaces, wherein the providing a platform service comprises:

receiving source document with a first data schema from the client system, transforming the source document with the first data schema into target document with a second data schema based on a mapping script for transaction between the client system and a partner system through processes including:

performing deserialization by transforming the source document into source structure data based on the first schema;

customizable mapping the source structure data into target structure data; and performing serialization by transforming the target document based on the second schema, and transmitting the target document with the second data schema to the partner system and providing an Electronic Data Interchange (EDI) service between the client system and the partner system, wherein the platform service provides a development tool enabling graphic coding through a user interface, wherein the development tool includes a schema editing area and an annotation area in the user interface, wherein the schema editing area represents a hierarchical structure of data types for the customizable mapping, and the schema editing area allows a user to edit the customizable mapping through the user interface, wherein the annotation area includes first editing information required when the deserialization is performed, and the annotation area further includes second editing information required when the serialization is performed, and wherein the annotation area further includes annotation list having an annotation name and a document type.

12. The non-transitory computer-readable storage medium according to claim 11, wherein the first schema includes annotation information for a structure of the source document, and the second schema includes annotation information for a structure of the target document, and wherein the mapping script includes statement information representing grammar of a programming language.

* * * * *